US010482637B2

(12) United States Patent
Garg et al.

(10) Patent No.: US 10,482,637 B2
(45) Date of Patent: Nov. 19, 2019

(54) MODIFYING AND FORMATTING A CHART USING PICTORIALLY PROVIDED CHART ELEMENTS

(71) Applicant: Microsoft Technology Licensing, LLC, Redmond, WA (US)

(72) Inventors: Anupam Garg, Redmond, WA (US); Eric W. Patterson, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/670,765

(22) Filed: Aug. 7, 2017

(65) Prior Publication Data

US 2017/0337715 A1 Nov. 23, 2017

Related U.S. Application Data

(63) Continuation of application No. 14/150,531, filed on Jan. 8, 2014, now Pat. No. 9,727,989, which is a continuation-in-part of application No. 12/574,256, filed on Oct. 6, 2009, now Pat. No. 8,638,333, which is a continuation of application No. 11/445,393, filed on Jun. 1, 2006, now Pat. No. 8,605,090.

(51) Int. Cl.
 *G06T 11/20* (2006.01)
 *G06F 16/904* (2019.01)
(52) U.S. Cl.
 CPC .......... *G06T 11/206* (2013.01); *G06F 16/904* (2019.01)
(58) Field of Classification Search
 CPC .................................................. G06T 11/206
 See application file for complete search history.

(56) References Cited

U.S. PATENT DOCUMENTS

| 3,946,911 | A | 3/1976 | Morane et al. |
| 4,815,029 | A | 3/1989 | Barker et al. |
| 4,823,283 | A | 4/1989 | Diehm et al. |
| 5,023,907 | A | 6/1991 | Johnson et al. |

(Continued)

FOREIGN PATENT DOCUMENTS

| AU | 2005203411 | 3/2006 |
| AU | 2006284908 B2 | 3/2011 |

(Continued)

OTHER PUBLICATIONS

US 9,658,743 B2, 05/2017, Satterfield et al. (withdrawn)

(Continued)

*Primary Examiner* — Jeffery A Brier

(57) ABSTRACT

A chart element representing a chart modification for a standard chart may be provided pictorially by a computing device. The standard chart may be modified using the chart element through the presentation of a first gallery representing a feature of the standard chart for possible modification. The feature may include a horizontal axis title and a vertical axis title. A selection of the vertical axis title for possible modification from the first gallery may be received. A set of visual representations of how the vertical axis title could be modified in a second gallery may then be presented. The visual representations may include options for not displaying an axis title and for displaying an axis title in a rotated orientation. One of the options may be selected to modify the standard chart. The modified chart may then be displayed by the computing device.

20 Claims, 13 Drawing Sheets

(56) References Cited

U.S. PATENT DOCUMENTS

| | | |
|---|---|---|
| 5,057,836 A | 10/1991 | Inaba et al. |
| 5,129,057 A | 7/1992 | Murray et al. |
| 5,134,915 A | 8/1992 | Nishioka et al. |
| 5,155,806 A | 10/1992 | Hoeber et al. |
| 5,204,897 A | 4/1993 | Wyman |
| 5,220,675 A | 6/1993 | Pawader et al. |
| 5,243,697 A | 9/1993 | Hoeber et al. |
| 5,247,438 A | 9/1993 | Subas et al. |
| 5,305,435 A | 4/1994 | Bronson |
| 5,307,086 A | 4/1994 | Griffin et al. |
| 5,323,314 A | 6/1994 | Baber et al. |
| 5,342,697 A | 8/1994 | Helle |
| 5,377,354 A | 12/1994 | Scannell et al. |
| 5,412,772 A | 5/1995 | Monson |
| 5,414,809 A | 5/1995 | Hogan et al. |
| 5,457,476 A | 10/1995 | Jenson |
| 5,461,708 A | 10/1995 | Kahn |
| 5,475,805 A | 12/1995 | Murata |
| 5,500,936 A | 3/1996 | Allen et al. |
| 5,502,805 A | 3/1996 | Anderson et al. |
| 5,519,606 A | 5/1996 | Frid-Nielsen et al. |
| 5,533,184 A | 7/1996 | Malcolm |
| 5,559,875 A | 9/1996 | Bieselin et al. |
| 5,559,944 A | 9/1996 | Ono |
| 5,570,109 A | 10/1996 | Jenson |
| 5,581,677 A | 12/1996 | Myers et al. |
| 5,588,107 A | 12/1996 | Bowdon et al. |
| 5,592,602 A | 1/1997 | Edmunds et al. |
| 5,596,694 A | 1/1997 | Capps |
| 5,598,557 A | 1/1997 | Doner et al. |
| 5,625,783 A | 4/1997 | Ezekiel et al. |
| 5,634,100 A | 5/1997 | Capps |
| 5,634,128 A | 5/1997 | Messina |
| 5,638,504 A | 6/1997 | Scott et al. |
| 5,644,737 A | 7/1997 | Tuniman et al. |
| 5,659,693 A | 8/1997 | Hansen et al. |
| 5,664,127 A | 9/1997 | Anderson et al. |
| 5,664,208 A | 9/1997 | Pavley et al. |
| 5,671,412 A | 9/1997 | Christiano |
| 5,673,403 A | 9/1997 | Brown et al. |
| 5,694,610 A | 12/1997 | Habib et al. |
| 5,721,847 A | 2/1998 | Johnson |
| 5,734,915 A | 3/1998 | Roewer |
| 5,751,373 A | 5/1998 | Ohyama et al. |
| 5,760,768 A | 6/1998 | Gram |
| 5,760,773 A | 6/1998 | Berman et al. |
| 5,761,646 A | 6/1998 | Frid-Nielsen et al. |
| 5,764,960 A | 6/1998 | Perks et al. |
| 5,778,402 A | 7/1998 | Gipson |
| 5,778,404 A | 7/1998 | Capps et al. |
| 5,787,295 A | 7/1998 | Nakao |
| 5,793,365 A | 8/1998 | Tang et al. |
| 5,796,393 A | 8/1998 | MacNaughton et al. |
| 5,805,167 A | 9/1998 | van Cruyningen |
| 5,812,132 A | 9/1998 | Goldstein |
| 5,821,936 A | 10/1998 | Shaffer et al. |
| 5,828,367 A | 10/1998 | Kuga |
| 5,828,376 A | 10/1998 | Solimene et al. |
| 5,838,321 A | 11/1998 | Wolf |
| 5,842,009 A | 11/1998 | Borovoy et al. |
| 5,844,558 A | 12/1998 | Kumar et al. |
| 5,844,572 A | 12/1998 | Schott |
| 5,844,588 A | 12/1998 | Anderson |
| 5,850,561 A | 12/1998 | Church |
| 5,851,644 A | 12/1998 | McArdle et al. |
| 5,855,006 A | 12/1998 | Huemoeller et al. |
| 5,864,848 A | 1/1999 | Horvitz et al. |
| 5,872,973 A | 2/1999 | Mitchell et al. |
| 5,873,108 A | 2/1999 | Goyal et al. |
| 5,874,953 A | 2/1999 | Webster et al. |
| 5,874,956 A | 2/1999 | LaHood et al. |
| 5,884,572 A | 3/1999 | Kawaguchi et al. |
| 5,885,006 A | 3/1999 | Sheedy |
| 5,893,073 A | 4/1999 | Kasso et al. |
| 5,893,125 A | 4/1999 | Shostak |
| 5,895,476 A | 4/1999 | Orr et al. |
| 5,898,436 A | 4/1999 | Stewart et al. |
| 5,899,979 A | 5/1999 | Miller et al. |
| 5,903,902 A | 5/1999 | Orr et al. |
| 5,905,863 A | 5/1999 | Knowles et al. |
| 5,910,895 A | 6/1999 | Proskauer et al. |
| 5,914,714 A | 6/1999 | Brown et al. |
| 5,917,489 A | 6/1999 | Thurlow et al. |
| 5,924,089 A | 7/1999 | Mocek et al. |
| 5,926,806 A | 7/1999 | Marshall et al. |
| 5,936,625 A | 8/1999 | Kahl et al. |
| 5,937,160 A | 8/1999 | Davis et al. |
| 5,940,078 A | 8/1999 | Nagarajayya et al. |
| 5,940,847 A | 8/1999 | Fein et al. |
| 5,943,051 A | 8/1999 | Onda et al. |
| 5,956,737 A | 9/1999 | King et al. |
| 5,960,406 A | 9/1999 | Rasansky et al. |
| 5,963,938 A | 10/1999 | Wilson |
| 5,970,466 A | 10/1999 | Detjen et al. |
| 5,999,173 A | 12/1999 | Ubillos |
| 5,999,938 A | 12/1999 | Bliss et al. |
| 6,002,395 A | 12/1999 | Wagner et al. |
| 6,008,806 A | 12/1999 | Nakajima et al. |
| 6,012,075 A | 1/2000 | Fein et al. |
| 6,016,478 A | 1/2000 | Zhang et al. |
| 6,018,343 A | 1/2000 | Wang et al. |
| 6,034,683 A | 3/2000 | Mansour et al. |
| 6,038,395 A | 3/2000 | Chow et al. |
| 6,038,542 A | 3/2000 | Ruckdashel |
| 6,043,816 A | 3/2000 | Williams et al. |
| 6,057,836 A | 5/2000 | Kavalam et al. |
| 6,065,026 A | 5/2000 | Cornelia et al. |
| 6,067,087 A | 5/2000 | Krauss et al. |
| 6,067,551 A | 5/2000 | Brown et al. |
| 6,072,492 A | 6/2000 | Schagen et al. |
| 6,073,110 A | 6/2000 | Rhodes et al. |
| 6,073,142 A | 6/2000 | Geiger |
| 6,085,206 A | 7/2000 | Domini et al. |
| 6,088,707 A | 7/2000 | Bates et al. |
| 6,092,103 A | 7/2000 | Pritsch |
| 6,101,480 A | 8/2000 | Conmy et al. |
| 6,107,869 A | 8/2000 | Kawase et al. |
| 6,115,777 A | 9/2000 | Zahir et al. |
| 6,122,075 A | 9/2000 | Yamada et al. |
| 6,133,915 A | 10/2000 | Arcuri et al. |
| 6,137,488 A | 10/2000 | Kraft |
| 6,154,740 A | 11/2000 | Shah |
| 6,154,755 A | 11/2000 | Dellert et al. |
| 6,160,554 A | 12/2000 | Krause |
| 6,175,363 B1 | 1/2001 | Williams et al. |
| 6,188,401 B1 | 2/2001 | Peyer |
| 6,188,403 B1 | 2/2001 | Sacerdoti et al. |
| 6,189,024 B1 | 2/2001 | Bauersfeld et al. |
| 6,189,146 B1 | 2/2001 | Misra et al. |
| 6,192,381 B1 | 2/2001 | Stiegmeier et al. |
| 6,195,094 B1 | 2/2001 | Celebiler |
| 6,199,102 B1 | 3/2001 | Cobb |
| 6,211,879 B1 | 4/2001 | Soohoo |
| 6,216,122 B1 | 4/2001 | Elson |
| 6,219,670 B1 | 4/2001 | Mocek et al. |
| 6,222,540 B1 | 4/2001 | Sacerdoti et al. |
| 6,230,173 B1 | 5/2001 | Ferrel et al. |
| 6,230,309 B1 | 5/2001 | Turner et al. |
| 6,232,971 B1 | 5/2001 | Haynes |
| 6,236,396 B1 | 5/2001 | Jenson et al. |
| 6,237,135 B1 | 5/2001 | Timbol |
| 6,239,798 B1 | 5/2001 | Ludolph et al. |
| 6,256,628 B1 | 7/2001 | Dobson et al. |
| 6,269,341 B1 | 7/2001 | Redcay, Jr. |
| 6,272,488 B1 | 8/2001 | Chang et al. |
| 6,278,450 B1 | 8/2001 | Arcuri et al. |
| 6,289,317 B1 | 9/2001 | Peterson |
| 6,307,544 B1 | 10/2001 | Harding |
| 6,307,574 B1 | 10/2001 | Ashe |
| 6,311,194 B1 | 10/2001 | Sheth et al. |
| 6,311,195 B1 | 10/2001 | Hachiya et al. |
| 6,313,854 B1 | 11/2001 | Gibson |
| 6,323,883 B1 | 11/2001 | Minoura et al. |
| 6,326,962 B1 | 12/2001 | Szabo |

(56) References Cited

U.S. PATENT DOCUMENTS

| | | |
|---|---|---|
| 6,327,046 B1 | 12/2001 | Miyamoto et al. |
| 6,330,577 B1 | 12/2001 | Kim et al. |
| 6,330,578 B1 | 12/2001 | Savin et al. |
| 6,330,589 B1 | 12/2001 | Kennedy |
| 6,341,277 B1 | 1/2002 | Coden et al. |
| 6,342,901 B1 | 1/2002 | Adler et al. |
| 6,353,451 B1 | 3/2002 | Teibel et al. |
| 6,356,893 B1 | 3/2002 | Itakura et al. |
| 6,359,634 B1 | 3/2002 | Cragun et al. |
| 6,369,840 B1 | 4/2002 | Barnett et al. |
| 6,373,507 B1 | 4/2002 | Camara et al. |
| 6,374,304 B1 | 4/2002 | Chiasi |
| 6,381,740 B1 | 4/2002 | Miller et al. |
| 6,384,849 B1 | 5/2002 | Morcos et al. |
| 6,385,769 B1 | 5/2002 | Lewallen et al. |
| 6,405,216 B1 | 6/2002 | Minnaert et al. |
| 6,424,829 B1 | 7/2002 | Kraft |
| 6,429,882 B1 | 8/2002 | Abdelnur et al. |
| 6,430,563 B1 | 8/2002 | Fritz et al. |
| 6,433,801 B1 | 8/2002 | Moon et al. |
| 6,433,831 B1 | 8/2002 | Dinwiddie et al. |
| 6,434,598 B1 | 8/2002 | Gish |
| 6,442,527 B1 | 8/2002 | Worthington |
| 6,446,118 B1 | 9/2002 | Gottleib |
| 6,456,304 B1 | 9/2002 | Angiulo et al. |
| 6,457,062 B1 | 9/2002 | Pivowar et al. |
| 6,459,441 B1 | 10/2002 | Perroux et al. |
| 6,466,236 B1 | 10/2002 | Pivowar et al. |
| 6,466,240 B1 | 10/2002 | Maslov |
| 6,469,722 B1 | 10/2002 | Kineo et al. |
| 6,469,723 B1 | 10/2002 | Gould |
| 6,476,828 B1 | 11/2002 | Burkett et al. |
| 6,480,865 B1 | 11/2002 | Lee et al. |
| 6,483,624 B1 | 11/2002 | Otani et al. |
| 6,484,180 B1 | 11/2002 | Lyons et al. |
| 6,493,006 B1 | 12/2002 | Gourdol et al. |
| 6,493,007 B1 | 12/2002 | Pang |
| 6,493,731 B1 | 12/2002 | Jones et al. |
| 6,507,845 B1 | 1/2003 | Cohen et al. |
| 6,529,918 B2 | 3/2003 | Takahashi |
| 6,546,417 B1 | 4/2003 | Baker |
| 6,564,377 B1 | 5/2003 | Jayasimha et al. |
| 6,567,509 B1 | 5/2003 | Gusler et al. |
| 6,567,846 B1 | 5/2003 | Garg et al. |
| 6,570,596 B2 | 5/2003 | Frederiksen |
| 6,570,890 B1 | 5/2003 | Keenan et al. |
| 6,578,192 B1 | 6/2003 | Boehme et al. |
| 6,583,798 B1 | 6/2003 | Hoek et al. |
| 6,584,501 B1 | 6/2003 | Cartsonis et al. |
| 6,584,504 B1 | 6/2003 | Choe et al. |
| 6,587,118 B1 | 7/2003 | Yoneda |
| 6,603,493 B1 | 8/2003 | Lovell et al. |
| 6,618,732 B1 | 9/2003 | White et al. |
| 6,621,504 B1 | 9/2003 | Nadas et al. |
| 6,621,508 B1 | 9/2003 | Shiraishi et al. |
| 6,624,831 B1 | 9/2003 | Shahine et al. |
| 6,633,867 B1 | 10/2003 | Kraft et al. |
| 6,635,089 B1 | 10/2003 | Burkett et al. |
| 6,639,611 B1 | 10/2003 | Leduc |
| 6,654,791 B1 | 11/2003 | Bates et al. |
| 6,664,983 B2 | 12/2003 | Ludolph |
| 6,680,749 B1 | 1/2004 | Anderson et al. |
| 6,686,938 B1 | 2/2004 | Jobs et al. |
| 6,691,281 B1 | 2/2004 | Sorge et al. |
| 6,701,513 B1 | 3/2004 | Bailey |
| 6,707,454 B1 | 3/2004 | Barg |
| 6,707,476 B1 | 3/2004 | Hochstedler |
| 6,708,205 B2 | 3/2004 | Sheldon et al. |
| 6,721,402 B2 | 4/2004 | Usami |
| 6,725,228 B1 | 4/2004 | Clark et al. |
| 6,727,919 B1 | 4/2004 | Reder et al. |
| 6,732,330 B1 | 5/2004 | Claussen et al. |
| 6,734,880 B2 | 5/2004 | Chang et al. |
| 6,750,850 B2 | 6/2004 | O'Leary |
| 6,750,890 B1 | 6/2004 | Sugimoto |
| 6,753,887 B2 | 6/2004 | Carolan et al. |
| 6,778,990 B2 | 8/2004 | Garcia et al. |
| 6,785,866 B1 | 8/2004 | Lewis et al. |
| 6,785,868 B1 | 8/2004 | Raff |
| 6,789,107 B1 | 9/2004 | Bates et al. |
| 6,799,095 B1 | 9/2004 | Owen et al. |
| 6,816,904 B1 | 11/2004 | Ludwig et al. |
| 6,825,859 B1 | 11/2004 | Severenuk et al. |
| 6,826,727 B1 | 11/2004 | Mohr et al. |
| 6,826,729 B1 | 11/2004 | Giesen et al. |
| 6,832,244 B1 | 12/2004 | Raghunandan |
| 6,847,989 B1 | 1/2005 | Chastain et al. |
| 6,850,255 B2 | 2/2005 | Muschetto |
| 6,857,103 B1 | 2/2005 | Wason |
| 6,871,195 B2 | 3/2005 | Ryan et al. |
| 6,882,353 B2 | 4/2005 | Nettles et al. |
| 6,882,354 B1 | 4/2005 | Nielsen |
| 6,892,193 B2 | 5/2005 | Bolle et al. |
| 6,892,196 B1 | 5/2005 | Hughes |
| 6,895,426 B1 | 5/2005 | Cortright et al. |
| 6,904,449 B1 | 6/2005 | Quinones |
| 6,906,717 B2 | 6/2005 | Couckuyt et al. |
| 6,907,423 B2 | 6/2005 | Weil et al. |
| 6,915,492 B2 | 7/2005 | Kurtenbach et al. |
| 6,924,797 B1 | 8/2005 | MacPhail |
| 6,925,605 B2 | 8/2005 | Bates et al. |
| 6,928,610 B2 | 8/2005 | Brintzenhofe et al. |
| 6,928,613 B1 | 8/2005 | Ishii |
| 6,931,623 B2 | 8/2005 | Vermeire et al. |
| 6,934,740 B1 | 8/2005 | Lawande et al. |
| 6,941,304 B2 | 9/2005 | Gainey |
| 6,956,429 B1 | 10/2005 | Elbanhawy |
| 6,964,025 B2 | 11/2005 | Angiulo et al. |
| 6,981,209 B1 | 12/2005 | Parikh et al. |
| 6,983,889 B2 | 1/2006 | Alles |
| 6,988,241 B1 | 1/2006 | Guttman et al. |
| 6,990,637 B2 | 1/2006 | Anthony et al. |
| 6,990,652 B1 | 1/2006 | Parthasarathy et al. |
| 6,990,654 B2 | 1/2006 | Carroll, Jr. |
| 6,993,711 B1 | 1/2006 | Tanaka et al. |
| 7,016,864 B1 | 3/2006 | Notz et al. |
| 7,027,463 B2 | 4/2006 | Mathew et al. |
| 7,032,210 B2 | 4/2006 | Alloing et al. |
| 7,039,596 B1 | 5/2006 | Lu |
| 7,039,863 B1 | 5/2006 | Caro et al. |
| 7,044,363 B2 | 5/2006 | Silverbrook et al. |
| 7,046,848 B1 | 5/2006 | Olcott |
| 7,051,276 B1 | 5/2006 | Mogilevsky et al. |
| 7,069,538 B1 | 6/2006 | Renshaw |
| 7,085,757 B2 | 8/2006 | Dettinger |
| 7,085,999 B2 | 8/2006 | Maeda et al. |
| 7,086,006 B2 | 8/2006 | Subramanian et al. |
| 7,093,162 B2 | 8/2006 | Barga et al. |
| 7,096,218 B2 | 8/2006 | Schirmer et al. |
| 7,103,849 B2 | 9/2006 | Aikawa |
| 7,107,525 B2 | 9/2006 | Purvis |
| 7,107,544 B1 | 9/2006 | Luke |
| 7,110,936 B2 | 9/2006 | Hiew et al. |
| 7,111,238 B1 | 9/2006 | Kuppusamy et al. |
| 7,113,941 B2 | 9/2006 | Arend |
| 7,117,370 B2 | 10/2006 | Khan et al. |
| 7,117,436 B1 | 10/2006 | O'Rourke et al. |
| 7,120,868 B2 | 10/2006 | Salesin et al. |
| 7,134,095 B1 | 11/2006 | Smith et al. |
| 7,149,983 B1 | 12/2006 | Robertson et al. |
| 7,152,207 B1 | 12/2006 | Underwood et al. |
| 7,174,361 B1 | 2/2007 | Paas |
| 7,181,697 B2 | 2/2007 | Tai et al. |
| 7,188,073 B1 | 3/2007 | Tam et al. |
| 7,188,158 B1 | 3/2007 | Stanton et al. |
| 7,188,317 B1 | 3/2007 | Hazel |
| 7,200,636 B2 | 4/2007 | Harding |
| 7,206,813 B2 | 4/2007 | Dunbar |
| 7,206,814 B2 | 4/2007 | Kirsch |
| 7,212,208 B2 | 5/2007 | Khozai |
| 7,216,301 B2 | 5/2007 | Moehrle |
| 7,216,302 B2 | 5/2007 | Rodden et al. |
| 7,218,976 B2 | 5/2007 | Minagawa |
| 7,219,305 B2 | 5/2007 | Jennings |

(56) References Cited

U.S. PATENT DOCUMENTS

| | | |
|---|---|---|
| 7,225,244 B2 | 5/2007 | Reynolds et al. |
| 7,234,132 B2 | 6/2007 | Lam |
| 7,240,323 B1 | 7/2007 | Desai et al. |
| 7,246,311 B2 | 7/2007 | Bargeron et al. |
| 7,249,325 B1 | 7/2007 | Donaldson |
| 7,251,610 B2 | 7/2007 | Alban et al. |
| 7,251,640 B2 | 7/2007 | Baumard |
| 7,263,668 B1 | 8/2007 | Lentz |
| 7,272,789 B2 | 9/2007 | O'Brien |
| 7,277,572 B2 | 10/2007 | MacInnes et al. |
| 7,281,245 B2 | 10/2007 | Reynar et al. |
| 7,287,233 B2 | 10/2007 | Arend |
| 7,290,033 B1 | 10/2007 | Goldman et al. |
| 7,296,241 B2 | 11/2007 | Oshiro et al. |
| 7,318,203 B2 | 1/2008 | Purves et al. |
| 7,325,204 B2 | 1/2008 | Rogers |
| 7,328,409 B2 | 2/2008 | Awada et al. |
| 7,337,185 B2 | 2/2008 | Ellis et al. |
| 7,346,705 B2 | 3/2008 | Hullot et al. |
| 7,346,769 B2 | 3/2008 | Forlenza et al. |
| 7,356,537 B2 | 4/2008 | Reynar et al. |
| 7,356,772 B2 | 4/2008 | Brownholtz et al. |
| 7,360,174 B2 | 4/2008 | Grossman et al. |
| 7,362,311 B2 | 4/2008 | Filner et al. |
| 7,370,282 B2 | 5/2008 | Cary |
| 7,380,236 B2 | 5/2008 | Hawley |
| 7,386,535 B1 | 6/2008 | Kalucha et al. |
| 7,386,835 B1 | 6/2008 | Desai et al. |
| 7,392,249 B1 | 6/2008 | Harris et al. |
| 7,395,221 B2 | 7/2008 | Doss et al. |
| 7,395,500 B2 | 7/2008 | Whittle et al. |
| 7,395,540 B2 | 7/2008 | Rogers |
| 7,421,660 B2 | 9/2008 | Charnock et al. |
| 7,421,690 B2 | 9/2008 | Forstall et al. |
| 7,426,713 B2 | 9/2008 | Duggan et al. |
| 7,461,077 B1 | 12/2008 | Greenwood |
| 7,464,343 B2 | 12/2008 | Shaw et al. |
| 7,469,385 B2 | 12/2008 | Harper et al. |
| 7,472,117 B2 | 12/2008 | Dettinger et al. |
| 7,472,374 B1 | 12/2008 | Dillman et al. |
| 7,484,213 B2 | 1/2009 | Mathew et al. |
| 7,499,907 B2 | 3/2009 | Brown et al. |
| 7,505,954 B2 | 3/2009 | Heidloff et al. |
| 7,509,328 B2 | 3/2009 | Weiss et al. |
| 7,516,186 B1 | 4/2009 | Borghetti et al. |
| 7,530,029 B2 | 5/2009 | Satterfield et al. |
| 7,555,707 B1 | 6/2009 | Labarge et al. |
| 7,565,403 B2 | 7/2009 | Horvitz et al. |
| 7,567,964 B2 | 7/2009 | Brice et al. |
| 7,584,253 B2 | 9/2009 | Curbow et al. |
| 7,610,575 B2 | 10/2009 | Sproule |
| 7,627,561 B2 | 12/2009 | Pell et al. |
| 7,632,311 B2 | 12/2009 | Seedhom et al. |
| 7,640,506 B2 | 12/2009 | Pratley et al. |
| 7,661,075 B2 | 2/2010 | Landesmaki |
| 7,664,821 B1 | 2/2010 | Ancin et al. |
| 7,676,767 B2 | 3/2010 | Hofmeister et al. |
| 7,681,149 B2 | 3/2010 | Landesmaki |
| 7,685,116 B2 | 3/2010 | Pell et al. |
| 7,703,036 B2 | 4/2010 | Satterfield et al. |
| 7,707,255 B2 | 4/2010 | Satterfield et al. |
| 7,711,742 B2 | 5/2010 | Bennett et al. |
| 7,716,593 B2 | 5/2010 | Durazo et al. |
| 7,739,259 B2 | 6/2010 | Hartwell et al. |
| 7,747,966 B2 | 6/2010 | Leukart et al. |
| 7,769,698 B2 | 8/2010 | Matic |
| 7,779,386 B2 | 8/2010 | Seitz et al. |
| 7,788,598 B2 | 8/2010 | Bansal et al. |
| 7,802,199 B2 | 9/2010 | Shneerson et al. |
| 7,827,546 B1 | 11/2010 | Jones et al. |
| 7,831,902 B2 | 11/2010 | Sourov et al. |
| 7,853,877 B2 | 12/2010 | Giesen et al. |
| 7,856,596 B2 | 12/2010 | Crider et al. |
| 7,860,901 B2 | 12/2010 | Cheng et al. |
| 7,865,868 B2 | 1/2011 | Falzone Schwaw et al. |
| 7,870,465 B2 | 1/2011 | VerSteeg |
| 7,886,290 B2 | 2/2011 | Dhanjal et al. |
| 7,895,531 B2 | 2/2011 | Radtke et al. |
| 7,908,580 B2 | 3/2011 | Stubbs et al. |
| 7,925,621 B2 | 4/2011 | Sikchi et al. |
| 7,949,963 B1 | 5/2011 | Pham et al. |
| 8,046,683 B2 | 10/2011 | Larcheveque et al. |
| 8,117,542 B2 | 2/2012 | Radtke et al. |
| 8,146,016 B2 | 3/2012 | Himberger et al. |
| 8,150,930 B2 | 4/2012 | Satterfield et al. |
| 8,171,417 B2 | 5/2012 | Bamford et al. |
| 8,201,103 B2 | 6/2012 | Dukhon et al. |
| 8,239,882 B2 | 8/2012 | Dhanjal et al. |
| 8,243,017 B2 | 8/2012 | Brodersen et al. |
| 8,255,828 B2 | 8/2012 | Harris et al. |
| 8,285,806 B2 | 10/2012 | Yu |
| 8,302,014 B2 | 10/2012 | Lezama Guadarrama et al. |
| 8,402,096 B2 | 3/2013 | Affronti et al. |
| 8,479,122 B2 | 7/2013 | Hotelling et al. |
| 8,484,578 B2 | 7/2013 | Gordner et al. |
| 8,605,090 B2 | 12/2013 | Garg et al. |
| 8,627,222 B2 | 1/2014 | Hartwell et al. |
| 8,627,562 B2 | 1/2014 | Sutter et al. |
| 8,638,333 B2 | 1/2014 | Garg et al. |
| 8,689,137 B2 | 4/2014 | McCormack et al. |
| 8,749,122 B2 | 6/2014 | Aratake |
| 8,762,880 B2 | 6/2014 | Dukhon et al. |
| 8,799,353 B2 | 8/2014 | Larsson et al. |
| 8,799,808 B2 | 8/2014 | Satterfield et al. |
| 8,839,139 B2 | 9/2014 | Leukart et al. |
| 8,904,287 B2 | 12/2014 | Kumar et al. |
| 9,015,621 B2 | 4/2015 | Dean et al. |
| 9,015,624 B2 | 4/2015 | Radtke et al. |
| 9,046,983 B2 | 6/2015 | Zhao et al. |
| 9,098,473 B2 | 8/2015 | Dukhon et al. |
| 9,098,837 B2 | 8/2015 | Hill et al. |
| 9,182,885 B2 | 11/2015 | Ruscher et al. |
| 9,223,477 B2 | 12/2015 | Harris et al. |
| 9,304,658 B2 | 4/2016 | Mercer |
| 9,338,114 B2 | 5/2016 | Affronti et al. |
| 9,513,781 B2 | 12/2016 | Hartwell et al. |
| 9,542,667 B2 | 1/2017 | Taboada et al. |
| 9,588,781 B2 | 3/2017 | Larsson et al. |
| 9,619,116 B2 | 4/2017 | Dukhon et al. |
| 9,645,698 B2 | 5/2017 | Harris et al. |
| 9,665,850 B2 | 5/2017 | Affronti et al. |
| 9,690,448 B2 | 6/2017 | Satterfield et al. |
| 9,690,450 B2 | 6/2017 | Satterfield et al. |
| 9,715,678 B2 | 7/2017 | Hill et al. |
| 9,727,989 B2 | 8/2017 | Garg et al. |
| 9,762,637 B2 | 9/2017 | Bullotta et al. |
| 9,864,489 B2 | 1/2018 | Dean et al. |
| 9,875,009 B2 | 1/2018 | Zhao et al. |
| 2001/0014900 A1 | 8/2001 | Brauer et al. |
| 2001/0032220 A1 | 10/2001 | Ven Hoff |
| 2001/0034762 A1 | 10/2001 | Jacobs et al. |
| 2001/0035882 A1 | 11/2001 | Stoakley et al. |
| 2001/0038395 A1 | 11/2001 | Holtzblatt et al. |
| 2001/0040627 A1 | 11/2001 | Obradovich |
| 2001/0044736 A1 | 11/2001 | Jacobs et al. |
| 2001/0044741 A1 | 11/2001 | Jacobs et al. |
| 2001/0049677 A1 | 12/2001 | Talib et al. |
| 2002/0004734 A1 | 1/2002 | Nishizawa |
| 2002/0007380 A1 | 1/2002 | Bauchot et al. |
| 2002/0023134 A1 | 2/2002 | Roskowski et al. |
| 2002/0024638 A1 | 2/2002 | Hidari et al. |
| 2002/0029247 A1 | 3/2002 | Kawamoto |
| 2002/0036662 A1 | 3/2002 | Gauthier et al. |
| 2002/0037754 A1 | 3/2002 | Hama et al. |
| 2002/0052721 A1 | 5/2002 | Ruff et al. |
| 2002/0052880 A1 | 5/2002 | Fruensgaard et al. |
| 2002/0052916 A1 | 5/2002 | Kloba et al. |
| 2002/0054101 A1 | 5/2002 | Beatty |
| 2002/0054128 A1 | 5/2002 | Lau et al. |
| 2002/0063734 A1 | 5/2002 | Khalfay et al. |
| 2002/0070977 A1 | 6/2002 | Morcos et al. |
| 2002/0073091 A1 | 6/2002 | Jain et al. |
| 2002/0073156 A1 | 6/2002 | Newman |
| 2002/0075330 A1 | 6/2002 | Rosenzweig et al. |

(56) References Cited

U.S. PATENT DOCUMENTS

| | | |
|---|---|---|
| 2002/0078143 A1 | 6/2002 | De Boor et al. |
| 2002/0083054 A1 | 6/2002 | Peltonen et al. |
| 2002/0083097 A1 | 6/2002 | Warrington |
| 2002/0089543 A1 | 7/2002 | Ostergaard et al. |
| 2002/0091697 A1 | 7/2002 | Huang et al. |
| 2002/0091739 A1 | 7/2002 | Ferlitsch et al. |
| 2002/0097266 A1 | 7/2002 | Hachiya et al. |
| 2002/0099775 A1 | 7/2002 | Gupta et al. |
| 2002/0116208 A1 | 8/2002 | Chirnomas et al. |
| 2002/0116508 A1 | 8/2002 | Khan et al. |
| 2002/0120695 A1 | 8/2002 | Engstrom |
| 2002/0120702 A1 | 8/2002 | Schiavone et al. |
| 2002/0122071 A1 | 9/2002 | Camera et al. |
| 2002/0123984 A1 | 9/2002 | Prakash |
| 2002/0123991 A1 | 9/2002 | Asami |
| 2002/0125942 A1 | 9/2002 | Dunnebacke et al. |
| 2002/0129052 A1 | 9/2002 | Glazer et al. |
| 2002/0133557 A1 | 9/2002 | Winarski |
| 2002/0135621 A1 | 9/2002 | Angiulo et al. |
| 2002/0140731 A1 | 10/2002 | Subramaniam et al. |
| 2002/0140733 A1 | 10/2002 | Edlund et al. |
| 2002/0140740 A1 | 10/2002 | Chen |
| 2002/0149623 A1 | 10/2002 | West et al. |
| 2002/0149629 A1 | 10/2002 | Craycroft et al. |
| 2002/0154178 A1 | 10/2002 | Barnett et al. |
| 2002/0156815 A1 | 10/2002 | Davia |
| 2002/0158876 A1 | 10/2002 | Janssen |
| 2002/0163538 A1 | 11/2002 | Shteyn |
| 2002/0175938 A1 | 11/2002 | Hackworth |
| 2002/0175955 A1 | 11/2002 | Gourdol et al. |
| 2002/0184611 A1 | 12/2002 | Endejan |
| 2002/0186257 A1 | 12/2002 | Cadiz et al. |
| 2002/0188515 A1 | 12/2002 | Nakata et al. |
| 2002/0188632 A1 | 12/2002 | Su |
| 2002/0196293 A1 | 12/2002 | Suppan et al. |
| 2003/0005051 A1 | 1/2003 | Gottlieb |
| 2003/0005056 A1 | 1/2003 | Yamamoto et al. |
| 2003/0009455 A1 | 1/2003 | Carlson et al. |
| 2003/0011564 A1 | 1/2003 | Ushino et al. |
| 2003/0011638 A1 | 1/2003 | Chung |
| 2003/0011639 A1 | 1/2003 | Webb |
| 2003/0014421 A1 | 1/2003 | Jung |
| 2003/0014490 A1 | 1/2003 | Bates et al. |
| 2003/0016248 A1 | 1/2003 | Hayes Ubillos |
| 2003/0022700 A1 | 1/2003 | Wang |
| 2003/0025732 A1 | 2/2003 | Prichard |
| 2003/0025737 A1 | 2/2003 | Breinberg |
| 2003/0028560 A1 | 2/2003 | Kudrolli et al. |
| 2003/0035012 A1 | 2/2003 | Kurtenbach et al. |
| 2003/0035917 A1 | 2/2003 | Hyman |
| 2003/0038832 A1 | 2/2003 | Sobol |
| 2003/0043200 A1 | 3/2003 | Faieta et al. |
| 2003/0043211 A1 | 3/2003 | Kremer et al. |
| 2003/0046528 A1 | 3/2003 | Haitani et al. |
| 2003/0050986 A1 | 3/2003 | Matthews et al. |
| 2003/0064707 A1 | 4/2003 | Voneyama |
| 2003/0066025 A1 | 4/2003 | Garner et al. |
| 2003/0069892 A1 | 4/2003 | Hind et al. |
| 2003/0069900 A1 | 4/2003 | Hind et al. |
| 2003/0070143 A1 | 4/2003 | Maslov |
| 2003/0084035 A1 | 5/2003 | Emerick |
| 2003/0093490 A1 | 5/2003 | Yamamoto et al. |
| 2003/0097361 A1 | 5/2003 | Huang et al. |
| 2003/0097640 A1 | 5/2003 | Abrams et al. |
| 2003/0098891 A1 | 5/2003 | Molander |
| 2003/0101065 A1 | 5/2003 | Rohall et al. |
| 2003/0106024 A1 | 6/2003 | Silverbrook et al. |
| 2003/0110191 A1 | 6/2003 | Handsaker et al. |
| 2003/0112278 A1 | 6/2003 | Driskell |
| 2003/0128243 A1 | 7/2003 | Okamoto |
| 2003/0132972 A1 | 7/2003 | Pang |
| 2003/0135825 A1 | 7/2003 | Gertner et al. |
| 2003/0140009 A1 | 7/2003 | Namba et al. |
| 2003/0154254 A1 | 8/2003 | Awasthi |
| 2003/0156140 A1 | 8/2003 | Watanabe |
| 2003/0160821 A1 | 8/2003 | Yoon |
| 2003/0163455 A1 | 8/2003 | Dettinger et al. |
| 2003/0163537 A1 | 8/2003 | Rohall et al. |
| 2003/0167310 A1 | 9/2003 | Moody et al. |
| 2003/0167315 A1 | 9/2003 | Chowdhry et al. |
| 2003/0169284 A1 | 9/2003 | Dettinger et al. |
| 2003/0177190 A1 | 9/2003 | Moody et al. |
| 2003/0184585 A1 | 10/2003 | Lin |
| 2003/0187586 A1 | 10/2003 | Katzenmaier et al. |
| 2003/0187937 A1 | 10/2003 | Yao et al. |
| 2003/0195937 A1 | 10/2003 | Kircher, Jr. et al. |
| 2003/0200267 A1 | 10/2003 | Garrigues |
| 2003/0206646 A1 | 11/2003 | Brackett |
| 2003/0218611 A1 | 11/2003 | Ben-Tovim et al. |
| 2003/0220138 A1 | 11/2003 | Walker et al. |
| 2003/0225823 A1 | 12/2003 | Meeuwissen et al. |
| 2003/0225853 A1 | 12/2003 | Wang et al. |
| 2003/0226106 A1 | 12/2003 | McKellar et al. |
| 2003/0227481 A1 | 12/2003 | Arend et al. |
| 2003/0227487 A1 | 12/2003 | Hugh |
| 2003/0229668 A1 | 12/2003 | Malik |
| 2003/0229673 A1 | 12/2003 | Malik |
| 2003/0233419 A1 | 12/2003 | Beringer |
| 2004/0002941 A1 | 1/2004 | Thorne et al. |
| 2004/0003351 A1 | 1/2004 | Sommerer et al. |
| 2004/0006570 A1 | 1/2004 | Gelb |
| 2004/0010513 A1 | 1/2004 | Scherr |
| 2004/0010933 A1 | 1/2004 | Mertens et al. |
| 2004/0012633 A1 | 1/2004 | Helt |
| 2004/0021647 A1 | 2/2004 | Iwema |
| 2004/0024824 A1 | 2/2004 | Ferguson et al. |
| 2004/0030993 A1 | 2/2004 | Huey et al. |
| 2004/0044735 A1 | 3/2004 | Hoblit |
| 2004/0056894 A1 | 3/2004 | Zaika et al. |
| 2004/0061713 A1 | 4/2004 | Jennings |
| 2004/0068695 A1 | 4/2004 | Daniell et al. |
| 2004/0073503 A1 | 4/2004 | Morales et al. |
| 2004/0083432 A1 | 4/2004 | Kawamura et al. |
| 2004/0088359 A1 | 5/2004 | Simpson |
| 2004/0090315 A1 | 5/2004 | Mackjust et al. |
| 2004/0093290 A1 | 5/2004 | Doss et al. |
| 2004/0100504 A1 | 5/2004 | Sommer |
| 2004/0100505 A1 | 5/2004 | Cazier |
| 2004/0107197 A1 | 6/2004 | Shen et al. |
| 2004/0109025 A1 | 6/2004 | Hullot et al. |
| 2004/0109033 A1 | 6/2004 | Vienneau et al. |
| 2004/0117451 A1 | 6/2004 | Chung |
| 2004/0119755 A1 | 6/2004 | Guibourge |
| 2004/0119760 A1 | 6/2004 | Grossman et al. |
| 2004/0122789 A1 | 6/2004 | Ostertag et al. |
| 2004/0125142 A1 | 7/2004 | Mock et al. |
| 2004/0128275 A1 | 7/2004 | Moehrle |
| 2004/0133854 A1 | 7/2004 | Black |
| 2004/0135805 A1 | 7/2004 | Gottsacker et al. |
| 2004/0135811 A1 | 7/2004 | Pickering et al. |
| 2004/0139435 A1 | 7/2004 | Cui et al. |
| 2004/0142720 A1 | 7/2004 | Smethers |
| 2004/0150668 A1 | 8/2004 | Myers et al. |
| 2004/0153373 A1 | 8/2004 | Song et al. |
| 2004/0153968 A1 | 8/2004 | Ching et al. |
| 2004/0153973 A1 | 8/2004 | Horowitz |
| 2004/0164983 A1 | 8/2004 | Khozai |
| 2004/0168153 A1 | 8/2004 | Marvin |
| 2004/0181471 A1 | 9/2004 | Rogers |
| 2004/0186775 A1 | 9/2004 | Margiloff et al. |
| 2004/0189694 A1 | 9/2004 | Kurtz et al. |
| 2004/0192440 A1 | 9/2004 | Evans et al. |
| 2004/0196309 A1 | 10/2004 | Hawkins |
| 2004/0205536 A1 | 10/2004 | Newman et al. |
| 2004/0212640 A1 | 10/2004 | Mann |
| 2004/0215612 A1 | 10/2004 | Brody |
| 2004/0221234 A1 | 11/2004 | Imai |
| 2004/0221309 A1 | 11/2004 | Zaner |
| 2004/0230508 A1 | 11/2004 | Minnis et al. |
| 2004/0230906 A1 | 11/2004 | Pik et al. |
| 2004/0233239 A1 | 11/2004 | Landesmaki |
| 2004/0236796 A1 | 11/2004 | Bhatt et al. |
| 2004/0239700 A1 | 12/2004 | Bacshy |
| 2004/0240902 A1 | 12/2004 | Dalai et al. |

(56) References Cited

U.S. PATENT DOCUMENTS

| | | |
|---|---|---|
| 2004/0243938 A1 | 12/2004 | Weise et al. |
| 2004/0254928 A1 | 12/2004 | Vronay |
| 2004/0260756 A1 | 12/2004 | Forstall et al. |
| 2004/0261013 A1 | 12/2004 | Wynn et al. |
| 2004/0268231 A1 | 12/2004 | Tunning |
| 2004/0268235 A1 | 12/2004 | Wason |
| 2004/0268270 A1 | 12/2004 | Hill et al. |
| 2005/0004989 A1 | 1/2005 | Satterfield et al. |
| 2005/0004990 A1 | 1/2005 | Durazo et al. |
| 2005/0005235 A1 | 1/2005 | Satterfield et al. |
| 2005/0005249 A1 | 1/2005 | Hill et al. |
| 2005/0010871 A1 | 1/2005 | Ruthfield et al. |
| 2005/0015361 A1 | 1/2005 | Payton et al. |
| 2005/0015364 A1 | 1/2005 | Payton |
| 2005/0021504 A1 | 1/2005 | Atchison |
| 2005/0021521 A1 | 1/2005 | Wycoff |
| 2005/0022116 A1 | 1/2005 | Bowman et al. |
| 2005/0027779 A1 | 2/2005 | Schinner |
| 2005/0033614 A1 | 2/2005 | Lettovsky et al. |
| 2005/0033811 A1 | 2/2005 | Bhogal et al. |
| 2005/0039142 A1 | 2/2005 | Jalon et al. |
| 2005/0043015 A1 | 2/2005 | Miramatsu |
| 2005/0044500 A1 | 2/2005 | Orimoto et al. |
| 2005/0055449 A1 | 3/2005 | Rappold, III |
| 2005/0057584 A1 | 3/2005 | Gruen et al. |
| 2005/0060337 A1 | 3/2005 | Chou et al. |
| 2005/0065966 A1 | 3/2005 | Diab |
| 2005/0071242 A1 | 3/2005 | Allen et al. |
| 2005/0086135 A1 | 4/2005 | Lu |
| 2005/0088359 A1 | 4/2005 | Lynch |
| 2005/0091576 A1 | 4/2005 | Relyea et al. |
| 2005/0097465 A1 | 5/2005 | Giesen et al. |
| 2005/0097511 A1 | 5/2005 | Bergman et al. |
| 2005/0108348 A1 | 5/2005 | Lee |
| 2005/0108734 A1 | 5/2005 | Need et al. |
| 2005/0114778 A1 | 5/2005 | Bramson et al. |
| 2005/0114781 A1 | 5/2005 | Brownholtz et al. |
| 2005/0117179 A1 | 6/2005 | Ito et al. |
| 2005/0132010 A1 | 6/2005 | Muller |
| 2005/0132053 A1 | 6/2005 | Roth et al. |
| 2005/0137873 A1 | 6/2005 | Liu et al. |
| 2005/0138552 A1 | 6/2005 | Venolia |
| 2005/0138576 A1 | 6/2005 | Baumert et al. |
| 2005/0144157 A1 | 6/2005 | Moody et al. |
| 2005/0144241 A1 | 6/2005 | Stata et al. |
| 2005/0144284 A1 | 6/2005 | Ludwig et al. |
| 2005/0144560 A1 | 6/2005 | Gruen et al. |
| 2005/0144568 A1 | 6/2005 | Gruen et al. |
| 2005/0144572 A1 | 6/2005 | Wattenberg et al. |
| 2005/0154765 A1 | 7/2005 | Seitz et al. |
| 2005/0172262 A1 | 8/2005 | Lalwani |
| 2005/0177789 A1 | 8/2005 | Abbar et al. |
| 2005/0183008 A1 | 8/2005 | Crider et al. |
| 2005/0185920 A1 | 8/2005 | Harper et al. |
| 2005/0188043 A1 | 8/2005 | Cortright et al. |
| 2005/0198573 A1 | 9/2005 | Ali et al. |
| 2005/0203975 A1 | 9/2005 | Jindal et al. |
| 2005/0216863 A1 | 9/2005 | Schumacher et al. |
| 2005/0222985 A1 | 10/2005 | Buchheit et al. |
| 2005/0223057 A1 | 10/2005 | Buchheit et al. |
| 2005/0223066 A1 | 10/2005 | Buchheit et al. |
| 2005/0223329 A1 | 10/2005 | Schwartz et al. |
| 2005/0234910 A1 | 10/2005 | Buchheit et al. |
| 2005/0240902 A1 | 10/2005 | Bunker et al. |
| 2005/0251757 A1 | 11/2005 | Farn |
| 2005/0256867 A1 | 11/2005 | Walther et al. |
| 2005/0278656 A1 | 12/2005 | Goldthwaite et al. |
| 2005/0289109 A1 | 12/2005 | Arrouye et al. |
| 2005/0289156 A1 | 12/2005 | Maryka et al. |
| 2005/0289158 A1 | 12/2005 | Weiss et al. |
| 2005/0289159 A1 | 12/2005 | Hadley et al. |
| 2006/0015816 A1 | 1/2006 | Kuehner et al. |
| 2006/0020962 A1 | 1/2006 | Stark |
| 2006/0026033 A1 | 2/2006 | Brydon |
| 2006/0026145 A1 | 2/2006 | Beringer et al. |
| 2006/0026213 A1 | 2/2006 | Yaskin et al. |
| 2006/0026242 A1 | 2/2006 | Kuhlmann |
| 2006/0036580 A1 | 2/2006 | Stata et al. |
| 2006/0036945 A1 | 2/2006 | Radtke et al. |
| 2006/0036946 A1 | 2/2006 | Radtke et al. |
| 2006/0036950 A1 | 2/2006 | Himberger et al. |
| 2006/0036964 A1 | 2/2006 | Satterfield et al. |
| 2006/0036965 A1 | 2/2006 | Harris et al. |
| 2006/0041545 A1 | 2/2006 | Heidloff et al. |
| 2006/0047644 A1 | 3/2006 | Bocking et al. |
| 2006/0053383 A1 | 3/2006 | Gauthier et al. |
| 2006/0059035 A1 | 3/2006 | Kraft et al. |
| 2006/0064434 A1 | 3/2006 | Gilbert et al. |
| 2006/0069604 A1 | 3/2006 | Leukart et al. |
| 2006/0069684 A1 | 3/2006 | Vadlamani et al. |
| 2006/0069686 A1 | 3/2006 | Beyda et al. |
| 2006/0074844 A1 | 4/2006 | Frankel et al. |
| 2006/0080303 A1 | 4/2006 | Sargent et al. |
| 2006/0080363 A1 | 4/2006 | Vadlamani et al. |
| 2006/0080468 A1 | 4/2006 | Vadlamani et al. |
| 2006/0085502 A1 | 4/2006 | Sundararajan et al. |
| 2006/0095865 A1 | 5/2006 | Rostom |
| 2006/0101051 A1 | 5/2006 | Carr et al. |
| 2006/0101350 A1 | 5/2006 | Scott |
| 2006/0111931 A1 | 5/2006 | Johnson et al. |
| 2006/0117249 A1 | 6/2006 | Hu et al. |
| 2006/0117302 A1 | 6/2006 | Mercer et al. |
| 2006/0129937 A1 | 6/2006 | Shafron |
| 2006/0132812 A1 | 6/2006 | Barnes et al. |
| 2006/0155689 A1 | 7/2006 | Blakeley et al. |
| 2006/0161849 A1 | 7/2006 | Miller et al. |
| 2006/0161863 A1 | 7/2006 | Gallo |
| 2006/0165105 A1 | 7/2006 | Shenfield et al. |
| 2006/0168522 A1 | 7/2006 | Bala |
| 2006/0173824 A1 | 8/2006 | Bensky |
| 2006/0173961 A1 | 8/2006 | Turski et al. |
| 2006/0184867 A1 | 8/2006 | Shpigel |
| 2006/0184896 A1 | 8/2006 | Foucher et al. |
| 2006/0200432 A1 | 9/2006 | Flinn et al. |
| 2006/0200455 A1 | 9/2006 | Wilson |
| 2006/0218500 A1 | 9/2006 | Suave et al. |
| 2006/0224946 A1 | 10/2006 | Barrett et al. |
| 2006/0242557 A1 | 10/2006 | Nortis, III |
| 2006/0242575 A1 | 10/2006 | Winser |
| 2006/0242591 A1 | 10/2006 | Van Dok |
| 2006/0248012 A1 | 11/2006 | Kircher et al. |
| 2006/0253830 A1 | 11/2006 | Rajanala et al. |
| 2006/0259449 A1 | 11/2006 | Betz et al. |
| 2006/0271869 A1 | 11/2006 | Thanu et al. |
| 2006/0271910 A1 | 11/2006 | Burcham et al. |
| 2006/0282784 A1 | 12/2006 | Taylor et al. |
| 2006/0282817 A1 | 12/2006 | Darst et al. |
| 2006/0294452 A1 | 12/2006 | Matsumoto |
| 2006/0294526 A1 | 12/2006 | Hambrick et al. |
| 2006/0294528 A1 | 12/2006 | Lund et al. |
| 2007/0006075 A1 | 1/2007 | Lection et al. |
| 2007/0006206 A1 | 1/2007 | Dhanjal et al. |
| 2007/0006327 A1 | 1/2007 | Lal et al. |
| 2007/0011258 A1 | 1/2007 | Koo |
| 2007/0016857 A1 | 1/2007 | Polleck et al. |
| 2007/0033250 A1 | 2/2007 | Levin et al. |
| 2007/0050182 A1 | 3/2007 | Sneddon et al. |
| 2007/0050401 A1 | 3/2007 | Young et al. |
| 2007/0050469 A1 | 3/2007 | Gupta et al. |
| 2007/0055936 A1 | 3/2007 | Dhanjal et al. |
| 2007/0055943 A1 | 3/2007 | McCormack et al. |
| 2007/0061306 A1 | 3/2007 | Pell et al. |
| 2007/0061307 A1 | 3/2007 | Hartwell et al. |
| 2007/0061308 A1 | 3/2007 | Hartwell et al. |
| 2007/0061705 A1 | 3/2007 | Ammerlaan et al. |
| 2007/0061738 A1 | 3/2007 | Taboada et al. |
| 2007/0083813 A1 | 4/2007 | Lui et al. |
| 2007/0094230 A1 | 4/2007 | Subramaniam et al. |
| 2007/0094597 A1 | 4/2007 | Rostom |
| 2007/0094608 A1 | 4/2007 | Getsch |
| 2007/0101299 A1 | 5/2007 | Shaw et al. |
| 2007/0106951 A1 | 5/2007 | McCormack et al. |
| 2007/0124696 A1 | 5/2007 | Mullender |
| 2007/0130276 A1 | 6/2007 | Zhang et al. |

(56) References Cited

U.S. PATENT DOCUMENTS

| | | |
|---|---|---|
| 2007/0143662 A1 | 6/2007 | Carlson et al. |
| 2007/0143671 A1 | 6/2007 | Paterson et al. |
| 2007/0156519 A1 | 7/2007 | Agassi et al. |
| 2007/0179841 A1 | 8/2007 | Agassi et al. |
| 2007/0180040 A1 | 8/2007 | Etgen et al. |
| 2007/0185826 A1 | 8/2007 | Brice et al. |
| 2007/0186212 A1 | 8/2007 | Mazzaferri et al. |
| 2007/0203991 A1 | 8/2007 | Fisher et al. |
| 2007/0209008 A1 | 9/2007 | Mori et al. |
| 2007/0234223 A1 | 10/2007 | Leavitt et al. |
| 2007/0234290 A1 | 10/2007 | Ronen et al. |
| 2007/0240057 A1 | 10/2007 | Satterfield et al. |
| 2007/0260996 A1 | 11/2007 | Jakobson |
| 2007/0266017 A1 | 11/2007 | Held et al. |
| 2007/0279417 A1 | 12/2007 | Garg et al. |
| 2007/0282956 A1 | 12/2007 | Staats |
| 2007/0283287 A1 | 12/2007 | Taylor et al. |
| 2007/0300168 A1 | 12/2007 | Bosma et al. |
| 2008/0005247 A9 | 1/2008 | Khoo |
| 2008/0005249 A1 | 1/2008 | Hart |
| 2008/0005274 A1 | 1/2008 | Subbanna et al. |
| 2008/0005686 A1 | 1/2008 | Singh |
| 2008/0034304 A1 | 2/2008 | Feuerbacher et al. |
| 2008/0040682 A1 | 2/2008 | Sorenson et al. |
| 2008/0046518 A1 | 2/2008 | Tonnison et al. |
| 2008/0046828 A1 | 2/2008 | Bibliowicz et al. |
| 2008/0052670 A1 | 2/2008 | Espinosa et al. |
| 2008/0077571 A1 | 3/2008 | Harris et al. |
| 2008/0098229 A1 | 4/2008 | Hartrell et al. |
| 2008/0104505 A1 | 5/2008 | Keohane et al. |
| 2008/0109787 A1 | 5/2008 | Wang et al. |
| 2008/0134138 A1 | 6/2008 | Chamieh et al. |
| 2008/0141156 A1 | 6/2008 | Reik et al. |
| 2008/0141242 A1 | 6/2008 | Shapiro |
| 2008/0155555 A1 | 6/2008 | Kwong |
| 2008/0168146 A1 | 7/2008 | Fletcher |
| 2008/0178110 A1 | 7/2008 | Hill et al. |
| 2008/0182651 A1 | 7/2008 | Marshall et al. |
| 2008/0209316 A1 | 8/2008 | Zandstra |
| 2008/0216014 A1 | 9/2008 | Kurtenbach et al. |
| 2008/0244440 A1 | 10/2008 | Bailey et al. |
| 2008/0263462 A1 | 10/2008 | Mayer-Ullmann et al. |
| 2009/0007003 A1 | 1/2009 | Dukhon et al. |
| 2009/0012984 A1 | 1/2009 | Ravid et al. |
| 2009/0031295 A1 | 1/2009 | Zhao et al. |
| 2009/0034618 A1 | 2/2009 | Fu et al. |
| 2009/0064090 A1 | 3/2009 | Anonsen et al. |
| 2009/0083656 A1 | 3/2009 | Dukhon et al. |
| 2009/0100009 A1 | 4/2009 | Karp |
| 2009/0106375 A1 | 4/2009 | Carmel et al. |
| 2009/0144651 A1 | 6/2009 | Sprang et al. |
| 2009/0152349 A1 | 6/2009 | Bonev |
| 2009/0158173 A1 | 6/2009 | Palahnuk et al. |
| 2009/0163183 A1 | 6/2009 | O'Donoghue et al. |
| 2009/0192845 A1 | 7/2009 | Gudipaty et al. |
| 2009/0205013 A1 | 8/2009 | Lowes |
| 2009/0217192 A1 | 8/2009 | Dean et al. |
| 2009/0217263 A1 | 8/2009 | Gebhart et al. |
| 2009/0222763 A1 | 9/2009 | Dukhon et al. |
| 2009/0249339 A1 | 10/2009 | Larsson et al. |
| 2009/0259950 A1 | 10/2009 | Sullivan et al. |
| 2009/0319619 A1 | 12/2009 | Affronti et al. |
| 2009/0319911 A1 | 12/2009 | McCann et al. |
| 2010/0011310 A1 | 1/2010 | Rainisto |
| 2010/0011319 A1 | 1/2010 | Gourdol et al. |
| 2010/0060645 A1 | 3/2010 | Garg et al. |
| 2010/0146478 A1 | 6/2010 | Head et al. |
| 2010/0159967 A1 | 6/2010 | Pounds et al. |
| 2010/0180226 A1 | 7/2010 | Satterfield et al. |
| 2010/0191818 A1 | 7/2010 | Satterfield et al. |
| 2010/0199261 A1 | 8/2010 | Shenfield et al. |
| 2010/0211889 A1 | 8/2010 | Durazo et al. |
| 2010/0223575 A1 | 9/2010 | Leukart et al. |
| 2010/0239470 A1 | 9/2010 | Pham-Huu et al. |
| 2010/0293470 A1 | 11/2010 | Zhao et al. |
| 2011/0041092 A1 | 2/2011 | Zhang |
| 2011/0055673 A1 | 3/2011 | Teng et al. |
| 2011/0055690 A1 | 3/2011 | Wason |
| 2011/0072396 A1 | 3/2011 | Giesen et al. |
| 2011/0138273 A1 | 6/2011 | Radtke et al. |
| 2011/0225249 A1 | 9/2011 | Forstall et al. |
| 2011/0296322 A1 | 12/2011 | Dhanjal et al. |
| 2011/0307798 A1 | 12/2011 | Lezama |
| 2012/0179993 A1 | 7/2012 | Himberger et al. |
| 2012/0215866 A1 | 8/2012 | Satterfield et al. |
| 2012/0324394 A1 | 12/2012 | Harris et al. |
| 2013/0014048 A1 | 1/2013 | Satterfield et al. |
| 2013/0159879 A1 | 6/2013 | Affronti et al. |
| 2013/0283207 A1 | 10/2013 | Dukhon et al. |
| 2013/0305141 A1 | 11/2013 | Wason |
| 2014/0019896 A1 | 1/2014 | Satterfield et al. |
| 2014/0115526 A1 | 4/2014 | Hartwell et al. |
| 2014/0132609 A1 | 5/2014 | Garg et al. |
| 2014/0258933 A1 | 9/2014 | Dukhon et al. |
| 2015/0220263 A1 | 8/2015 | Zhao et al. |
| 2015/0309679 A1 | 10/2015 | Dean et al. |
| 2015/0339281 A1 | 11/2015 | Dukhon et al. |
| 2015/0370771 A1 | 12/2015 | Dukhon et al. |
| 2016/0117069 A1 | 4/2016 | Harris et al. |
| 2017/0075952 A1 | 3/2017 | Hartwell et al. |
| 2017/0205971 A1 | 7/2017 | Himberger et al. |
| 2017/0212877 A1 | 7/2017 | Dukhon et al. |
| 2017/0262810 A1 | 9/2017 | McCann et al. |
| 2017/0357392 A1 | 12/2017 | Satterfield et al. |
| 2019/0197037 A1 | 6/2019 | Hartwell et al. |

FOREIGN PATENT DOCUMENTS

| | | |
|---|---|---|
| AU | 2006287408 B2 | 5/2011 |
| AU | 2007255043 | 8/2012 |
| AU | 2010216342 | 7/2014 |
| BR | PI0503986 | 3/2006 |
| CA | 2512047 A1 | 2/2006 |
| CA | 2750422 A1 | 8/2010 |
| CA | 2650016 | 9/2015 |
| CA | 2512036 | 11/2015 |
| CN | 1746914 | 3/2006 |
| CN | 1755599 | 4/2006 |
| CN | 1790243 A | 6/2006 |
| CN | 101604243 A | 12/2009 |
| CN | 102422255 A | 4/2012 |
| CN | 101243439 | 6/2012 |
| CN | 102067166 | 6/2013 |
| CN | 102317897 | 7/2013 |
| CN | 102077163 | 10/2013 |
| CN | 102077199 | 1/2014 |
| CN | 102422255 B | 11/2014 |
| CN | 201080021957.4 | 11/2014 |
| CN | 1553377 | 12/2014 |
| EP | 0584269 | 3/1994 |
| EP | 587394 | 3/1994 |
| EP | 115247 A1 | 6/1996 |
| EP | 0774722 | 5/1997 |
| EP | 0851368 | 7/1998 |
| EP | 0910007 | 4/1999 |
| EP | 1077405 | 2/2001 |
| EP | 1104151 | 5/2001 |
| EP | 1223503 | 7/2002 |
| EP | 1376337 | 1/2004 |
| EP | 1394713 | 3/2004 |
| EP | 1462951 | 9/2004 |
| EP | 1462999 | 9/2004 |
| EP | 1542133 | 6/2005 |
| EP | 1564652 | 8/2005 |
| EP | 1628197 | 2/2006 |
| EP | 1628198 | 2/2006 |
| EP | 1628199 | 2/2006 |
| EP | 1645972 | 4/2006 |
| EP | 1672518 | 6/2006 |
| EP | 1835434 | 9/2007 |
| EP | 1915001 | 4/2008 |
| GB | 2329813 | 3/1999 |
| GB | 2382683 | 6/2003 |
| GB | 2391148 | 1/2004 |

(56) References Cited

FOREIGN PATENT DOCUMENTS

| | | |
|---|---|---|
| ID | P0027717 | 3/2011 |
| ID | P0027754 | 3/2011 |
| ID | P0029297 | 10/2011 |
| JP | 03-043824 | 2/1991 |
| JP | 04-186425 | 7/1992 |
| JP | 04-312186 | 11/1992 |
| JP | 05-204579 | 8/1993 |
| JP | 06-052282 | 2/1994 |
| JP | H06202842 A | 7/1994 |
| JP | 06-342357 | 12/1994 |
| JP | H08255066 A | 10/1996 |
| JP | 09-204289 | 8/1997 |
| JP | 10-074217 | 3/1998 |
| JP | 2551757 | 11/1998 |
| JP | 10-326171 | 12/1998 |
| JP | 11-039292 | 2/1999 |
| JP | 11-175258 | 7/1999 |
| JP | 11-259200 | 9/1999 |
| JP | 2000353130 | 12/2000 |
| JP | 2001-034775 | 2/2001 |
| JP | 2001056741 A | 2/2001 |
| JP | 2001-503893 | 3/2001 |
| JP | 2001-109673 | 4/2001 |
| JP | 2001-222477 | 8/2001 |
| JP | 2001-337944 | 12/2001 |
| JP | 2002324055 | 11/2002 |
| JP | 2003-015719 | 1/2003 |
| JP | 2003-101768 | 4/2003 |
| JP | 2003-198630 | 7/2003 |
| JP | 2003-216427 | 7/2003 |
| JP | 2003-256258 | 9/2003 |
| JP | 2003-256302 | 9/2003 |
| JP | 2003-526820 | 9/2003 |
| JP | 2003-308145 | 10/2003 |
| JP | 2003-316630 | 11/2003 |
| JP | 2004-078512 | 3/2004 |
| JP | 2004-086893 | 3/2004 |
| JP | 2004086896 A | 3/2004 |
| JP | 2004-102803 | 4/2004 |
| JP | 2004-512578 | 4/2004 |
| JP | 2004-145569 | 5/2004 |
| JP | 2004-159261 | 6/2004 |
| JP | 2004-185464 | 7/2004 |
| JP | 2004-318842 | 11/2004 |
| JP | 2004-342115 | 12/2004 |
| JP | 2005-025550 | 1/2005 |
| JP | 2005-31995 | 2/2005 |
| JP | 2005-032041 | 2/2005 |
| JP | 2005115914 | 4/2005 |
| JP | 2005-182353 | 7/2005 |
| JP | 2005-236089 | 9/2005 |
| JP | 2005322082 | 11/2005 |
| JP | 2005-352849 | 12/2005 |
| JP | 2006-059358 | 3/2006 |
| JP | 2007-280180 | 10/2007 |
| JP | 2007-531165 | 11/2007 |
| JP | 2008-047067 | 2/2008 |
| JP | 2008-117019 | 5/2008 |
| JP | 2009-507311 | 2/2009 |
| JP | 4832024 | 12/2011 |
| JP | 5021185 | 6/2012 |
| JP | 5079701 | 9/2012 |
| JP | 5139984 | 11/2012 |
| JP | 5190452 | 2/2013 |
| JP | 5193042 | 2/2013 |
| JP | 5221757 | 3/2013 |
| JP | 5266384 | 5/2013 |
| JP | 5480894 | 2/2014 |
| JP | 5486595 | 2/2014 |
| JP | 5559817 | 6/2014 |
| JP | 5559845 | 6/2014 |
| JP | 5597698 | 8/2014 |
| KR | 1020010008081 A | 2/2001 |
| KR | 20010091344 A | 10/2001 |
| KR | 1020010091344 | 10/2001 |
| KR | 1020020004723 A | 1/2002 |
| KR | 1020020011415 A | 2/2002 |
| KR | 1020020037560 A | 5/2002 |
| KR | 1020020066643 | 8/2002 |
| KR | 1020020072039 A | 9/2002 |
| KR | 100359378 | 10/2002 |
| KR | 10-2003-0070685 | 2/2003 |
| KR | 100388254 | 6/2003 |
| KR | 1020030072539 | 9/2003 |
| KR | 20040071813 | 8/2004 |
| KR | 100450881 B1 | 9/2004 |
| KR | 10-2005-0023805 | 3/2005 |
| KR | 10-2005-0036702 | 4/2005 |
| KR | 1020050072073 A | 7/2005 |
| KR | 20060023005 A | 3/2006 |
| KR | 10-2006-0046735 | 5/2006 |
| KR | 10-2007-0000506 | 1/2007 |
| KR | 1020070116957 A | 12/2007 |
| KR | 10-2008-0002811 | 1/2008 |
| KR | 1020080021262 A | 3/2008 |
| KR | 10-2008-0041234 | 5/2008 |
| KR | 10-2008-0042852 | 5/2008 |
| KR | 20080041211 A | 5/2008 |
| KR | 1020080072073 A | 8/2008 |
| KR | 10-1130421 | 3/2012 |
| KR | 101129221 | 3/2012 |
| KR | 10-1149960 | 5/2012 |
| KR | 10-1149990 | 5/2012 |
| KR | 10-1159334 | 6/2012 |
| KR | 101161564 | 7/2012 |
| KR | 10-1238559 | 2/2013 |
| KR | 10-1298338 | 8/2013 |
| KR | 10-1298461 | 8/2013 |
| KR | 10-1312867 | 9/2013 |
| KR | 10-1323011 | 10/2013 |
| MX | 315932 | 12/2013 |
| MX | 322458 | 4/2014 |
| MX | 323275 | 9/2014 |
| MX | 323276 | 9/2014 |
| MY | 146456 | 8/2012 |
| MY | 147334 | 7/2013 |
| MY | 149803 | 10/2013 |
| PH | 1-2005-000404 | 8/2011 |
| PH | 1-2005-000495 | 3/2014 |
| PH | 1-2008-500356 | 8/2014 |
| RU | 2001-122576 | 9/2003 |
| RU | 2216119 C2 | 11/2003 |
| RU | 2222045 C2 | 1/2004 |
| RU | 2242050 C1 | 12/2004 |
| RU | 2004108142 A | 8/2005 |
| RU | 2005103645 | 7/2006 |
| RU | 2005-116667 | 11/2006 |
| RU | 2005-120362 | 1/2007 |
| RU | 2005-130357 | 4/2007 |
| RU | 2322687 | 4/2008 |
| RU | 2327205 | 6/2008 |
| RU | 2328034 | 6/2008 |
| RU | 2332728 | 8/2008 |
| RU | 2347261 C2 | 2/2009 |
| RU | 2537776 | 1/2015 |
| TW | 420953 | 2/2001 |
| TW | 460839 | 10/2001 |
| TW | 490652 | 6/2002 |
| TW | 527812 | 4/2003 |
| TW | 2003-05097 | 10/2003 |
| TW | 569122 | 1/2004 |
| TW | 200514018 | 4/2005 |
| TW | I254878 | 5/2006 |
| TW | 2008-14632 | 3/2008 |
| TW | I368852 | 7/2012 |
| TW | I389002 | 3/2013 |
| TW | I389043 | 3/2013 |
| TW | I401577 | 7/2013 |
| TW | 201424755 A | 7/2014 |
| TW | I512591 | 12/2015 |
| WO | 92/21091 | 11/1992 |
| WO | 94/20921 | 9/1994 |
| WO | 9517732 A1 | 6/1995 |
| WO | 96/10231 | 4/1996 |

(56) References Cited

FOREIGN PATENT DOCUMENTS

| | | |
|---|---|---|
| WO | 96/39654 | 12/1996 |
| WO | 98/20410 | 5/1998 |
| WO | 99/04353 | 1/1999 |
| WO | 99/27495 | 6/1999 |
| WO | 01/055894 | 8/2001 |
| WO | 177795 A2 | 10/2001 |
| WO | 02/091162 | 11/2002 |
| WO | 03/003240 | 1/2003 |
| WO | 3058519 | 7/2003 |
| WO | 03/098500 | 11/2003 |
| WO | 2004/027672 | 4/2004 |
| WO | 2004056250 | 7/2004 |
| WO | 2004086250 A1 | 10/2004 |
| WO | 2005103900 A1 | 11/2005 |
| WO | 2007001636 | 1/2007 |
| WO | 07/027737 A1 | 3/2007 |
| WO | 07/033159 | 3/2007 |
| WO | 2007/030696 | 3/2007 |
| WO | 2007/030727 | 3/2007 |
| WO | 2007/036762 | 4/2007 |
| WO | 2007064480 | 6/2007 |
| WO | 2008/027477 | 3/2008 |
| WO | 2008/121718 | 10/2008 |
| WO | 2009123801 A1 | 10/2009 |
| WO | 2009/158151 | 12/2009 |
| WO | 2009/158171 | 12/2009 |
| WO | 2009/158172 | 12/2009 |
| ZA | 2010/07809 | 2/2012 |
| ZA | 2010/07810 | 2/2012 |
| ZA | 2010/07875 | 2/2012 |
| ZA | 2011/04850 | 12/2012 |

OTHER PUBLICATIONS

U.S. Appl. No. 14/635,605, Notice of Allowance dated Sep. 12, 2017, 2 pgs.
U.S. Appl. No. 14/665,112, Notice of Allowance dated Sep. 8, 2017, 16 pgs.
Thailand Office Action in Application 0501003163, dated Aug. 22, 2017, 3 pgs.
Thailand Office Action in Application 0501003164, dated Aug. 22, 2017, 3 pgs.
European Summons to Attend Oral Proceedings in Application 05107157.9, dated Sep. 15, 2017, 7 pgs.
Notice of Allowance in U.S. Appl. No. 10/955,942, dated Oct. 14, 2011, 7 pgs.
Notice of Allowance in U.S. Appl. No. 10/955,942, dated Jun. 23, 2011, 17 pgs.
Notice of Allowance in U.S. Appl. No. 10/955,942, dated Mar. 15, 2011, 8 pgs.
Notice of Allowance in U.S. Appl. No. 10/955,942, dated Jan. 11, 2011, 10 pgs.
Notice of Allowance in U.S. Appl. No. 10/955,942, dated Dec. 3, 2010, 13 pgs.
Notice of Allowance in Australian Patent Application 2005203412, dated May 19, 2010, 3 pages.
Notice of Allowance Issued in Chinese Patent Application No. 200510092139.4, dated Oct. 16, 2009, 4 Pages.
Notice of Allowance Issued in Russian Patent Application No. 2005125836, dated Jun. 22, 2010, 21 Pages.
Notice of Allowance and Search Report Issued in Taiwan Patent Application No. 94123421, dated Mar. 29, 2012, 6 Pages.
Notice of Allowance Issued in Malaysian Patent Application No. PI20053259, dated Oct. 15, 2012, 2 Pages.
European Office Action Issued in Patent Application No. 06803424.8, dated Aug. 17, 2017, 12 Pages.
Woody Leonhard, et al., "Saving Time with Google", In Book-Windows XP Timesaving Techniques for Dummies, Wiley Publishing Inc., Jan. 13, 2005, pp. 229-238.
U.S. Appl. No. 14/226,421, Office Action dated Nov. 2, 2017, 8 pgs.
U.S. Appl. No. 14/665,112, USPTO Response after 312 Amendment dated Oct. 4, 2017, 2 pgs.
U.S. Appl. No. 14/981,404, Office Action dated Nov. 1, 2017, 16 pgs.
European Decision to Refuse in Application 09767220.8, dated Sep. 18, 2017, 4 pages.
U.S. Appl. No. 12/163,758, Notice of Allowance dated Apr. 4, 2013, 7 Pages.
Chinese Notice of Allowance Issued in Chinese Patent Application No. 200980124945.1, dated Jun. 26, 2013, 4 Pages.
Notice of Allowance Issued in Russian Patent Application No. 2010153223, dated May 23, 2013, 20 Pages.
Japanese Notice of Allowance Issued in Japanese Patent Application No. 2011-516400, dated Apr. 2, 2013, 6 Pages.
Canadian Notice of Allowance Issued in Canadian Patent Application No. 2725298, dated Oct. 27, 2015, 1 Page.
Canadian Office Action Issued in Canadian Patent Application No. 2725298, dated Jun. 30, 2014, 1 Page.
Taiwan Notice of Allowance Issued in Taiwan Patent Application No. 98119245, dated Oct. 15, 2014, 4 Pages.
Canadian Office Action Issued in Canadian Patent Application No. 2848700, dated Sep. 29, 2017, 4 Pages.
Brazilian Office Action Issued in Brazil Patent Application No. PI0506081-8, dated Sep. 19, 2017, 5 Pages.
U.S. Appl. No. 14/816,844, Office Action dated Dec. 5, 2017, 28 pages.
Jensen Harris, "Picture This: A New Look for Office", Mar. 9, 2006; blogs.msdn.microsoft.com; pp. 1-91.
Scott Lowe, "An introduction to the Microsoft Office 2007 ribbon interface", Dec. 11, 2006; TechRepublic; pp. 1-11.
U.S. Appl. No. 14/841,698, Office Action dated Dec. 4, 2017, 29 pages.
"NEO Pro—the total "find that email" solution!", Retrieved from «http://www.caelo.com/products/learn/», Retrieved Date: Sep. 15, 2005, 1 Page.
VisNetic Mail Flow, Retrieved from: «https://web.archive.org/web/20050924035746/http://www.deerfield.com/products/visnelic-mailflow/», Retrieved Date: Sep. 15, 2005, 1 Page.
PCT International Search Report and Written Opinion Issued in PCT Application No. PCT/US2009/044059, dated Nov. 30, 2009, 11 Pages.
PCT International Search Report & Written Opinion Issued in PCT Application No. PCT/US2009/044292, dated Dec. 24, 2009, 14 Pages.
Israel Office Action Issued in Israel Patent Application No. 209011, dated Dec. 25, 2013, 5 Pages.
European Supplementary Search Report Issued in European Patent Application No. 09770706.1, dated Nov. 14, 2017, 8 Pages.
"Search Report Issued in European Patent Application No. 05107184.3", dated Mar. 7, 2012, 7 Pages.
"Office Action Issued in Indian Patent Application No. 06296/CHENP/2008", dated Jul. 13, 2016, 9 Pages.
European Search Report Issued in European Patent Application No. 09770705.3, dated Dec. 14, 2017, 8 Pages.
"Notice of Allowance Issued in U.S. Appl. No. 11/445,393", dated Apr. 16, 2013, 6 Pages.
"Notice of Allowance Issued in U.S. Appl. No. 11/445,393", dated Nov. 10, 2011, 5 Pages.
"Notice of Allowance Issued in U.S. Appl. No. 12/574,256", dated Sep. 19, 2013, 14 Pages.
U.S. Appl. No. 13/437,031, Office Action dated Feb. 23, 2018, 9 pgs.
"Notice of Allowance Issued in Japanese Patent Application No. 2009-513223", dated Dec. 28, 2012, 6 Pages.
"Office Action Issued in Israel Patent Application No. 194785", dated Feb. 28, 2012, 4 Pages.
"Notice of Allowance Issued in Malaysian Patent Application No. PI20084401", dated Aug. 30, 2013, 2 Pages.
"Notice of Allowance Issued in Australian Patent Application No. 2007255043", dated Apr. 4, 2012, 3 Pages.
"Notice of Allowance Issued in Chinese Application No. 200780020312.7", dated Jul. 2, 2015, 4 Pages.

(56) References Cited

OTHER PUBLICATIONS

"Notice of Allowance Issued in Russian Patent Application No. 2008147090", dated Aug. 16, 2011, 15 Pages.
"Office Action Issued in Russian Patent Application 2010140069", dated Aug. 15, 2013, 5 Pages.
"2007 Microsoft Office System is Golden", Microsoft News Center, Nov. 6, 2006, 23 Pages.
"About Google Desktop Search", http://www.desktop.google.com/about.html, Oct. 15, 2004, 8 pages.
"Convert to Word 2007," http://www.regencytraining.com/word-2007-conversion.html, Regency Training and Consulting, 2 pages (Date Printed Apr. 21, 2008).
"Create Office add-ins: ribbons, toolbars, taskpanes, menus etc.", http://www.add-in-express.com/creating-addins-blog/feed/, Jul. 4, 2007, 49 pgs. (added per B. Haslam, Jan. 26, 2011, references cited from U.S. Pat. No. 7,802,199 Sep. 21, 2010 Patent).
"Customer Story: SourceXtreme," SourceXtreme—Trolltech, http://trolltech.com/customers/casestories/stories/sourcextreme/?searchterm=sourcextreme, 2 pages (Date Printed Apr. 22, 2008).
"ID & Class Selectors, Pseudoclasses," http://www.webreference.com/html/tutorial5/6.html, Aug. 20, 1998, 3 pgs.
"Index Card Metaphor for Multiple Property Sheets Associated with a Given Object"; IBM Technical Disclosure Bulletin, International Business Machines Corp., vol. 33, No. 3A, Aug. 1, 1990, 2 pgs. (cited in Feb. 15, 2012 Search Report 60001.0411EPU1) (also cited in EESR Jan. 10, 2013 in 325993.09).
"Inter-Widget Communication," http://web.mit.edu/6.115/www/miscfiles/amulet/amulet-help/IWC.htm, 6 pages (Feb. 13, 2007).
"Look and Layout", retrieved at «http://liv.ac.uk/csd/email/outlook/layout.htm», University of Liverpool, retrieved Mar. 3, 2008, 9 pgs. ( 1826US01 Search Rpt).
"Lookout", http://www.lookoutsoft.com, Apr. 22, 2005, 20 pages.
"Menu Selection Method for Related Attributes"; IBM Technical Disclosure Bulletin, International Business Machines Corp., vol. 33, No. 6B, Nov. 1990, 3 pgs. (cited in Feb. 15, 2012 Search Report 60001.0411EPU1).
"Microsoft reinvents its own wheel", http://www.theinquirer.net/default.aspx?article=20214, Dec. 14, 2004, 5 pages.
"Microsoft Desktop Search (beta)", http://www.pcmag.com/article2/0,1895,1771841,00.asp, Mar. 2, 2005.
"Microsoft Enters Desktop Search Fray", http://www.internetnews.com/ent-news/article.php/3447331, Dec. 13, 2004, 5 pages.
"Microsoft Office 2003 Editions Product Guide", Published on: Sep. 2003, Available at: tp://www.google.ca/url?sa=t&rct=j&q=&esrc=s&frm=1&source=web&cd=3&ved=0CCoQFjAC&url=http%3A%2F%2Fdownload.microsoft.com%2Fdownload%2F0%2Ff%2F1%2F0f1d5b1f-53bc-47c3-bf6f-ac6d67cf9766%2FOffice2003Guide.doc&ei=CKTkVPBCgb-xBL6qgvAH&usg=AFQjCNEpNk4IFH6m27BXr48IKv1kRXo_xA, 167 pgs. (cited in Feb. 19, 2015 CA OA, 60001.0410CAD1 / MS 309411.28).
"Microsoft Office Professional Plus 2007", © 2006, Microsoft Corporation; 66 pgs. (cited in NOA Dec. 3, 2010, 14917.0411usu1).
"Microsoft Outlook 2000: Introduction to Calendar," Version 2002. 03.25, http://www.uakron.edu/its/learning/training/docs/Calendar032502.pdf, Mar. 25, 2002, pp. 1-52.
"Preview Pane in Conversation: 4 pane view", 2005, Zinbra Inc., retrieved Mar. 3, 2008, 3 pgs. ( 1826US01 Search Rpt).
"Primary Windows," Accessed at http://www-03.ibm.com/servers/eserver/iseries/navigator/guidelines/primary.html on Feb. 23, 2007, 23 pgs.
"Reading Pane in Conversation View", retrieved at «http://www.zimbra.com/forums/users/5918-reading-pane-conversation-view.html», retrieved Mar. 3, 2008, 5 pgs.
"RibbonX API: Extend the 2007 Office System with Your Own Ribbon Tabs and Controls", 2007, Microsoft Corporation, http://msdn.microsoft.com/msdnmag/issues/07/02RibbonX/de-fault.aspx (added per B. Haslam, Jan. 26, 2011, references cited from 7,802,199 09.21.2010 Patent).
"Separate Structure and Presentation," http://www.webreference.com/html/tutorial5/1.html, Aug. 20, 1998, 4 pgs.

"TeeChart for .NET Charting Control," Steema Software; accessed at: http://www.teechart.net/; accessed on Jan. 11, 2006.
"The New "Office 2007" User Interface", Microsoft Corporation © 2005, 32 pgs. (cited in 1275US01 IDS filed May 11, 2009).
"The New Look in Office 12 / Office 2007", Office Watch, posted Sep. 20, 2005, 9 pgs. (cited in 1275US01 IDS filed May 11, 2009).
"The Style Element & CSS Selectors," http://www.webreference.com/html/tutorial5/4.html, Aug. 20, 1998, 3 pgs.
"The Technology in Document and Check Security," http://www.securedoc.in/thetechnology.htm, 7 pages (Date Printed Apr. 21, 2008).
"User Interface Architecture", Retrieved from «http://www.datamaster2003.com/uiarchitecture.htm», 2003, 2 Pages.
"What's Hot in Internet Services?" http://www.webreference.com/html/tutorial5/3, Aug. 20, 1998, 3 pgs.
"What's New in Excel 2007", Feb. 26, 2007 (added per B. Haslam, Jan. 26, 2011, references cited from 7,802,199 09.21.2010 Patent).
"Windows Desktop Search". Http://kunal.kundale.net/reviews/wds.html, Jul. 10, 2005, 7 pages.
"Yahoo to test desktop search", http://news.com.com/yahoo+to+test+desktop+searcach/2100-1032_3-5486381.html, Dec. 9, 2004, 6 pages.
"Managing the Code Editor and View" Microsoft Corporation, http://msdn.microsoft.com/en-us/library/z01zks9a(VS.71).aspx, 2008.
"Omni Web Help," Omni Group, 2004, http://www.omnigroup.com/documentation/omniweb/browser/tabs.html, 2 pages.
"Rainy's Rainlendar" [online], Aug. 12, 2004, http://web.archive.org/web/20040811043048/www.ipi.fi/~rainy/Rainlendard/Manual.html and http://web.archive.org/web/20040812092939/http://www.ipi.fi/~rainy/index.php?pn=probjects&project=rainlendar>.
"To-do List—effective task management software" [on line], Aug. 3, 2004, http://web.archive.org/web/20040804103245/www.htpshareware.com/todolist/changes.txt and http://web.archive.org/web/20040803075026/www.htpshareware.com/todolist/index.htm>.
Adler, "Emerging Standards for Component Software," Cybersquare, 1995 IEEE, 10 pgs. (added per B. Haslam, references cited from 7,865,868 Jan. 4, 2011 Patent).
Agarwal, Vikash K., "Creating a Visually Arresting User-Interface: A3D Tab Control Example," Jan. 4, 2008, http://microsoft.apress.com/asptodayarchive/71723/creating-a-visually-arresting-user-interface-a-3d-tab-control-example, 12 pages.
Akamatsu, "Touch with a Mouse, A Mouse Type Interface Device with Tactile and Force Display"; © IEEE; 1995; 5 pgs. (cited in Nov. 24, 2014 NOA).
Alexander, Keeping New Messages Marked 'Unread' (2007), http://certcities.com/editorial/colums/story.asp?EditorialsD=243, 2 pgs. (cited in Dec. 31, 2012 OA).
Ando, R. et al., "Visualization-enabled multi-document summarization by Iterative Residual Rescaling," Natural Language Engineering, vol. 11, No. 1, pp. 67-86 (Mar. 2005) (2 page Abstract).
Andrew Dwelly, "Functions and Dynamic User Interface," 1989, ACM, pp. 371-381.
Aoyagi, Hideo, "Mail Mac Fan Special 33"; Manichi Communications Inc., Mar. 1, 2004, 5 pgs. (cited in JP NOR Nov. 25, 2011).
Atwood, "Sometime a Word is Worth a Thousand Icons", Coding Horror, Feb. 22, 2006, 9 pgs. (cited in 1275US01 IDS filed May 11, 2009).
Australia Notice of Allowance Issued in Patent Application No. 2010216342, dated Jun. 25, 2014, 2 Pages.
Australian Notice of Allowance Issued in Patent Application No. 2005203411, dated Jul. 15, 2010, 3 Pages.
Australian Notice of Allowance Received for Australia Patent Application No. 2009262833, dated Apr. 16, 2014, Filed Date: Jun. 5, 2009, 2 Pages.
Australian OA dated Jan. 17, 2011 cited in Application No. 2006287408; 2 pgs.
Australian Office Action dated Apr. 30 2014 in Appln No. 2010247882, 3 pgs.
Australian Office Action dated Apr. 8, 2010 cited in Appln No. 2005203410; 2 pgs.
Australian Office Action dated Aug. 31, 2011 cited in Appln. No. 2007255043; 3 pgs.

(56) References Cited

OTHER PUBLICATIONS

Australian Office Action dated Feb. 28, 2014 in Appln No. 2009262833, 3 pgs.
Australian Office Action dated Feb. 28, 2014 in Appln No. 2009262834, 3 pgs.
Australian Office Action dated Mar. 25, 2010 cited in Appln No. 2005203411, 2 pgs.
Australian Office Action dated Mar. 25, 2010 cited in Appln No. 2005203412; 2 pgs.
Australian Office Action dated Mar. 26, 2010 cited in Appln No. 2005203409; 1 pg.
Australian Office Action dated Mar. 4, 2014 in Appln No. 2009260596, 4 pgs.
Australian Office Action dated Mar. 4, 2014 in Appln No. 2009271517, 3 pgs.
Australian Office Action dated May 28, 2010 cited in Appln No. 2005202717; 2 pgs.
Australian Office Action dated Oct. 21, 2010 cited in Appln No. 2006284908; 2 pgs.
Australian Office Action Issued in Patent Application No. 2010216342, dated Mar. 14, 2014, Filed Date: Jan. 22, 2010, 3 Pages.
Australian Search Report dated Jan. 16, 2007 cited in Singapore Application No. 200504474-8; 8 pgs.
Australian Second Office Action dated Apr. 29, 2014 in Appln No. 2009271517, 3 pgs.
Australian Second Office Action Issued in Patent Application No. 2010216342, dated May 12, 2014, Filed Date: Jan. 22, 2010, 3 Pages.
Australian Written Opinion/Search Report cited in Singapore Application No. 200505257-6 dated Feb. 12, 2007; 6 pgs.
AutoCAD 2011—Customization Guide; Feb. 2010; Autodesk, Inc.; http://images.autodesk.com/adsk/files/acad_acg.pdf; 554 pgs. (Cited in Apr. 10, 2012 NOA).
Baker; "Configuring the Pages Pane in Acrobat"; Apr. 22, 2004; Planet PDF; 4 pgs. (cited in Mar. 19, 2015 NOA).
Barr, Jim, "Gmail Tips—The Complete Collection", Retrieved Date: Dec. 15, 2004, https://web.archive.org/web/20041215091758/http://g04.com/misc/GmailTipsComplete.html,18 pgs.
Bateman, et al., "Towards Constructive Text, Diagram, and Layout Generation for Information Presentation", in Association for Computational Linguistics, vol. 27, Issue 3, Sep. 2001, pp. 409-449.
Becker et al., "Virtual Folders: Database Support for Electronic Messages Classification," Pontificia Universidade Catolica do Rio Grande do Sul, Porto Alegre, Brazil, pp. 163-170, Oct. 1997.
Bellavista et al., "A Mobile Agent Infrastructure for Terminal, User, and Resource Mobility", Network Operations and Management Symposium, IEEE NOMS 2000, pp. 877-890, 2000.
Berliner E.M. et al., "Microsoft Office 2003", Feb. 24, 2004, p. 173-178 [D2], "Using the Insert Menu. Inserting and Formatting a Picture in Word", 13 pgs.
Berliner E.M. et al., "Microsoft Office 2003", Feb. 24, 2004, p. 39-40, 120-124, 175-177, 233-234 [D1], "Viewing a Document in the Microsoft Office 2003 Application Window",23 pgs.
Bill Dyszel, Microsoft Outlook 2000 for Windows for Dummies, Copyright 1999, pp. 82-86, 102-103, 141,143.
Billo, E. Joseph. "Creating Charts: An Introduction," in Excel for Chemists: A Comprehensive Guide, http://www.ahut.edu.cn/yxsz/ahk/Teaching/Excel%for%20Chemists/ChQ2.pdf, Second Edition, John Wiley & Sons, Mar. 16, 2001; 9 pages.
Bos, B, "Re: A proposal for addition to HTML 3.0: Frames," http://www.nyct.net/~aray/htmlwg/95q3/1141.html, 5 pages (Sep. 21, 1995).
Boyce, "Microsoft Outlook Inside Out," 2001, pp. 133, 134, 721-728.
Boyce, "Microsoft Outlook Inside Out," 2001, pp. 67, 68, 109, 110, 230, 231, 310, 316-318, 798.
Budinsky et al., "WebSphere Studio Overview," http://researchweb.watson.ibm.com/journal/sj/432/budinsky.html, May 6, 2004, 25 pgs.
Camarda, Using Microsoft Word 97, copyright 1997, QUE Corporation, pp. 412, 869.

Canada Notice of Allowance Issued in Patent Application No. 2,848,667, dated Oct. 6, 2015, 1 Page.
Canadian Notice of Allowance dated Jun. 2, 2015 in Appln No. 2,512,036, 1 pg.
Canadian Notice of Allowance in Application 2750422, dated Mar. 10, 2016, 1 page.
Canadian Notice of Allowance Issued in Patent Application No. 2512047, dated Oct. 2, 2014, 1 Page.
Canadian Office Action dated Apr. 25, 2014 in Appln No. 2,512,155, 9 pgs.
Canadian Office Action dated Aug. 3, 2015 in Appln No. 2,724,201, 5 pgs.
Canadian Office Action dated Dec. 5, 2013 in Appln No. 2,618,169, 3 pgs.
Canadian Office Action dated Feb. 19, 2015 in Appln No. 2,848,667, 5 pgs.
Canadian Office Action dated Feb. 19, 2015 in Appln No. 2,848,700, 4 pgs.
Canadian Office Action dated Jan. 18, 2013 in Appln No. 2,512,155, 6 pgs.
Canadian Office Action dated Jan. 28, 2014 in Appln No. 2,511,101, 4 pgs.
Canadian Office Action dated Jul. 14, 2015 in Appln No. 2,725,046, 5 pgs.
Canadian Office Action dated Jul. 30, 2014 cited in Appln No. 2,512,102, 7 pgs.
Canadian Office Action dated Jul. 30, 2014 cited in Appln No. 2,512,155, 8 pgs.
Canadian Office Action dated May 26, 2015 cited in Appln No. 2,618,169, 4 pgs.
Canadian Office Action dated Nov. 15, 2013 in Appln No. 2,512,102; 3 pgs.
Canadian Office Action dated Nov. 23, 2012 cited in Appln No. 2,512,102; 5 pgs.
Canadian Office Action dated Nov. 29, 2012 cited in Appln No. 2,511,101 3 pgs.
Canadian Office Action dated Nov. 29, 2012 cited in Appln No. 2,512,036, 2 pgs.
Canadian Office Action dated Nov. 29, 2012 cited in Appln No. 2,512,047; 4 pgs.
Canadian Office Action dated Oct. 16, 2015 in Appln No. 2,724,681, 7 pgs.
Canadian Office Action dated Oct. 30, 2013 in Appln No. 2,512,047; 3 pgs.
Canadian Office Action dated Oct. 7, 2013 in Appln No. 2,650,016; 2 pgs.
Canadian Office Action dated Sep. 18, 2013 in Appln No. 2,512,036; 3 pgs.
Canadian Office Action dated Sep. 30, 2014 in Appln No. 2,617,182, 3 pgs.
Canadian Office Action dated Sep. 4, 2014 in Appln No. 2,512,036, 3 pgs.
Canadian Office Action in Application 2512155, dated Aug. 26, 2016, 4 pgs.
Canadian Office Action Issued for Patent Application No. 2618169, dated Sep. 9, 2014, 4 pgs.
Canadian Office Action Issued in Application No. 2,848,700, dated Oct. 15, 2015, 4 Pages.
Canadian Office Action Issued in Patent Application No. 2,512,155, dated Nov. 30, 2015, 7 Pages.
Canadian Office Action Issued in Patent Application No. 2724681, dated Apr. 15, 2016, 5 Pages.
Canadian Office Action Issued in Patent Application No. 2848700, dated May 2, 2016, 4 Pages.
Chamberland, et al., "IBM VisualAge for Java," vol. 37, No. 3, 1998, 26 pgs., http://researchweb.watson.ibm.com/journal/sj/373/chamberland.html [Accessed Feb 6, 2007] (added per B. Haslam, references cited from 7,865,868 Jan. 4, 2011 Patent).
Changing a Graph Type: Ultimate Illustration of Excel 2002 for Windows XP, General Book, X-media Corp., Aug. 31, 2002, p. 224 (cited in May 11, 2012 JP NOR).
Charles Rich et al., "Adding a Collaborative Agent to Graphical User Interfaces," 1996, ACM, pp. 21-30.

(56) References Cited

OTHER PUBLICATIONS

Charles Rich et al., "Segmented Interaction History in a Collaborative Interface Agent," 1997, ACM, pp. 23-30.
Chen et al., "NiagaraCQ: A Scalable Continuous Query System for Internet Databases," Int. Conf. on Management of Data, Proc. of the 2000 ACM SIGMOD Int. Conf. on Management of Data, pp. 379-390, 2000.
Chile Office Action Issued in Patent Application No. 1770-2005, dated Feb. 9, 2010, 7 Pages. (W/out English translation).
Chile Office Action Issued in Patent Application No. 1770-2005, dated Mar. 13, 2009, 10 Pages, with English translation.
Chilean Notice of Allowance in Application 201101987, dated Mar. 30, 2016, 2 pgs; (w/o English translation).
Chilean Office Action dated Mar. 28, 2008 cited in Appln No. 1770-05, no English Translation; 5 pgs.
Chilean Office Action dated Mar. 29, 2012 cited in Appln No. 1559-2010, w/English Language Summary; 7 pgs.
Chilean Office Action dated Mar. 29, 2012 cited in Appln No. 1560-2010, w/English Language Summary; 7 pgs.
Chilean Office Action dated Mar. 30, 2014 in Appln No. 2804-2011, 7 pgs.
Chilean Office Action dated Nov. 27, 2008 cited in Appln No. 1768-2005; 10 pgs.
Chilean Office Action dated Nov. 27, 2008 cited in Appln No. 1769-2005; 11 pgs.
Chilean Office Action dated Oct. 24, 2014 in Appln No. 2804-2011, 5 pgs. (w/o English Translation).
Chilean Office Action dated Sep. 23, 2008 cited in Appln No. 1770-2005; 10 pgs.
Chilean Office Action in Application 200501769, dated Sep. 2, 2016, 2 pgs. (no English translation).
Chilean Office Action in Application 200501770, dated Sep. 2, 2016, 2 pgs. (no English translation).
Chilean Office Action in Appln No. 2005-01769, dated Jul. 15, 2005, 11 pgs. (with English translation).
Chilean Office Action Received in Patent Application No. 2804-2011, dated Apr. 4, 2014, 7 Pages. (w/o English Translation).
Chilean Second Office Action dated Dec. 4, 2009 cited in Appln No. 1768-2005; 6 pgs.
Chilean Second Office Action dated Jan. 29, 2010 cited in Appln No. 1769-2005; 7 pgs.
Chilean Second Office Action dated Jun. 6, 2014 in Appln No. 1987-2011, 12 pgs.
Chilean Second Office Action dated Mar. 4, 2009 cited in Appln No. 2512-2005; 12 pgs.
Chilean Second Office Action dated Nov. 21, 2012 cited in Appln No. 1559-2010; 6 pgs.
Chilean Second Office Action dated Nov. 4, 2009 cited in Appln No. 1770-2005; 2 pgs.
Chilean Second Office Action dated Sep. 21, 2012 cited in Appln No. 1560-2010, w/English Language Summary; 8 pgs.
Chilean Third Office Action dated Oct. 9, 2013 in Appln No. 2512-2005; 7 pgs.
Chinese 2nd Notice on Reexamination dated Mar. 25, 2011 cited in Appln No. 200510089514.X; 9 pgs.
Chinese Decision on Reexamination dated Feb. 1, 2012 cited in Appln No. 200510089514.X; 23 pgs.
Chinese Decision on Reexamination dated Nov. 18, 2014 in Appln. No. 200910148820.4, 15 pgs.
Chinese Decision on Rejection dated Jan. 13, 2014 in Appln No. 200980124644.9, 9 pgs.
Chinese Decision on Rejection dated Jul. 21, 2011 cited in Appln No. 20068032789.2; 11 pgs.
Chinese Decision on Rejection dated Jul. 31, 2012 cited in Appln No. 200680018095.3; 17 pgs.
Chinese Decision on Rejection dated Mar. 7, 2012 cited in Appln No. 200780020312.7; 5 pgs.
Chinese Fifth Office Action dated Dec. 16, 2015 in Appln No. 200910148820.4, 6 pgs. (MS 309410.12).
Chinese First Office Action dated Apr. 11, 2008 cited in Appln No. 200510092141.1; 22 pgs.
Chinese First Office Action dated Apr. 18, 2008 cited in Appln No. 200510092142.6; 22 pgs.
Chinese First Office Action dated Mar. 21, 2008 cited in Appln No. 200510092139.4; 25 pgs.
Chinese First Office Action dated Mar. 21, 2008 cited in Appln No. 200510092146.4; 21 pgs.
Chinese First Office Action dated May 23, 2008 cited in Appln No. 200510089514.X; 16 pgs.
Chinese Fourth Office Action dated Apr. 23, 2013 cited in Appln No. 200980124944.7, 7 pgs.
Chinese Fourth Office Action dated Apr. 27, 2012 cited in Appln No. 200680018095.3; 8 pgs.
Chinese Fourth Office Action dated Aug. 3, 2015 in Appln No. 200910148820.4, 6 pgs.
Chinese Fourth Office Action dated Feb. 15, 2015 in Appln No. 200780020312.7, 9 pgs.
Chinese Notice of Allowance Issued in Patent Application No. 200510092142.6, dated Jun. 18, 2010, 4 Pages.
Chinese Notice on Reexamination dated Jan. 21, 2011 cited in Appln No. 200510089514.X; 8 pgs.
Chinese Notice on Reexamination dated Jul. 8, 2015 cited in Appln No. 200980124644.9, 8 pgs.
Chinese Notice on Third Office Action dated Jun. 5, 2013 cited in Appln No. 200980124644.9; 10 pgs.
Chinese Office Action dated Apr. 3, 2009 cited in Appln No. 200510089514.X; 7 pgs.
Chinese Office Action dated Aug. 2, 2012 in Appln No. 200980124945.1; 8 pgs.
Chinese Office Action dated Feb. 29, 2012 cited in Appln No. 200980124664.9; 9 pgs.
Chinese Office Action dated Feb. 5, 2013 cited in Appln No. 200910148820.4, 5 pgs.
Chinese Office Action dated Jan. 22, 2010 cited in Appln No. 200680032564.7; 2 pgs.
Chinese Office Action dated Jan. 6, 2013 in Appln No. 201080021957.4, 9 pgs.
Chinese Office Action dated Jul. 12, 2012 in Appln No. 201080008789.5; 8 pgs.
Chinese Office Action dated Jul. 2, 2012 in Appln No. 200980124944.7; 8 pgs.
Chinese Office Action dated Jul. 3, 2009 cited in Appln. No. 200680018095.3; 14 pgs.
Chinese Office Action dated Mar. 11, 2010 cited in Appln No. 200780020312.7; 8 pgs.
Chinese Office Action dated Nov. 11, 2010 cited in CN Application No. 200680032789.2, w/translation; 11 pgs.
Chinese Office Action dated Nov. 18, 2011 cited in Appln. No. 200910148820.4; 10 pgs.
Chinese Office Action dated Nov. 27, 2009 cited in Appln No. 200680033212.3; 8 pgs.
Chinese Office Action dated Nov. 29, 2011 cited in Appln. No. 200980124383.0; 9 pgs.
Chinese Office Action dated Oct. 16, 2009 cited in Appln No. 200510092142.6; 9 pgs.
Chinese Office Action dated Sep. 15, 2014 in Appln No. 201210079579.6, 11 pgs.
Chinese Second Office Action dated Apr. 7, 2011 cited in Application No. 200680032789.2, w/translation; 9 pgs.
Chinese Second Office Action dated Aug. 5, 2013 in Appln No. 201080021957.4; 12 pgs.
Chinese Second Office Action dated Dec. 17, 2012 cited in Appln No. 200980124644.9, 10 pgs.
Chinese Second Office Action dated Dec. 31, 2012 in Appln No. 200980124945.1, 8 pgs.
Chinese Second Office Action dated Jan. 4, 2013 in Appln No. 201080008789.5, 8 pgs.
Chinese Second Office Action dated Jul. 14, 2011 cited in Appln No. 20680018095.3; 19 pgs.
Chinese Second Office Action dated Jul. 6, 2010 cited in Appln No. 200680033212.3; 6 pgs.

(56) References Cited

OTHER PUBLICATIONS

Chinese Second Office Action dated Jun. 18, 2012 in Appln No. 200910148820.4; 6 pgs.
Chinese Second Office Action dated Mar. 9, 2012 cited in Appln No. 200980124383.0; 10 pgs.
Chinese Second Office Action dated May 19, 2011 cited in Appln No. 200780020312.7; 9 pgs.
Chinese Second Office Action dated Nov. 21, 2008 cited in Appln No. 200510089514.X; 14 pgs.
Chinese Second Office Action dated Oct. 10, 2008 cited in Appln No. 200510092141.1; 22 pgs.
Chinese Second Office Action dated Oct. 17, 2008 cited in Appln No. 200510092139.4; 19 pgs.
Chinese Second Office Action dated Oct. 29, 2010 cited in Appln No. 200680030421.2; 13 pgs.
Chinese Second Office Action dated Sep. 12, 2012 in Appln No. 200980124944.7; 13 pgs.
Chinese Third Office Action dated Apr. 3, 2014 in Appln No. 201080021957.4, 6 pgs.
Chinese Third Office Action dated Aug. 12, 2014 cited in Appln No. 200780020312.7, 13 pgs.
Chinese Third Office Action dated Aug. 14, 2012 in Appln No. 200980124383.0; 8 pgs.
Chinese Third Office Action dated Dec. 31, 2012 in Appln No. 200980124944.7, 14 pgs.
Chinese Third Office Action dated Dec. 4, 2013 in Appln No. 200680032789.2; 6 pgs.
Chinese Third Office Action dated Dec. 5, 2011 cited in Appln. No. 200680018095.3; 6 pgs.
Chinese Third Office Action dated Feb. 10, 2011 cited in Appln No. 200680033212.3; 7 pgs.
Chinese Third Office Action dated Feb. 12, 2010 cited in Appln No. 200510092142.6; 7 pgs.
Chinese Third Office Action dated Feb. 2, 2015 in Appln No. 200910148820.4, 12 pgs.
Chinese Third Office Action dated Jun. 19, 2009 cited in Appln No. 200510092139.4; 7 pgs.
Chinese Third Office Action dated Jun. 21, 2011 cited in Appln No. 200680030421.2; 8 pgs.
Clifton, The Application Automation layer—Using XML to Dynamically Generale GUI Elements—forms and controls, The Code Project, Jun. 2003, pp. 1-37.
Cole; "New Arrival! Forefront of Downloading"; Mac People; vol. 11, No. 10; ASCII Corporation; Aug. 31, 2005; 1 pg. (cited in JP NOR Nov. 25, 2011).
European Communication Pursuant to Rule 69 EPC Issued in European Patent Application 05107153.8, dated Apr. 2, 2012, 1 Page.
Danish Search Report Appl. No. SG 200504475-5 dated Sep. 19, 2006; 6 pgs.
Danish Written Opinion Appl. No. SG 200504508-3 dated Sep. 18, 2006; 9 pgs.
de Candussio, N., "Common GUI Features Report," Herschel CSDT Meeeting, pp. 1-21 (Sep. 2007).
Douglas et al., "Dynamic Popup Menu Titles"; IP.Com Journal, IP.Com Inc., West Henrietta, NY, Aug. 1, 1992, 2 pgs. (cited in Feb. 28, 2012 Search Report).
Dr. Dobb's Journal; "Windows 95 Common Controls"; May 1, 1995; 12 pgs. (cited in Dec. 6, 2011 EP Search Rpt).
Egypt Official Decision dated Mar. 14, 2011 cited in Appln No. 2005080371; 2 pgs.
Egyptian Office Action Issued in Patent Application No. 3712005, dated Apr. 9, 2010, 4 Pages.
Embedding and Linking Excel Worksheets into Word; 2001, The McGraw-Hill Companies, Inc, 6 pgs. (cited in Dec. 24, 2014 OA).
EP Communication dated Feb. 11, 2014 cited in Appln No. 09 798 374.6, 6 pgs.
EP Communication dated Jan. 10, 2013 cited in Appln No. 10744106.5, PCT/US2010/021888, 8 pgs. (also known as EP10744106.5).
EP Communication dated Jan. 27, 2014 in Appln No. 09 767 2208, 7 pgs.
EP Communication dated Jul. 17, 2013 in Appln No. EP 07 795 391.7; 9 pgs.
EP Communication dated Jun. 2, 2014 in Appln No. 07 795 391.7, 9 pgs.
EP Communication dated Mar. 23, 2016 in Appln No. 06 790 087.8, 6 pgs.
EP Communication dated May 18, 2015 cited in 10 775 348.5, 7 pgs.
EP Communication dated Sep. 26, 2012 cited in Appln No. PCT/US2006/034993; 10 pgs. (also known as EP 06814334.6).
EP Communication on Decision to Refuse dated Feb. 20, 2014 cited in Appln No. 09 006 972.5, 15 pgs.
EP Search Report dated Apr. 18, 2013 in Appln No. PCT/US2006/012724, 12 pgs. (also known as EP 06814334.6).
EP Search Report dated Jan. 30, 2013 in Appln No. PCT/US2009/044059, 8 pgs. (also known as EP 09767220.8).
EP Search Report dated Jun. 2, 2014 in Appln No. PCT/US2010/034277, 6 pgs.
EP Search Report dated May 10, 2013 cited in Appln No. PCT/US2009/044292; 6 pgs. (also known as EP09798374.6).
EP Summons to Attend Oral Proceedings dated Oct. 4, 2013 in Appln No. 09 006 972.5; 13 pgs.
European Communicated dated Oct. 20, 2005 cited in EP Application No. 04102463.0/2211 PCT; 4 pgs.
European Communication dated Sep. 14, 2009 cited in Appln. No. 07795391.7-1225; 5 pgs.
European Communication dated Sep. 28, 2009 cited in Appln No. 09006972.5-2211; 6 pgs.
European Extended Search Report in Application No. 10775348.5, dated Jun. 2, 2014, 6 Pages.
European Office Action dated Jun. 15, 2010 cited in EP Application No. 06814358.5; 1 pg.
European Office Action in Application 05107153.8, dated Jul. 22, 2016, 6 pgs.
European Office Action in Application 05107186.8, dated Jul. 27, 2016, 6 pgs.
European Office Action in Appln No. 05107157.9, dated Jul. 20, 2016, 6 pgs.
European Office Action Issued in Patent Application 05107153.8, dated Apr. 2, 2012, 1 Page.
European Office Action dated Mar. 9, 2009, Application No. 06790087.8; 5 pgs.
European Search Report dated Dec. 6, 2011 cited in Appln No. 06803424.8; 8 pgs.
European Search Report dated Feb. 23, 2012 cited in Appln No. 05107153.8; 8 pgs.
European Search Report dated Feb. 28, 2012 cited in Appln No. 05107184.3; 8 pgs. (alternative mail date is Feb. 28, 2012—same report).
European Search Report dated Mar. 1, 2012 cited in Appln No. 05107157.9; 8 pgs.
European Search Report dated Mar. 26, 2012 cited in Appln No. 05107186.6; 8 pgs.
European Search Report dated Nov. 25, 2008 cited in Application EP 06 79 0087; 2 pgs.
European Search Report dated Sep. 7, 2009 cited in EP Application No. 09006972.5-2211; 5 pgs. (alternative date is Sep. 15, 2009).
European Search Report Issued in Patent Application No. 09727331.2, dated Aug. 1, 2014, 1 Page.
European Summons to Attend Oral Proceedings dated Jun. 23, 2008 cited in Appln No. 04102463.9; 76 pgs.
Feiner, Steven, "A Grid-Based Approach to Automating Display Layout", In Book Readings in Intelligent User Interfaces, Morgan Kaufmann Publishers Inc., pp. 249-254.
Fifth Office Action Issued in Chinese Patent Application 200980112454.5, dated Apr. 2, 2014, 19 Pages.
Find any file or email on your PC as fast as you can type!, http://www.x1.com, 2003, 1 page.
First Office Action Issued in Chinese Patent Application 200980112454.5, dated Aug. 26, 2011, 9 Pages.

(56) References Cited

OTHER PUBLICATIONS

FrontPage 11 Beta Layperson's Specification, Copyright 2002, Microsoft Corporation, 12 pages.
Furman, et al., "Positioning HTML Elements with Cascading Style Sheets", W3C Working Draft, Aug. 19, 1997, 14 Pages.
G. Kurtenbach et al., "The Hotbox: Efficient Access to a Large Number of Menu-items," CHI 99 15-20, pp. 231-237, May 1999.
Gajos, et al., "Supple: Automatically Generating User Interfaces", In Proceedings of the 9th International Conference on Intelligent User Interfaces, Jan. 13, 2004, pp. 1-8.
Gina Danielle Venolia et al., Understanding Sequence and Reply Relationships within Email Conversations: A Mixed-Model Visualization, CHI 2003, Apr. 5-10, 2003, vol. No. 5, Issue No. 1, pp. 361-368.
Goldberg et al., "Using Collaborative Filtering to Weave an Information Tapestry," Communication of the ACM, vol. 35, No. 12, pp. 61-70, Dec. 1992.
Gordon Padwick, Using Microsoft Outlook 2000, Que, Sp. Ed., May 1999, 5 pp.
Gorniak, Peter; "Sorting email messages by topic"; 1998; 1 pg. (provided to us by MS Sep. 2, 2014 in post grant search).
Habraken, Microsoft Office XP 8 in 1, published Jun. 5, 2001, http://proquest.safaribooksonline.com/0789725096/, 12 pp.
Haden et al.; "Scrollable Popup Menu with Selection Tracking Display of Graphical Objects"; IP.Com Journal, IP.Com Inc., West Henrietta, NY, Aug. 1, 1994, 6 pgs. (cited in Feb. 28, 2012 Search Report).
Halvorson et al., "Microsoft Office XP Inside Out," 2001, pp. 1005-1009, 1015, 1023-1028, 1036-1039, 1093.
Halvorson et al., "Microsoft Office XP Inside Out," 2001, pp. 4, 5, 10, 11, 70-74, 281-288, 1010-1014.
Halvorson et al., Microsoft Office Professional Official Manual, Aug. 20, 2002, 10 pgs. (cited in JP Patent Application 05.21.2010-60001-0245JP01).
Hepfner, Troy, "New SOCET CXP Interface Improves Usability," Sep. 2008, http://www.socetset.com/gxpmosaic/?p=95, 4 pages.
Hock, "Yahoo! to the Max"; May 10, 2005; 5 excerpted pgs. (cited in Feb. 1, 2011 OA).
Homeworking Forum; archived Dec. 6, 2004; 11 pgs. (Cited in Jun. 7, 2011 OA).
http://www.webreference.com/html/tutorial5/5.html, Aug. 20, 1998, 3 pgs.
http://www.webreference.com/html/tutorial5/7.html, Aug. 20, 1998, 3 pgs.
http://www.webreference.com/html/tutorial5/8.html, Aug. 20, 1998, 2 pgs.
India Examination Report dated Feb. 17, 2015 in Appln No. 1568/DEL/2005, 3 pgs.
India First Examination Report dated Dec. 23, 2014 in Appln No. 1819/del/2005, 2 pgs.
India First Examination Report dated Mar. 19, 2014 in Appln No. 1818/DEL/2005, 1 pg.
India First Examination Report dated Mar. 30, 2012 cited in Appln No. 1817/DEL/2005; 2 pgs.
India First Examination Report dated May 6, 2015 cited in Appln No. 1979/DELNP/2008, 2 pgs.
India First Examination Report dated Oct. 21, 2013 cited in Appln No. 1017/DEL/2004; 2 pgs.
India First Examination Report Issued in Patent Application No. 1820/DEL/2005, dated Mar. 20, 2014, 1 Page.
Indonesian Office Action Issued in Patent Application No. P00200500444, dated Jan. 16, 2015, 3 Pages. (w/o English Translation).
Inoue, Risako, "Learn from Demonstration How to Use Power Point", In Nikkei PC21, Nikkei Business Publications, vol. 13, Issue 7, Apr. 1, 2008, pp. 168-171 (No English Translation provided) (cited in Oct. 21, 2015 JP OA).
Inoue; "Lets Learn PowerPoint Using Actual Samples"; Nikkei PC21, Japan, Nikkei Business Publications, Inc., Apr. 1, 2008, vol. 13, No. 7, 5 pgs.—No English Translation (cited in Jan. 9, 2014 JP OA).
International Search Report dated Nov. 27, 2007 in PCT/US2007/012573, 9 pages.
International Search Report dated Oct. 17, 2007 cited in International Application No. PCT/US2006/012724; 11 pgs.
Islam et al., "Email Categorization Using Multi Stage Classification Technique", 2007, 3 pgs. (Search Rpt).
Israel Office Action in Application 169718, dated Oct. 17, 2013, 4 pages. (with English translation).
Israel Office Action in Application 233533, dated May 31, 2016, 2 pgs (MS# 309412.28). (W/out English Translation).
Israel Office Action Issued in Patent Application No. 169717, dated Oct. 29, 2014, 1 Page; (w/o English Translation).
Israeli Office Action dated Aug. 29, 2012 in Appln No. 169717; 4 pgs.
Israeli Office Action dated Feb. 23, 2012 cited in Appln No. 170668; 20 pgs.
Israeli Office Action dated Feb. 28, 2014 in Appln No. 209012, 6 pgs.
Israeli Office Action dated Jul. 5, 2010 cited in Appln No. 169718; 2 pgs.
Israeli Office Action dated Jun. 18, 2013 cited in Appln No. 170668; 4 pgs.
Israeli Office Action dated Jun. 3, 2012 cited in Appln No. 189293; 4 pgs.
Israeli Office Action dated Mar. 2, 2015 in Appln No. 213908, 5 pgs.
Israeli Office Action dated Mar. 6, 2014 in Appln No. 194785, 5 pgs.
Israeli Office Action dated May 15, 2014 in Appln No. 209047, 6 pgs.
Israeli Office Action dated May 15, 2014 in Appln No. 209048, 15 pgs.
Israeli Office Action dated May 3, 2012 cited in Appln No. 169718; 4 pgs.
Israeli Office Action dated Oct. 12, 2009 cited in Appln No. 170668; 2 pgs.
Israeli Office Action dated Oct. 17, 2013 cited in Appln No. 1611334; 4 pgs.
Israeli Office Action dated Oct. 28, 2010 cited in Appln No. 169716; 4 pgs.
Israeli Office Action dated Sep. 6, 2009 cited in Appln No. 169716; 2 pgs.
Israeli Office Action dated Sep. 7, 2009 cited in Appln No. 169718; 2 pgs.
Israeli Office Action Issued in Patent Application No. 215418, dated Apr. 28, 2015, 3 Pages.
Israeli Office Action Issued in Patent Application No. 213908, dated Feb. 3, 2015, 3 pages. (w/o English Translation).
Israeli Office Action Issued in Patent Application No. 221792, dated Feb. 16, 2016, 4 pgs.
Israeli Office Action Received in Patent Application No. 209011, dated Sep. 10, 2013, 5 Pages.
Jacobs, et al., "Adaptive Grid-Based Document Layout", in Proceedings of ACM transactions on Graphics, SIGGRAPH 2003, vol. 22, Issue 3, Jul. 2003, 11 Pages.
Jane Dorothy Calabria Burke, Ten Minute Guide to Lotus Notes 4.6, Publication date: Dec. 23, 1997, 2 pgs.
Japanese 3rd Official Notice, Mailing No. 134028, dated Sep. 16, 2011 cited in Appln. No. PH1707009; 2 pgs.
Japanese 4th Official Notice, Mailing No. 134052, dated Sep. 16, 2011 cited in Appln. No. PH1707009; 2 pgs.
Japanese Final Decision of Rejection dated May 27, 2014 in Appln No. 2012-110939, 4 pgs.
Japanese Notice of Allowance dated Apr. 11, 2012 cited in Appln No. 2008-530229; 6 pgs.
Japanese Notice of Allowance Issued in Patent Application No. 2005-236089, dated Aug. 23, 2011, 6 Pages.
Japanese Notice of Allowance Issued in Patent Application No. 2011-550149, dated May 8, 2014, Filed Date: Jan. 22, 2010, 4 Pages.

(56) References Cited

OTHER PUBLICATIONS

Japanese Notice of Allowance Issued in Patent Application No. 2012-510906, dated Jul. 10, 2014, 3 Pages. (w/o English Translation).
Japanese Notice of Final Rejection dated Mar. 9, 2012 cited in Appln No. 2008-513476; 2 pgs.
Japanese Notice of Preliminary Rejection dated Mar. 12, 2013 in Appln No. 2011-516371, 4 pgs.
Japanese Notice of Preliminary Rejection dated Mar. 19, 2013 in Appln No. 2011-514652, 6 pgs.
Japanese Notice of Rejection dated Aug. 12, 2011 cited in Appln. No. 2005-184990; 6 pgs.
Japanese Notice of Rejection dated Dec. 16, 2011 cited in Appln No. 2008-529218; 3 pgs.
Japanese Notice of Rejection dated Feb. 3, 2012 cited in Appln No. 2008-530218; 6 pgs.
Japanese Notice of Rejection dated May 11, 2012 cited in Appln No. 2009-513223; 6 pgs.
Japanese Notice of Rejection dated May 6, 2011 cited in Appln. No. 2005-236087; 4 pgs.
Japanese Notice of Rejection dated May 6, 2011 cited in Appln. No. 2005-236089; 4 pgs.
Japanese Notice of Rejection dated Nov. 11, 2011 cited in Appln. No. 2008-530229; 58 pgs.
Japanese Notice of Rejection dated Nov. 25, 2011 cited in Appln. No. 2008-531249; 8 pgs.
Japanese Notice of Rejection dated Nov. 4, 2011 cited in Appln No. 2008-513476; 4 pgs.
Japanese Notice of Rejection dated Sep. 19, 2013 in Appln No. 2012-153634; 6 pgs.
Japanese Office Action dated Jan. 9, 2014 cited in JP Application No. 2012-510906 w/translation, 4 pgs.
Japanese Office Action dated Jun. 10, 2011 cited in JP Application No. 2008-530229, w/translation; 4 pgs.
Japanese Office Action Issued in Japan Patent Application No. 2012-510906, dated Jan. 16, 2014, 4 Pages.
Japanese Office Action Issued in Patent Application No. 2005-236089, dated Sep. 20, 2011, 2 Pages.
Japanese Office Action Issued in Patent Application No. 2011-550149, dated Jan. 20, 2014, Filed Date: Jan. 22, 2010, 5 Pages.
Japanese Office Action Issued in Patent Application No. 2014-163396, dated Oct. 21, 2015, 5 Pages.
Khare et al., "The Origin of (Document) Species," University of California, 1998, 9 pgs.
Kim, et al., "Migrating Legacy Software Systems to CORBA based Distributed Environments through an Automatic Wrapper Generation Technique", In Proceedings SCI 2000 and the 6th International Conference on Information Systems Analysis and Synthesis ISAS 2000, vol. 10, Aug. 9, 2001, 6 Pages.
Korean Final Notice of Preliminary Rejection dated May 20, 2013 cited in Appln No. 10-2008-7005939; 3 pgs.
Korean Notice of Allowance Issued in Patent Application No. 10-2005-0067411, dated Mar. 12, 2012, 2 Pages. (Without English Translation).
Korean Notice of Allowance Issued in Patent Application No. 10-2010-7029199, dated Apr. 24, 2015, 2 Pages. (w/o English Translation).
Korean Notice of Final Rejection in Application 10-2010-7028097, dated Apr. 28, 2016, 4 pgs. (No English translation).
Korean Notice of Final Rejection in Application 10-2010-7028989, dated Apr. 28, 2016, 4 pgs. (No English translation).
Korean Notice of Preliminary Rejection dated Jul. 19, 2012 cited in Appln No. 10-2007-7024571; 6 pgs.
Korean Notice of Preliminary Rejection dated Jul. 2, 2012 cited in Appln No. 10-2012-0024393; 5 pgs.
Korean Notice of Preliminary Rejection dated Jul. 22, 2011 cited in Appln No. 10-2005-0058160; 5 pgs.
Korean Notice of Preliminary Rejection dated Mar. 19, 2013 in Appln No. 10-2008-7005659, 4 pgs.
Korean Notice of Preliminary Rejection dated Nov. 12, 2012 cited in KR-10-2008-7005939; 7 pgs.
Korean Notice of Preliminary Rejection dated Nov. 7, 2013 cited in KR-10-2008-7029272; 7 pgs.
Korean Notice of Preliminary Rejection dated Oct. 19, 2015 in Appln No. 10-2010-7028989, 7 pgs. (No English Language Translation)
Korean Notice of Preliminary Rejection dated Sep. 30, 2015 in Appln No. 10-2010-7028097, 7 pgs. (No english translation).
Korean Notice of Preliminary Rejection Issued in Patent Application No. 10-2011-7018813, dated Jan. 8, 2016, 4 Pages.
Korean Notice of Rejection dated Feb. 22, 2013 in Appln No. 10-2008-7005078 13 pgs.
Korean Notice of Rejection dated Feb. 25, 2013 in Appln No. 10-2008-7005366, 5 pgs.
Korean Notice of Rejection dated Jan. 30, 2012 cited in Appln No. 10-2004-0048176; 5 pgs.
Korean Notice of Rejection dated May 17, 2011 cited in Appln No. 10-2004-48176; 9 pgs.
Korean Notice of Rejection dated Nov. 3, 2011 cited in Appln No. 10-2005-0067257; 4 pgs.
Korean Office Action in Application 10-2011-7026740, dated Mar. 11, 2016, 4 Pages.
Korean Office Action in Patent Application No. 10-2011-7018813, dated Jul. 29, 2016, 3 pgs; w/o English translation).
Korean Preliminary Rejection dated Aug. 23, 2011 cited in Appln. No. 10-2005-0067236; pp. 11.
Korean Preliminary Rejection dated Aug. 23, 2011 cited in Appln. No. 10-2005-0067411; 9 pgs.
Korean Preliminary Rejection dated Aug. 29, 2011 cited in Appln. No. 10-2005-0066460; 7 pgs.
Krill, P., "Microsoft's Ribbon Interface Draws Frowns, Smiles," InfoWorld, http://www.infoworld.com/article/08/03/04/10NF-microsoft-fluentui_1.html, 3 pages (Mar. 4, 2008).
Kumar et al., "A personal agent application for the semantic web"; in AAAI Fall Symposium on Personalized Agents; 2002; pp. 1-8 (provided to us by MS 09.02.2014 in post grant search for 1832US01).
Lisa K. Averett; Joshua R. Knisley; Mark A. Marvin; Haiti: Projecting Tactical Network and Systems Management; 1995 IEEE pp. 906-910.
Liu et al., "Continual Queries for Internet Scale Event-Driven Information Delivery," IEEE Transactions on Knowledge and Data Engineering, vol. 11, Issue 1, pp. 610-628, 1999.
Louw, et al., "Extensible Web Browser Security", In Proceedings of the 4th International Conference on Detection of Intrusions and Malware, and Vulnerability Assessment, Jul. 12, 2007, 20 Pages.
Lyons et al., The Oval Menu-Evolution and Evaluation of a Wedget, © 1996; IEEE; 8 pgs. (cited in Apr. 16, 2015 NOA).
M. Williams, "Programming Windows NT4: Unleashed," Sams Publishing, Indianapolis, 1996, pp. index & 167-185.
Maes et al., "Learning Interface Agents"; In AAAI (vol. 93); 1993; pp. 459-465 (provided to us by MS 09.02.2014 in post grant search for 1832US01).
Malaysia Substantive Examination Adverse Report dated Jan. 15, 2013 in Appln No. PI 20084401, 3 pgs.
Malaysia Substantive Examination Report dated Jun. 30, 2015 in Appln No. PI 2010005439, 2 pgs.
Malaysian Adverse Report in Application PI 2011003348, dated Mar. 15, 2016, 3 pgs.
Malaysian Examination Report dated Aug. 30, 2012 in Appln No. PI 20080400; 3 pgs.
Malaysian Modified Substantive Examination Report dated Jan. 30, 2015 in Appln No. PI 2010005558, 3 pgs.
Malaysian Notice of Allowance Issued in Patent Application No. PI20053258, dated Oct. 15, 2012, 2 Pages.
Malaysian Notice of Allowance Received in Patent Application No. PI 20080400, dated Sep. 13, 2013, Filed Date: Aug. 29, 2006, 2 Pages.
Malaysian Substantive Examination Adverse Report dated Jan. 31, 2012 cited in Appln No. PI 20053258; 3 pgs.
Malaysian Substantive Examination Adverse Report dated Jan. 31, 2012 cited in Appln No. PI 20053259; 3 pgs.

(56) References Cited

OTHER PUBLICATIONS

Malaysian Substantive Examination Adverse Report dated Mar. 15, 2011 cited in Appln No. PI 20053260; 3 pgs.
Malaysian Substantive Examination Adverse Report dated Sep. 30, 2010 cited in Appln No. PI 20052959; 4 pgs.
Malaysian Substantive Examination Adverse Report in Application PI 2011004990, dated Mar. 15, 2016, 3 pgs.
Malaysian Substantive Examination Report dated Jan. 15, 2014 in Appln No. PI 20080508, 3 pgs.
Malaysian Substantive Examination Report dated Jan. 30, 2015 in Appln No. PI 2010005439, 3 pgs.
Malaysian Substantive Examination Report dated Nov. 14, 2014 in Appln No. PI 2010005637, 3 pgs.
Malaysian Substantive Examination Report dated Oct. 31, 2012 cited in Appln No. PI 20053260, 2 pgs.
Marsh, Bruce, Integrating Spreadsheet Templates and Data Analysis Into Fluid Power Instruction, Journal of Industrial Technology, vol. 16, No. 4, Aug. 2000-Oct. 2000. http://www.nait.org/jit/Articles/marsh071200.pdf, 7 pages.
Marshall School of Business, Workshop 1—Introduction to Outlook & E-mail, Apr. 6, 2000, pp. 1-11.
Marshall School of Business: "Workshop IV—Calendar," http://www.marshall.usc.edu/computing/PDF_Files/Outlook/Workshop4,PDF, Apr. 10, 2000, pp. 1-4.
Mexican Notice of Allowance Issued in Patent Application No. PA/a/2005/008349, dated Dec. 16, 2014, 1 Page. (No English translation).
Mexican Notice of Allowance Received in Patent Application No. MX/a/2008/002889, dated Apr. 1, 2014, Filed Date: Aug. 29, 2006, 1 Page. (w/o English Translation).
Mexican Office Action dated Aug. 12, 2010 cited in Appln No. 2005/008354; 6 pgs.
Mexican Office Action dated Aug. 14, 2014 cited in Appln No. PA/a/2005/008349, 18 pgs.
Mexican Office Action dated Aug. 20, 2013 in Appln No. MX/a/2011/011749, 10 pgs.
Mexican Office Action dated Feb. 11, 2014 cited in Appln No. MX/a/2008/003342, 8 pgs.
Mexican Office Action dated Feb. 25, 2013 in Appln No. MX/a/2008/002889, 11 pgs.
Mexican Office Action dated Feb. 3, 2012 cited in Appln No. MX/A/2008/002889 with summary; 12 pgs.
Mexican Office Action dated Feb. 5, 2009 cited in Appln No. PA/a/2005/008349; 10 pgs.
Mexican Office Action dated Feb. 5, 2013 cited in Appln No. MX/a/2008/014849, 8 pgs.
Mexican Office Action dated Jan. 22, 2013 cited in Appln No. MX/a/2008/003342; 8 pgs.
Mexican Office Action dated Jan. 6, 2011 cited in Appln No. PA/a/2005/008354; 26 pgs.
Mexican Office Action dated Jul. 9, 2013 in Appln No. MX/a/2008/002889, 13 pgs.
Mexican Office Action dated Jun. 11, 2013 cited in Appln. No. MX/a/2008/003342, 9 pgs.
Mexican Office Action dated Jun. 11, 2013 in Appln No. PA/a/2005/008351; 31 pgs.
Mexican Office Action dated Jun. 19, 2009 cited in Appln. No. PA/a/2005/007073; 6 pgs.
Mexican Office Action dated Jun. 20, 2013 in Appln No. MX/a/2010-014056; 6 pgs.
Mexican Office Action dated Jun. 6, 2012 cited in Appln No. MX/a/2008/014849; 8 pgs.
Mexican Office Action dated Mar. 22, 2013 in Appln No. PA/a/2005/008350; 28 pgs.
Mexican Office Action dated Mar. 3, 2009 cited in Appln No. PA/a/2005/008351; 4 pgs. English language only.
Mexican Office Action dated Mar. 31, 2011 cited in Appln No. PA/a/2005/008349; 40 pgs.
Mexican Office Action dated Mar. 31, 2011 cited in Appln No. PA/a/2005/008350; 40 pgs.
Mexican Office Action dated Mar. 31, 2011 cited in Appln No. PA/a/2005/008351; 46 pgs.
Mexican Office Action dated May 23, 2013 in Appln No. MX/a/2008/003342; 8 pgs.
Mexican Office Action dated May 26, 2011 cited in Appln. No. MX/a/2009/004151; 4 pgs.
Mexican Office Action dated May 4, 2010 cited in Appln No. 2005/008354; 5 pgs.
Mexican Office Action dated Oct. 28, 2013 cited in Appln. No. MX/a/2010/013566; 8 pgs.
Mexican Office Action dated Oct. 3, 2011 cited in Appln. No. MX/a/2008/014849; 10 pgs.
Mexican Office Action dated Sep. 27, 2013 in Appln No. MX/a/2008/014849; 9 pgs.
Mexican Office Action Issued in Mexico Patent Application No. MX/a/2011/011749, dated Aug. 2, 2013, 6 Pages. (w/o English Translation).
Mexican Office Action Received for Mexican Patent Application No. PA/a/2005/008349, dated Mar. 14, 2014, Filed Date: Aug. 5, 2005, 16 Pages.
Mexican Office Action Received in Patent Application No. MX/a/2010/013566, dated Jun. 12, 2013, 3 Pages.
Mexican Office Action Summary dated Jun. 25, 2012 in Appln No. PA/a/2005/008354; 25 pgs.
Mexican Office Action Summary dated Sep. 18, 2012 in Appin No. MX/a/2008/003342; 8 pgs.
Mexican Office Action Summary dated Sep. 22, 2011 cited in Appln. No. MX/a/2008/003342; 10 pgs.
Microsoft Office 11 Beta Layperson's Specification, Copyright 2002, Microsoft Corporation, 28 pages.
Microsoft Office 2003, Microsoft Office Professional Edition 2003, Microsoft Corporation, 10 pages.
Microsoft Office 2007 Word Help, 3 pgs. (cited in Dec. 31, 2012 OA).
Microsoft Office Word 2003, Part of Microsoft Office Professional Edition 2003, 1983-2003 Microsoft Corporation, 5 pp.
Microsoft Office Word 2003, Part of Microsoft Office Professional Edition 2003, 1983-2003 Microsoft Corporation, screen shot 1, 1 pp.
Microsoft Office XP/2002, Wikipedia, http://en.wikipedia.org/wiki/Microsoft_Office_XP, May 31, 2001 (May 31, 2001); 3 pgs. (cited in Sep. 4, 2014 CA OA).
Microsoft Press, Microsoft Computer Dictionary, Microsoft Press, Fifth Edition, 2002, pp. 374, 382.
Microsoft Publisher 11 Beta Layperson's Specification, Copyright 2002, Microsoft Corporation, 13 pages.
Microsoft Windows XP Professional, Version 2002, Service pack 2, 3 pgs.
Microsoft XDocs Beta Layperson Specification, Copyright 2002, Microsoft Corporation, 3 pages.
Milstein, Sarah; "The Missing Manual: The book that should have been in the box", First Edition; O'Reilly Japan, Inc.; Nov. 25, 2004; 1 pg. (cited in JP NOR Nov. 25, 2011).
Miser, "Special Edition Using Mac OS X v10.2"; Pub. Date Jan. 3, 2003; QUE; Spe. Ed.; pp. 272-275 (cited in Apr. 18, 2013 OA).
Mock et al., "An Experimental Framework for Email Categorization and Management", Sep. 9-12, 2001, 3 pgs. (Search Rpt).
Mori et al., "Design and Development of Multidevice User Interfaces through Multiple Logical Descriptions"; Aug. 2004; vol. 30; 14 pgs. (cited in Apr. 25, 2013 NOA).
Morita, Utako; "Literature Searching System, 'JDream'"; Online Search; vol. 23, No. 4; The Society of Japan Terminal, Dec. 2002; 5 pgs. (cited in JP NOR Nov. 25, 2011).
Murray; First Look 2007 Microsoft Office System; Jun. 21, 2006; Microsoft Press; 16 pgs. (cited in Mar. 19, 2015 NOA).
New Zealand Application No. 541299, Examination Report dated Nov. 8, 2006, 1 page.
New Zealand Application No. 541299, Examination Report dated Jul. 25, 2005; 2 pgs.
New Zealand Application No. 541300, Examination Report dated Jul. 25, 2005; 2 pgs.
New Zealand Application No. 541301, Examination Report dated Jul. 25, 2005; 2 pgs.

(56) References Cited

OTHER PUBLICATIONS

New Zealand Office Action dated Oct. 14, 2009 cited in NZ Application No. 566363; 1 pg.
Nielsen, Jacob. "Tabs, Used Right," Alertbox, Sep. 17, 2007, http://www.useit.com/alertbox/tabs.html, 6 pages.
Non-Final Office Action Issued in U.S. Appl. No. 10/780,547, dated Oct. 4, 2007, 16 Pages.
Norway Notice of Allowance Issued in Patent Application No. 20053656, dated Jun. 22, 2015, 2 Pages. (W/out English Translation).
Norway Office Action dated Sep. 15, 2015 in Appln No. 20053658, 1 page (no English translation).
Norway Office Action dated Feb. 10, 2014 in Appln No. 20053655, 4 pgs.
Norway Office Action dated Feb. 10, 2014 in Appln No. 20053658, 4 pgs.
Norway Office Action dated in Appln No. 20053655, dated Mar. 2, 2016, 3 pgs.
Norway Office Action dated Jan. 22, 2016 in Appln No. 20054097, 1 pg. (No english translation).
Norway Office Action Issued in Patent Application No. 20053656, dated Feb. 22, 2014, 5 Pages.
Norwegian Office Action dated Jul. 27, 2015 in Appln No. 20053655, 3 pgs.
Norwegian Office Action dated Nov. 29, 2014 in Appln No. 20053655, 3 pgs.
Norwegian Office Action dated Nov. 29, 2014 in Appln No. 20053658 4 pgs.
Norwegian Office Action Received for Patent Application No. 20053656, dated Nov. 19, 2014, 2 pgs.
Notice of Allowance dated Apr. 16, 2015 in U.S. Appl. No. 13/595,084, 19 pgs.
Notice of Allowance dated Jul. 28, 2015 in U.S. Appl. No. 13/595,084, 15 pgs.
Notice of Allowance dated Mar. 15, 2016 in U.S. Appl. No. 14/032,094, 30 pgs.
Notice of Allowance dated Mar. 19, 2015 in U.S. Appl. No. 13/464,572, 40 pgs.
Notice of Allowance dated Nov. 20, 2015 in U.S. Appl. No. 13/769,598, 15 pgs.
Notice of Allowance Issued in Chinese Patent Application No. 200680032789.2, dated May 15, 2014, Filed Date: Sep. 8, 2006, 3 Pages.
Notice of Allowance Received for Korea Republic of (KR) Patent Application No. 10-2008-7005939, dated Nov. 20, 2013, Filed Date: Sep. 12, 2006, 2 Pages. (w/o English Translation).
Office 11 Beta Letter, Copyright 2002, Microsoft Corporation, 6 pages.
Office 2007, Microsoft, Released on Nov. 6, 2006, 23 pgs. (Cited in 1275us01 Jun. 9, 2011 OA).
Office Action Issued in Mexican Patent Application No. MX/a/2011/008461, dated May 19, 2016, 10 Pages. (NO English Translation).
Office Action Issued in Philippines Patent Application 1200500404, dated Apr. 12, 2011, 1 Page.
Office Action Issued in Russian Patent Application 200512583709, dated Oct. 30, 2009, 12 Pages. (with English translation).
Ohmori, Yasuo et al., "Eigyo Mind—A Sales Support Tool," PFU Tech. Rev., vol. 10, No. 1, pp. 32-38, PFU Limited, May 1, 1999, (cited in Aug. 12, 2011 JP Notice of Rej.).
Oracle Discoverer Desktop User's Guide; 10g (9.0.4) for Windows; Part No. B10272-01; published 2003; http://download-uk.oracle.com/docs/cd/B12166_01/bi/B10272_01/3graph.htm; pp. 1-18.
Padwick, Gordon "Using Microsoft Outlook 2000", 1999 Que Publishing, pp. 530-533.
Parry, Dominic Charles, "CREWS: A Component-Driven, Run-Time Extensible Web Service Framework", In Thesis Submitted in fulfilment of the requirements for the Degree of Master of Science, Rhodes University, Dec. 2003, 103 Pages.
PCT Search Report and Written Opinion dated Dec. 29, 2009 cited in International Application No. PCT/US2009/046344; 2 pgs.

PCT Search Report and Written Opinion dated Nov. 30, 2009 cited in International Application No. PCT/US2009/046341; 11 pgs.
PCT Search Report dated Feb. 26, 2007 cited in International Application No. PCT/US2006/034993; 11 pgs.
PCT Search Report dated Feb. 6, 2007 cited in International Application No. PCT/US2006/035467; 10 pgs.
PCT Written Opinion and Search Report dated Jan. 9, 2007 cited in International Application No. PCT/US2006/033809; 6 pgs.
PCT Written Opinion and Search Report dated Nov. 29, 2010 cited in International Application No. PCT/US2010/034277; 10 pgs.
PCT Written Opinion and Search Report dated Sep. 2, 2010 cited in International Application No. PCT/US2010/021888; 9 pgs.
Perronne et al. "Building Java Enterprise Systems with J2EE", Publisher: Sams, Pub Date: Jun. 7, 2000 (pp. 1-8).
Philippines Examiner's Action dated Apr. 12, 2011 cited in Appln No. 1-2005-00404; 1 pg.
Philippines Examiner's Action dated Apr. 21, 2008 cited in Appln No. 1-2005-000405; 1 pg.
Philippines Examiner's Action dated Apr. 21, 2008 cited in Appln No. 1-2005-000406; 1 pg.
Philippines Examiner's Action dated Aug. 19, 2008 cited in Appln No. 12005000405; 1 pg.
Philippines Examiner's Action dated Jul. 31, 2008 cited in Appln No. 12005000495; 1 pg.
Philippines Examiner's Action dated Mar. 11, 2010 cited in Appln No. 1-2005-000405; 1 pg.
Philippines Examiner's Action dated Sep. 12, 2008 cited in Appln No. 1200500406; 1 pg.
Philippines Substantive Examination Report dated Apr. 25, 2013 cited in Appln No. 1-2005-000495; 2 pgs.
Philippines Substantive Examination Report dated Apr. 30, 2014 cited in Appln No. 10-2008-500356, 1 pg.
Philipines Office Action Issued in Patent Application No. PH12005405, dated Jan. 19, 2006, 1 Page.
Pogue, David. "Windows XP Home Edition: The Missing Manual," O'Reilly, 1st Edition, May 1, 2002, pp. 37, 38, 41.
Ramamritham et al., Scheduling Algorithms and Operating Systems Support for Real-Time Systems; © 1994; IEEE; 13 pages. (cited in May 7, 2014 NOA).
Raman, "Cascaded Speech Style Sheets," 1997, 7 pgs.
Redmond, Tony; Excerpt from Book; Microsoft Exchange Server 2003; Published 2003; 14 pgs. (provided to M&G Aug. 09, 2012 by Microsoft.
Ribbons; Microsoft; © 2012 Microsoft; http://msdn.microsoft.com/en-us/library/windows/desktop/cc872782.aspx; 45 pgs. (Cited in Apr. 10, 2012 NOA).
Rice, F, "Customizing the 2007 Office System Document Inspector," http://msdn2.microsoft.com/en-us/library/aa338203(d=printer).aspx, 10 pages (May 2006).
Riggsby et al., "Mastering Lotus Notes and Domino 6," 2003, pp. 135-138, 607-612.
Riggsby et al., "Mastering Lotus Notes and Domino 6," 2003, pp. 135-139.
Riggsby, McCoy, Haberman and Falciani, "Mastering Lotus Notes and Domino 6." 2003, pp. 18, 22, 33-35, 47, 122, 123, 215-241, 378.
Ringel et al., "Automated Message Prioritization: Making Voicemail Retrieval More Efficient"; in CHI'02 Extended Abstracts on Human Factors in Computing Systems; Apr. 20, 2002; 2 pgs. (provided to us by MS Sep. 2, 2014 in post grant search for).
Russel et al., (hereinafter "Russel"); "Special Edition Using Microsoft ® Office Outlook ® 2003"; Que publishing on Sep. 25, 2003, 71 pgs. (cited in Jun. 6, 2012 OA).
Russian Decision on Grant dated Aug. 12, 2013 in Appln No. 2010151922/08; 18 pgs.
Russian Decision on Grant dated Jul. 20, 2014 in Appln No. 2010138162, 21 pgs.
Russian Decision on Grant dated May 20, 2014 in Appln No. 2011145984/08, 24 pgs.
Russian Notice of Allowance Issued in Patent Application No. 2005125837, dated Jul. 10, 2010, 23 Pages.
Russian Notice of Allowance Issued in Patent Application No. 2011134380, dated Apr. 5, 2014, Filed Date: Jan. 22, 2010, 22 Pages.

(56) References Cited

OTHER PUBLICATIONS

Russian Notice of Allowance Issued in Patent Application No. 2010152843, dated Feb. 20, 2014, 16 Pages.
Russian Office Action dated Dec. 12, 2012 cited in Appln No. 2010140069, 8 pgs.
Russian Office Action dated Dec. 28, 2009 cited in Appln No. 2005125836/09(029010); 2 pgs.
Russian Office Action dated Jul. 21, 2009 cited in Appln No. 2005125837/09(029011); 12 pgs.
Russian Office Action dated Jul. 26, 2010 cited in RU Application No. 2008109034, w/translation; 9 pgs.
Russian Office Action dated Jul. 30, 2009 cited in Appln No. 2005125831/09(029005); 17 pgs.
Russian Office Action dated Jun. 14, 2011 cited in Appln No. 2008147090; 2 pgs.
Russian Office Action dated Jun. 24, 2009 cited in Appln No. 2005120363/28(023023); 8 pgs.
Russian Office Action dated May 13, 2013 cited in Appln No. 2010-151922; 7 pgs.
Russian Office Action dated Nov. 12, 2010 cited in Application No. 2008109034, w/translation; 9 pgs.
Russian Office Action dated Oct. 26, 2009 cited in Appln No. 2005120363/09(023023); 12 pgs.
Russian Office Action dated Oct. 30, 2009 cited in Appln No. 2005125837/09(029011); 5 pgs.
Russian Office Action dated Oct. 9, 2009 cited in Appln No. 2005125836/09(029010); 10 pgs.
Russian Office Action dated Sep. 10, 2009 cited in Appln No. 2005125839/09(029013); 16 pgs.
Sada, Morihiro; "Clue for Managing Common Data Filed on Server"; Business Personal Computer Age; vol. 15, No. 7; Dempa Publications, Inc.; Jul. 1, 1997; 1 pg. (cited in JP NOR Nov. 25, 2011).
Schumaker, "User Interface Standards," http://msdn2.microsoft.com/en-us/library/aa217660(office.11.d=printer).aspx, Sep. 2001, 5 pgs.
Schwartz, Microsoft Office 2007 for Windows: Visual QuickStart Guide, 11 pgs. (cited in Mar. 27, 2015 OA).
Screen Dumps Microsoft Corporation, Microsoft Office Professional Edition 2003, 5 pp.
Screen Dumps Microsoft Corporation, Microsoft Office Professional Edition 2003, 4 pp.
Screen Dumps of Microsoft Outlook (1999, pp. 1-3).
Screendumps—Microsoft Office (Microsoft Corporation, Microsoft Office Word , Part of Microsoft Office Professional Edition 2003; Copyright © 1983-2003; 16 pages) (as cited by Examiner on Aug. 4, 2009 in related U.S. Appl. No. 10/955,942).
Screendumps—Microsoft Office Outlook, Microsoft Office Outlook Professional Edition 2003, Microsoft Corporation, 2 pages.
Screendumps—Microsoft Office, Microsoft Corporation, Microsoft Office Professional Edition 2003, Copyright © 1983-2003 Microsoft Corporation; 13 pgs.
Screendumps—Microsoft Office, Microsoft Office Professional Edition 2003, Microsoft Corporation, 10 pages.
ScreenShot/Screendumps of MS_Office_2003; Microsoft Corporation, Microsoft Office Professional Edition 2003; 5 pages), (as cited by Examiner on Apr. 15, 2008 in related U.S. Appl. No. 10/955,942).
Selca, et al., "Customizing the Office Fluent User interface in Access 2007", Retrieved from «http://msdn.microsoft.com/en-us/library/bb187398(printer).aspx», Dec. 2006, 22 Pages.
Seo et al, Hangul Office 2000 Tutoring Boor, Sep. 15, 2000, 16 pgs. (Cited in Korean Notice of Rejection May 17, 2011).
Shih, et al., "A Stepwise Refinement Approach to Multimedia Presentation Designs", In IEEE International Conference on Systems, Man, and Cybernetics Computational Cybernetics and Simulation, vol. 1, Oct. 12, 1997, pp. 117-122.
Shinder, Deb, "Locate and organize e-mail messages with Outlook 2003 search folders", retrieved at: http://www.techrepublic.com/article/locate-and-organize-e-mail-messages-with-outlook-2003-search-folders/, Aug. 5, 2004, obtained Sep. 28, 2016, 12 pgs.
Slovak, Ken, "Absolute Beginner's Guide to Microsoft Office Outlook 2003," 2003 Que Publishing, pp. 237-241.
Stephanos Piperoglou, "External Style Sheets," http://www.webreference.com/html/tutorial5/9.html, Aug. 20, 1998, 3 pgs.
Stephanos Piperoglou, "The Style Attribute and CSS Declarations," http://www.webreference.com/html/tutorial5/2, August 20, 1998, 4 pgs.
Supplementary European Search Report dated Jun. 9, 2009 cited in EP Application No. 07795391.7-1225; 7 pgs.
Supplementary Search Report Issued in European Patent Application 09727331.2, dated Jul. 16, 2014, 6 Pages.
Supplementary Search Report Issued in European Patent Application 09767220.8, dated Jan. 30, 2013, 8 Pages.
Supplementary Search Report Issued in European Patent Application 09798374.6, dated May 10, 2013, 6 Pages.
Taiwan Notice of Allowance dated Mar. 29, 2012 cited in Appln No. 10120306600; 6 pgs.
Taiwan Notice of Allowance Issued in Patent Application No. 102112935, dated Aug. 31, 2015, 4 Pages.
Taiwan Notice of Allowance Issued in Patent Application No. 94123640, dated Mar. 12, 2013, 4 Pages. (with English translation).
Taiwan Notice of Allowance Issued in Patent Application No. 98145363, dated Aug. 13, 2015, 4 Pages.
Taiwan Office Action and Search Report Issued in Patent Application No. 98145363, dated Oct. 2, 2014, 25 Pages.
Taiwan Office Action dated Feb. 8, 2012 cited in Appln No. 94123640, with Eng Lang Summary; 15 pgs.
Taiwan Office Action dated Mar. 17, 2014 in Appln. No. 98118252, 10 pgs.
Taiwan Office Action dated May 14, 2012 cited in Appln No. 94122180, with Eng Lang Summary; 5 pgs.
Taiwan Office Action dated May 22, 2015 cited in Appln No. 101133155 with Eng Lang Summary, 4 pgs.
Taiwan Office Action dated May 25, 2015 cited in Appln No. 102112935 with Eng Lang Summary, 4 pgs.
Taiwan Search Report dated Mar. 14, 2012 cited in Appln No. 094123420; 7 pgs.
Taiwan Search Report dated May 12, 2014 cited in Appln No. 098119245, 11 pgs.
Taiwan Search Report dated May 7, 2014 cited in Appln No. 098117357, 13 pgs.
Thailand Notice of Allowance in Application 0501003162, dated Sep. 13, 2016, 1 page. No English translation.
The Discussion Board Component of Blackboard: An Instructor's Guide; Aug. 2004; 23 pgs. (cited in Feb. 1, 2011 OA).
U.S. Final Official Action dated Jan. 23, 2007 in U.S. Appl. No. 10/741,407.
U.S. Final Official Action dated Jan. 28, 2008 cited in U.S. Appl. No. 10/836,154.
U.S. Final Official Action dated Oct. 19, 2006 in U.S. Appl. No. 10/800,056.
U.S. Notice of Allowance dated Apr. 10, 2007 in U.S. Appl. No. 10/741,407, 8 pgs.
U.S. Notice of Allowance dated Aug. 24, 2004 in U.S. Appl. No. 09/896,384, 9 pgs.
U.S. Notice of Allowance dated Jul. 5, 2007 in U.S. Appl. No. 10/607,020, 6 pgs.
U.S. Official Action dated Apr. 1, 2013 in U.S. Appl. No. 12/163,784, 39 pgs.
U.S. Official Action dated Apr. 12, 2007 cited in U.S. Appl. No. 10/851,506.
U.S. Official Action dated Apr. 15, 2008 cited in U.S. Appl. No. 10/955,942, 14 pgs.
U.S. Official Action dated Apr. 15, 2010 in U.S. Appl. No. 11/823,999.
U.S. Official Action dated Apr. 16, 2008 cited in U.S. Appl. No. 10/955,967.
U.S. Official Action dated Apr. 18, 2013 in U.S. Appl. No. 10/851,506, 34 pgs.
U.S. Official Action dated Apr. 18, 2014 in U.S. Appl. No. 11/782,059, 42 pgs.
U.S. Official Action dated Apr. 19, 2012 in U.S. Appl. No. 13/102,633.
U.S. Official Action dated Apr. 21, 2011 in U.S. Appl. No. 11/445,393.
U.S. Official Action dated Apr. 21, 2011 in U.S. Appl. No. 12/574,256.

(56) References Cited

OTHER PUBLICATIONS

U.S. Official Action dated Apr. 23, 2010 in U.S. Appl. No. 12/144,642.
U.S. Official Action dated Apr. 23, 2015 in U.S. Appl. No. 11/332,822, 40 pgs.
U.S. Official Action dated Apr. 25, 2014 in U.S. Appl. No. 12/028,797, 42 pgs.
U.S. Official Action dated Apr. 26, 2012 in U.S. Appl. No. 11/782,059.
U.S. Official Action dated Apr. 27, 2006 in U.S. Appl. No. 10/800,056.
U.S. Official Action dated Apr. 28, 2009 in U.S. Appl. No. 12/028,797.
U.S. Official Action dated Apr. 29, 2008 cited in U.S. Appl. No. 10/955,941.
U.S. Official Action dated Apr. 29, 2013 in U.S. Appl. No. 12/954,952, 18 pgs.
U.S. Official Action dated Apr. 29, 2015 in U.S. Appl. No. 13/427,939, 43 pgs.
U.S. Official Action dated Apr. 4, 2013 in U.S. Appl. No. 11/782,059, 39 pgs.
U.S. Official Action dated Apr. 5, 2012 in U.S. Appl. No. 12/163,758.
U.S. Official Action dated Apr. 7, 2009 in U.S. Appl. No. 10/955,940.
U.S. Official Action dated Aug. 14, 2013 in U.S. Appl. No. 11/332,822, 102 pgs.
U.S. Official Action dated Aug. 17, 2009 in U.S. Appl. No. 11/430,561.
U.S. Official Action dated Aug. 18, 2009 in U.S. Appl. No. 11/782,059.
U.S. Official Action dated Aug. 19, 2013 in U.S. Appl. No. 10/851,506, 24 pgs.
U.S. Official Action dated Aug. 2, 2010 in U.S. Appl. No. 10/955,942, 19 pgs.
U.S. Official Action dated Aug. 2, 2013 in U.S. Appl. No. 12/777,287, 47 pgs.
U.S. Official Action dated Aug. 25, 2014 in U.S. Appl. No. 13/464,572, 117 pgs.
U.S. Official Action dated Aug. 3, 2011 in U.S. Appl. No. 12/142,927.
U.S. Official Action dated Aug. 30, 2013 in U.S. Appl. No. 12/574,256, 31 pgs.
U.S. Official Action dated Aug. 4, 2009 in U.S. Appl. No. 10/955,942, 19 pgs.
U.S. Official Action dated Aug. 4, 2009 in U.S. Appl. No. 10/955,967.
U.S. Official Action dated Aug. 6, 2010 in U.S. Appl. No. 11/401,470.
U.S. Official Action dated Aug. 7, 2012 in U.S. Appl. No. 10/836,154.
U.S. Official Action dated Dec. 10, 2009 in U.S. Appl. No. 10/955,940.
U.S. Official Action dated Dec. 12, 2012 in U.S. Appl. No. 10/851,506, 76 pgs.
U.S. Official Action dated Dec. 12, 2012 in U.S. Appl. No. 12/954,952, 86 pgs.
U.S. Official Action dated Dec. 16, 2010 in U.S. Appl. No. 11/430,562.
U.S. Official Action dated Dec. 20, 2010 in U.S. Appl. No. 11/445,393.
U.S. Official Action dated Dec. 20, 2010 in U.S. Appl. No. 12/574,256.
U.S. Official Action dated Dec. 21, 2007 in U.S. Appl. No. 10/851,506.
U.S. Official Action dated Dec. 23, 2003 in U.S. Appl. No. 09/896,384.
U.S. Official Action dated Dec. 23, 2008 in U.S. Appl. No. 10/955,942, 23 pgs.
U.S. Official Action dated Dec. 24, 2008 in U.S. Appl. No. 10/955,967.
U.S. Official Action dated Dec. 24, 2014 in U.S. Appl. No. 13/102,633, 42 pgs.
U.S. Official Action dated Dec. 28, 2007 in U.S. Appl. No. 10/800,056.
U.S. Official Action dated Dec. 29, 2010 in U.S. Appl. No. 12/028,797, 16 pgs.
U.S. Official Action dated Dec. 31, 2012 in U.S. Appl. No. 12/142,927, 49 pgs.
U.S. Official Action dated Dec. 4, 2007 in U.S. Appl. No. 10/955,940.
U.S. Official Action dated Dec. 5, 2012 in U.S. Appl. No. 12/777,287.
U.S. Official Action dated Dec. 6, 2013 in U.S. Appl. No. 10/851,506, 25 pgs.
U.S. Official Action dated Dec. 8, 2009 in U.S. Appl. No. 11/151,686.
U.S. Official Action dated Dec. 8, 2010 in U.S. Appl. No. 10/851,506.
U.S. Official Action dated Dec. 8, 2010 in U.S. Appl. No. 10/955,967.
U.S. Official Action dated Dec. 9, 2009 in U.S. Appl. No. 12/028,797.
U.S. Official Action dated Feb. 1, 2011 in U.S. Appl. No. 11/332,822.
U.S. Official Action dated Feb. 1, 2011 in U.S. Appl. No. 12/144,642.
U.S. Official Action dated Feb. 11, 2011 in U.S. Appl. No. 11/401,470.
U.S. Official Action dated Feb. 18, 2010 in U.S. Appl. No. 11/782,059.
U.S. Official Action dated Feb. 19, 2010 in U.S. Appl. No. 10/955,942, 19 pgs.
U.S. Official Action dated Feb. 20, 2008 cited in U.S. Appl. No. 10/848,774.
U.S. Official Action dated Feb. 21, 2008 cited in U.S. Appl. No. 10/851,442.
U.S. Official Action dated Feb. 22, 2008 in U.S. Appl. No. 11/445,393.
U.S. Official Action dated Feb. 22, 2010 in U.S. Appl. No. 11/401,470.
U.S. Official Action dated Feb. 24, 2015 in U.S. Appl. No. 11/782,059, 37 pgs.
U.S. Official Action dated Feb. 24, 2015 in U.S. Appl. No. 13/769,598, 33 pgs.
U.S. Official Action dated Feb. 26, 2014 in U.S. Appl. No. 12/954,952, 38 pgs.
U.S. Official Action dated Feb. 27, 2012 in U.S. Appl. No. 12/372,386.
U.S. Official Action dated Feb. 4, 2014 in U.S. Appl. No. 10/607,020, 149 pgs.
U.S. Official Action dated Jan. 12, 2012 in U.S. Appl. No. 11/782,059.
U.S. Official Action dated Jan. 15, 2015 in U.S. Appl. No. 12/028,797, 47 pgs.
U.S. Official Action dated Jan. 16, 2014 in U.S. Appl. No. 13/102,633, 45 pgs.
U.S. Official Action dated Jan. 20 2010 in U.S. Appl. No. 10/955,967.
U.S. Official Action dated Jan. 25, 2010 in U.S. Appl. No. 10/982,073.
U.S. Official Action dated Jan. 26, 2012 in U.S. Appl. No. 12/464,584.
U.S. Official Action dated Jan. 29, 2014 in U.S. Appl. No. 12/777,287, 44 pgs.
U.S. Official Action dated Jan. 29, 2016 in U.S. Appl. No. 14/142,132, 149 pgs.
U.S. Official Action dated Jan. 4, 2007 in U.S. Appl. No. 10/607,020.
U.S. Official Action dated Jan. 4, 2016 in U.S. Appl. No. 13/615,668, 28 pgs.
U.S. Official Action dated Jan. 5, 2011 in U.S. Appl. No. 11/823,999.
U.S. Official Action dated Jan. 6, 2009 in U.S. Appl. No. 10/955,941.
U.S. Official Action dated Jan. 6, 2010 in U.S. Appl. No. 10/607,020.
U.S. Official Action dated Jan. 6, 2011 in U.S. Appl. No. 12/142,927.
U.S. Official Action dated Jan. 7, 2010 in U.S. Appl. No. 11/430,562.
U.S. Official Action dated Jan. 8, 2008 cited in U.S. Appl. No. 10/955,928.
U.S. Official Action dated Jan. 9, 2009 in U.S. Appl. No. 11/430,561.
U.S. Official Action dated Jul. 1, 2010 in U.S. Appl. No. 11/782,059.
U.S. Official Action dated Jul. 1, 2014 in U.S. Appl. No. 12/372,386, 93 pgs.
U.S. Official Action dated Jul. 11, 2007 in U.S. Appl. No. 10/955,941.
U.S. Official Action dated Jul. 11, 2007 in U.S. Appl. No. 10/955,942, 18 pgs.
U.S. Official Action dated Jul. 11, 2007 in U.S. Appl. No. 10/955,967.
U.S. Official Action dated Jul. 13, 2007 in U.S. Appl. No. 10/800,056.
U.S. Official Action dated Jul. 17, 2008 cited in U.S. Appl. No. 10/955,940.
U.S. Official Action dated Jul. 18, 2013 in U.S. Appl. No. 10/607,020, 109 pgs.
U.S. Official Action dated Jul. 23, 2013 in U.S. Appl. No. 11/782,059, 35 pgs.
U.S. Official Action dated Jul. 24, 2008 cited in U.S. Appl. No. 11/151,686.
U.S. Official Action dated Jul. 24, 2013 in U.S. Appl. No. 12/142,927, 42 pgs.
U.S. Official Action dated Jul. 26, 2006 in U.S. Appl. No. 10/741,407.
U.S. Official Action dated Jul. 30, 2014 in U.S. Appl. No. 13/102,633, 36 pgs.
U.S. Official Action dated Jul. 6, 2010 in U.S. Appl. No. 10/955,967.
U.S. Official Action dated Jul. 8, 2011 in U.S. Appl. No. 11/401,470.
U.S. Official Action dated Jul. 8, 2011 in U.S. Appl. No. 12/163,784.
U.S. Official Action dated Jul. 9, 2008 cited in U.S. Appl. No. 11/136,800.
U.S. Official Action dated Jun. 1, 2009, U.S. Appl. No. 11/445,393.
U.S. Official Action dated Jun. 10, 2009 in U.S. Appl. No. 11/154,278.
U.S. Official Action dated Jun. 11, 2009 in U.S. Appl. No. 11/151,686.
U.S. Official Action dated Jun. 12, 2015 in U.S. Appl. No. 13/615,668, 26 pgs.
U.S. Official Action dated Jun. 14, 2007 in U.S. Appl. No. 10/836,154.

(56) References Cited

OTHER PUBLICATIONS

U.S. Official Action dated Jun. 17, 2015 in U.S. Appl. No. 13/437,031, 12 pgs.
U.S. Official Action dated Jun. 19, 2008 cited in U.S. Appl. No. 10/851,506.
U.S. Official Action dated Jun. 19, 2009 in U.S. Appl. No. 11/430,562.
U.S. Official Action dated Jun. 19, 2012 in U.S. Appl. No. 12/769,787.
U.S. Official Action dated Jun. 19, 2015 in U.S. Appl. No. 14/150,531, 135 pgs.
U.S. Official Action dated Jun. 2, 2014 in U.S. Appl. No. 13/769,598, 32 pgs.
U.S. Official Action dated Jun. 20, 2008 cited in U.S. Appl. No. 10/955,928.
U.S. Official Action dated Jun. 21, 2007 in U.S. Appl. No. 10/955,928.
U.S. Official Action dated Jun. 22, 2010 in U.S. Appl. No. 11/430,562.
U.S. Official Action dated Jun. 23, 2010 in U.S. Appl. No. 10/955,940.
U.S. Official Action dated Jun. 24, 2009 in U.S. Appl. No. 10/607,020.
U.S. Official Action dated Jun. 24, 2015 in U.S. Appl. No. 13/769,598, 20 pgs.
U.S. Official Action dated Jun. 25, 2010 in U.S. Appl. No. 11/332,822.
U.S. Official Action dated Jun. 27, 2008 cited in U.S. Appl. No. 11/430,416.
U.S. Official Action dated Jun. 3, 2010 in U.S. Appl. No. 12/028,797.
U.S. Official Action dated Jun. 3, 2013 in U.S. Appl. No. 13/102,633, 29 pgs.
U.S. Official Action dated Jun. 30, 2015 in U.S. Appl. No. 11/782,059, 30 pgs.
U.S. Official Action dated Jun. 4, 2007 in U.S. Appl. No. 10/955,940.
U.S. Official Action dated Jun. 6, 2012 in U.S. Appl. No. 12/777,287.
U.S. Official Action dated Jun. 7, 2011 in U.S. Appl. No. 11/332,822.
U.S. Official Action dated Jun. 8, 2009 in U.S. Appl. No. 10/982,073.
U.S. Official Action dated Jun. 9, 2011 in U.S. Appl. No. 12/464,584.
U.S. Official Action dated Mar. 1, 2013 in U.S. Appl. No. 11/430,562, 66 pgs.
U.S. Official Action dated Mar. 14, 2011 in U.S. Appl. No. 12/163,784.
U.S. Official Action dated Mar. 14, 2012 in U.S. Appl. No. 12/142,927.
U.S. Official Action dated Mar. 14, 2013 in U.S. Appl. No. 12/574,256, 73 pgs.
U.S. Official Action dated Mar. 18, 2009 in U.S. Appl. No. 11/401,470.
U.S. Official Action dated Mar. 21, 2016 in U.S. Appl. No. 13/437,031, 41 pgs.
U.S. Official Action dated Mar. 27, 2015 in U.S. Appl. No. 12/142,927, 68 pgs.
U.S. Official Action dated Mar. 3, 2014 in U.S. Appl. No. 11/332,822, 38 pgs.
U.S. Official Action dated Mar. 30, 2010 in U.S. Appl. No. 11/217,071.
U.S. Official Action dated Mar. 4, 2014 in U.S. Appl. No. 12/142,927, 45 pgs.
U.S. Official Action dated May 12, 2011 in U.S. Appl. No. 12/753,923.
U.S. Official Action dated May 14, 2014 in U.S. Appl. No. 13/615,668, 34 pgs.
U.S. Official Action dated May 19, 2011 in U.S. Appl. No. 10/851,506.
U.S. Official Action dated May 19, 2011 in U.S. Appl. No. 11/430,562.
U.S. Official Action dated May 21, 2013 in U.S. Appl. No. 13/437,031, 13 pgs.
U.S. Official Action dated May 23, 2013 in U.S. Appl. No. 11/401,470, 101 pgs.
U.S. Official Action dated May 25, 2010 in U.S. Appl. No. 10/607,020.
U.S. Official Action dated May 28, 2008 cited in U.S. Appl. No. 10/982,073.
U.S. Official Action dated May 30 2014 in U.S. Appl. No. 13/027,289, 188 pgs.
U.S. Official Action dated May 30, 2008 cited in U.S. Appl. No. 11/430,562.
U.S. Official Action dated May 5, 2010 in U.S. Appl. No. 10/851,506.
U.S. Official Action dated May 5, 2011 in U.S. Appl. No. 10/836,154.
U.S. Official Action dated May 8, 2012 in U.S. Appl. No. 12/144,642.
U.S. Official Action dated Nov. 10, 2015 in U.S. Appl. No. 14/150,531, 31 pgs.
U.S. Official Action dated Nov. 13, 2008 in U.S. Appl. No. 11/430,562.
U.S. Official Action dated Nov. 13, 2009 in U.S. Appl. No. 11/154,278.
U.S. Official Action dated Nov. 15, 2013 in U.S. Appl. No. 11/782,059, 33 pgs.
U.S. Official Action dated Nov. 2, 2011 in U.S. Appl. No. 10/836,154.
U.S. Official Action dated Nov. 22, 2010 in U.S. Appl. No. 11/782,059.
U.S. Official Action dated Nov. 23, 2012 in U.S. Appl. No. 11/782,059.
U.S. Official Action dated Nov. 24, 2009 in U.S. Appl. No. 11/445,393.
U.S. Official Action dated Nov. 25, 2008 cited in U.S. Appl. No. 11/154,278.
U.S. Official Action dated Nov. 26, 2010 in U.S. Appl. No. 12/753,923.
U.S. Official Action dated Nov. 28, 2014 in U.S. Appl. No. 13/437,031, 100 pgs.
U.S. Official Action dated Nov. 29, 2013 in U.S. Appl. No. 13/769,598, 73 pgs.
U.S. Official Action dated Nov. 8, 2013 in U.S. Appl. No. 13/615,668, 114 pgs.
U.S. Official Action dated Nov. 9, 2010 in U.S. Appl. No. 10/607,020.
U.S. Official Action dated Oct. 1, 2015 in U.S. Appl. No. 13/427,939, 25 pgs.
U.S. Official Action dated Oct. 10, 2014 in U.S. Appl. No. 11/332,822, 47 pgs.
U.S. Official Action dated Oct. 24, 2012 in U.S. Appl. No. 13/102,633.
U.S. Official Action dated Oct. 24, 2014 in U.S. Appl. No. 13/615,668, 35 pgs.
U.S. Official Action dated Oct. 25, 2011 in U.S. Appl. No. 12/144,642.
U.S. Official Action dated Oct. 28, 2008 cited in U.S. Appl. No. 11/151,686.
U.S. Official Action dated Oct. 5, 2009 in U.S. Appl. No. 11/332,822.
U.S. Official Action dated Oct. 9, 2007 in U.S. Appl. No. 10/982,073.
U.S. Official Action dated Sep. 10, 2014 in U.S. Appl. No. 12/954,952, 52 pgs.
U.S. Official Action dated Sep. 11, 2012 in U.S. Appl. No. 12/163,784.
U.S. Official Action dated Sep. 11, 2014 in U.S. Appl. No. 13/427,939, 133 pgs.
U.S. Official Action dated Sep. 13, 2011 in U.S. Appl. No. 12/372,386.
U.S. Official Action dated Sep. 13, 2012 in U.S. Appl. No. 13/437,031.
U.S. Official Action dated Sep. 14, 2011 in U.S. Appl. No. 12/163,758.
U.S. Official Action dated Sep. 14, 2015 in U.S. Appl. No. 12/142,927, 31 pgs.
U.S. Official Action dated Sep. 15, 2009 in U.S. Appl. No. 11/217,071.
U.S. Official Action dated Sep. 16, 2010 in U.S. Appl. No. 12/144,642.
U.S. Official Action dated Sep. 18, 2014 in U.S. Appl. No. 11/782,059, 41 pgs.
U.S. Official Action dated Sep. 21, 2010 in U.S. Appl. No. 11/217,071.
U.S. Official Action dated Sep. 23, 2009 in U.S. Appl. No. 11/401,470.
U.S. Official Action dated Sep. 26, 2007 in U.S. Appl. No. 11/151,686.
U.S. Official Action dated Sep. 27, 2010 in U.S. Appl. No. 10/836,154.
U.S. Official Action dated Sep. 30, 2014 in U.S. Appl. No. 13/595,084, 185 pgs.
U.S. Official Action dated Sep. 6, 2007 in U.S. Appl. No. 11/136,800.
U.S. Official Action dated Sep. 6, 2013 in U.S. Appl. No. 12/028,797, 113 pgs.
U.S. Official Action dated Oct. 8, 2008 cited in U.S. Appl. No. 11/445,393.
U.S. Official Action dated Dec. 11, 2008 in U.S. Appl. No. 10/982,073.
U.S. Appl. No. 10/780,547, Office Action dated Jun. 14, 2007, 6 Pages.
U.S. Appl. No. 10/800,056, Advisory Action dated Feb. 14, 2007, 3 pgs.
U.S. Appl. No. 10/955,967, Notice of Allowance dated Apr. 10, 2012, 18 Pages.
U.S. Appl. No. 11/332,822, Amendment and Response filed Aug. 11, 2016, 7 pgs.
U.S. Appl. No. 11/332,822, Notice of Allowance dated Jul. 6, 2016, 9 pgs.
U.S. Appl. No. 11/332,822, Notice of Allowance dated Aug. 26, 2016, 9 pgs.
U.S. Appl. No. 11/332,822, Notice of Allowance dated Sep. 14, 2016, 2 pgs.
U.S. Appl. No. 12/028,797, Notice of Allowance dated Feb. 27, 2015, 14 pgs.
U.S. Appl. No. 12/142,927, Office Action dated Apr. 7, 2016, 21 pgs.

(56) References Cited

OTHER PUBLICATIONS

U.S. Appl. No. 12/372,386 Notice of Allowance dated Mar. 10, 2015, 3 Pages.
U.S. Appl. No. 12/372,386, Notice of Allowance dated Mar. 23, 2015, 5 Pages.
U.S. Appl. No. 13/169,598, Notice of Allowance dated Apr. 7, 2016, 4 pgs.
U.S. Appl. No. 13/427,939, Office Action dated May 25, 2016, 18 pgs.
U.S. Appl. No. 13/427,939, Office Action dated Sep. 13, 2016, 13 pgs.
U.S. Appl. No. 13/615,668, Office Action dated Sep. 1, 2016, 18 pgs.
U.S. Appl. No. 13/769,598, Notice of Allowance dated Apr. 7, 2016, 4 pgs.
U.S. Appl. No. 13/925,523, Office Action dated Aug. 2, 2016, 7 pgs.
U.S. Appl. No. 14/032,094, Notice of Allowance dated Apr. 18, 2016, 2 pgs.
U.S. Appl. No. 14/032,094, Notice of Allowance dated Jun. 24, 2016, 8 pgs.
U.S. Appl. No. 14/032,094, Notice of Allowance dated Aug. 9, 2016, 2 pgs.
U.S. Appl. No. 14/032,094, Notice of Allowance dated Sep. 30, 2016, 9 pgs.
U.S. Appl. No. 14/142,132, Notice of Allowance dated Aug. 3, 2016, 17 pgs.
U.S. Appl. No. 14/150,531, Office Action dated May 20, 2016, 22 pgs.
U.S. Appl. No. 14/226,421, Notice of Allowance dated Aug. 31, 2016, 7 pgs.
U.S. Appl. No. 14/226,421, Office Action dated May 6, 2016, 18 pgs.
Venolia et al., Gina Danielle, Supporting Email Workflow, revised Dec. 2001; 11 pgs. (cited in OA Jan. 6, 2011).
Walther, Henrik, "Using Search Folders in Outlook 2003", retrieved at: http://www.outlookexchange.com/articles/henrikwalther/using_search_folders_in_outlook_2003.asp, published Jan. 2004, obtained Sep. 28, 2016, 5 pgs.
Whitechapel et al., "Microsoft Visual Studio 2005 Tools for the 2007 Microsoft Office", Sep. 2006, http://72.14.235.104/search?q=cache:kXdufDB6o-wJ:download.microsoft.com/download/3/2/d/32db7049-bc04-4c79-a91b-7f62eaae754a/VSTO2005SE_Tutorial.doc+This+tutorial+focuses+on+the+new +features+introduced+in-VSTO+2005_SE&hl=en&ct=clnk&cd=3&gl=in (added per B. Haslam, Jan. 26, 2011, references cited from U.S. Pat. No. 7,802,199 Sep. 21, 2010 Patent).
Wiley, Microsoft® Office Outlook® 2007 for Dummies®, published Dec. 26, 2006; 9 pgs. (cited in Dec. 31, 2012 OA).
Word 2002, Chapter 14; Paradigm Publishing Inc., copyright 2002; http://www.emcp.com/tech_tutorials/sig_irc/Signature_Word_Chapter_14.ppt, 21 pp.
Word 2003 Introduction, Retrieved from: «http://www.photoshoplondon.com/www/training-manuals/Word2003Intro.pdf», The Mouse Training Company, Sep. 9, 1999, 166 Pages.
Yang, "Email Categorization Using Fast Machine Learning Algorithms", 2002, 8 pgs. (Search Rpt).
Yaser, "Microsoft Office Word 2003", Retrieved from: «http://www.just.edu.jo/~yaser/courses/cs98/slides/Microsoft%20Office%20Word%202003.ppt», 2003, 49 Pages.
Zweben et al., Scheduling and Rescheduling with Iterative Repair, © 1993; IEEE; 9 pages. (cited in May 7, 2014 NOA).
Zykov, Sergey V., "ConceptModeller: A Problem-Oriented Visual SDK for Globally Distributed Enterprise Systems", Proceedings of the 7th International Workshop on Computer Science and Information Technologies (CSIT'2005), vol. 1, Ufa State Aviation Technical University, USATA Editorial-Publishing Office, Ufa, 2005, pp. 114-117. (added per B. Haslam, references cited from U.S. Pat. No. 7,865,868 Jan. 4, 2011 Patent).
Korean Notice of Allowance Issued in Application 10-2011-7026740, dated Sep. 8, 2016, 2 Pages. (w/o English Translation).
European Notice of Allowance in Application 05107184.3, dated Aug. 31, 2016, 7 pgs.
Taiwan Notice of Allowance in Appln No. 101133155, dated Sep. 4, 2015, 4 pgs.
U.S. Appl. No. 11/332,822, Notice of Allowance dated Nov. 8, 2016, 3 pgs.
U.S. Appl. No. 11/332,822, Notice of Allowance dated Dec. 12, 2016, 2 pgs.
U.S. Appl. No. 14/150,531, Notice of Allowance dated Nov. 29, 2016, 5 pgs.
U.S. Appl. No. 14/226,421, Notice of Allowance dated Nov. 30, 2016, 8 pgs.
U.S. Appl. No. 13/925,523, Notice of Allowance dated Dec. 6, 2016, 5 pgs.
U.S. Appl. No. 12/142,927, Notice of Allowance dated Jan. 9, 2017, 10 pgs.
U.S. Appl. No. 13/437,031, Office Action dated Dec. 27, 2016, 8 pgs.
U.S. Appl. No. 13/615,668, Notice of Allowance dated Jan. 9, 2017, 10 pgs.
U.S. Appl. No. 14/032,094, Notice of Allowance dated Jan. 6, 2017, 9 pgs.
U.S. Appl. No. 12/142,927, Notice of Allowance dated Jan. 30, 2017, 7 pgs.
U.S. Appl. No. 13/427,939, Notice of Allowance dated Jan. 17, 2017, 9 pgs.
Canadian Office Action in Application 2848700, dated Jan. 26, 2017, 4 pgs.
European Summons to Attend Oral Hearing in Application 05105584.6, dated Jul. 22, 2016, 6 pgs.
Indian Office Action in Application 01489/DELNP/2008, dated Aug. 31, 2015, 3 pgs.
Korean Notice of Allowance in Application 10-2016-7034274, dated Jan. 31, 2017, 2 pgs. (no English translation).
Brazilian Office Action Issued in Patent Application No. PI0505014-6, dated Jan. 5, 2017, 6 Pages. (with English translation).
U.S. Appl. No. 12/142,927, Notice of Allowance dated Mar. 3, 2017, 2 pgs.
U.S. Appl. No. 10/607,020, Notice of Allowance dated Feb. 28, 2017, 20 pgs.
U.S. Appl. No. 13/615,668, Notice of Allowance dated Feb. 21, 2017, 2 pgs.
U.S. Appl. No. 14/032,094, Notice of Allowance dated Mar. 16, 2017, 2 pgs.
U.S. Appl. No. 13/427,939, Notice of Allowance dated Feb. 9, 2017, 2 pgs.
U.S. Appl. No. 13/427,939, Notice of Allowance dated Feb. 22, 2017, 3 pgs.
U.S. Appl. No. 14/226,421, Notice of Allowance dated Mar. 13, 2017, 8 pgs.
U.S. Appl. No. 14/150,531, Notice of Allowance dated Feb. 17, 2017, 5 pgs.
European Office Action in Application 06814334.6, dated Jan. 31, 2017, 5 pgs.
European Decision to Refuse and Minutes in Oral Proceeding in Application 05105584.6, dated Mar. 28, 2017, 20 pgs.
U.S. Appl. No. 13/615,668, Notice of Allowance dated Apr. 13, 2017, 2 pgs.
U.S. Appl. No. 14/032,094, Notice of Allowance dated Apr. 13, 2017, 2 pgs.
U.S. Appl. No. 13/427,939, Notice of Allowance dated Apr. 7, 2017, 2 pgs.
Indian Office Action in Application 08037/CHENP/2010, dated Mar. 29, 2017, 7 pgs.
U.S. Appl. No. 14/150,531, Notice of Allowance dated Apr. 19, 2017, 2 pgs.
U.S. Appl. No. 12/142,927, Notice of Allowance dated May 3, 2017, 2 pgs.
U.S. Appl. No. 14/635,605, Ex Parte Quayle Action dated May 4, 2017, 8 pgs.
Brazilian Office Action Issued in Patent Application No. PI0506116-4, dated Apr. 20, 2017, 5 Pages. (with English Summary).

(56) References Cited

OTHER PUBLICATIONS

European Summons to Attend Oral Proceedings in Application 09798374.6, dated Jun. 1, 2017, 11 pgs. (1832 EPWO).
U.S. Appl. No. 14/150,531, Notice of Allowance dated May 26, 2017, 2 pgs.
U.S. Appl. No. 13/615,668, Notice of Allowance dated May 26, 2017, 2 pgs.
U.S. Appl. No. 14/032,094, Notice of Allowance dated May 25, 2017, 2 pgs.
U.S. Appl. No. 14/150,531, Notice of Allowance dated Jul. 7, 2017, 2 pgs.
U.S. Appl. No. 14/226,421, Notice of Allowance dated Jul. 6, 2017, 8 pgs.
U.S. Appl. No. 13/437,031, Office Action dated Jun. 15, 2017, 9 pgs.
Brazilian Office Action in Application PI0506081-8, dated Jun. 21, 2017, 7 pages.
Notice of Allowance Issued in U.S. Appl. No. 11/430,562, dated Sep. 5, 2013, 25 Pages.
U.S. Appl. No. 14/635,605, Response to Ex Parte Quayle Action filed Aug. 4, 2017, 3 pgs.
U.S. Appl. No. 14/635,605, Notice of Allowance dated Aug. 25, 2017, 9 pgs.
"Office Action Issued in European Patent Application No. 10775348.5", dated Mar. 3, 2015, 3 Pages.
"Office Action Issued in Mexican Patent Application No. MX/a/2008/014849", dated May 3, 2017, 21 Pages.
"Office Action Issued in Mexican Patent Application No. MX/a/2008/014849", dated Jan. 25, 2012, 7 Pages.
"Office Action Issued in Taiwan Patent Application No. 98119245", date May 20, 2014, 11 Pages.
Agha, Gula.., et al. "Modular Heterogeneous System Development: A Critical Analysis of Java", In Proceedings of the Seventh Heterogeneous Computing Workshop 1998 (HCW 98), Mar. 30, 1998, 12 Pages.
"Office Action Issued in Chilean Patent Application No. 200501770", dated May 27, 2008, 2 Pages.
"Office Action Issued in Japanese Patent Application No. 2004-188926", dated May 21, 2010, 3 Pages.
"Office Action Issued in Canadian Patent Application No. 2,848,700", dated Jan. 26, 2017, 4 Pages.
"Office Action Issued in Canadian Patent Application No. 2,617,182", dated Sep. 16, 2013, 2 Pages.
"Supplementary European Search Report Issued in European Patent Application No. 06790087", dated Dec. 2, 2008, 7 Pages.
"Office Action Issued in Israel Patent Application No. 194785", dated Jul. 29, 2015, 2 Pages.
"Office Action Issued in Brazil Patent Application No. PI06152376", dated Apr. 2, 2018, 8 Pages.
"Office Action Issued in Brazilian Patent Application No. PI0503986-0", dated Apr. 27, 2018, 7 Pages.
"Office Action Issued in Israeli Patent Application No. 170668", dated Dec. 25, 2014, 2 Pages.
"Office Action Issued in Chile Patent Application No. 1560-2010", dated Dec. 24, 2010, 5 Pages.
"Office Action Issued in Chilean Patent Application No. 1559-2010", dated Apr. 18, 2012, 6 Pages.
"Office Action Issued in Mexican Patent Application No. MX/a/2008/014849", dated May 14, 2013, 8 Pages.
"Office Action Issued in Indonesian Patent Application No. W00200800746", dated Sep. 7, 2009, 2 Pages.
"Office Action Issued in Mexican Patent Application No. MX/a/2008/003342", dated Jan. 28, 2014, 4 Pages.
"Office Action Issued in Mexican Patent Application No. MX/a/2008/003342", dated May 7, 2012, 7 Pages.
"Office Action Issued in Philippines Patent Application No. 12005000495", dated Apr. 23, 2009, 1 Page.
"Non Final Official Action Issued in U.S. Appl. No. 13/102,633", dated Jun. 3, 2013, 5 Pages.
"Final Office Action Issued in U.S. Appl. No. 14/226,421", dated Apr. 27, 2018, 7 Pages.
"Final Office Action Issued in U.S. Appl. No. 14/816,844", dated Apr. 18, 2018, 22 Pages.
Israel Office Action in Application 169717, dated Oct. 26, 2009 with English translation, 2 pages.
U.S. Appl. No. 14/816,844, dated Dec. 5, 2017, 28 pages.
"Adobe Photoshop 7.0 for Windows Student Edition Complete", Retrieved from: https://www.salford.ac.uk/library/help/workbooks/photoshop7.pdf, 335 Pages.
"Notice of Allowance Issued in U.S. Appl. No. 13/437,031", dated Jul. 2, 2018, 9 Pages.
"First Examination Report Issued in Indian Patent Application No. 8262/CHENP/2010", dated Jul. 19, 2018, 7 Pages.
"Decision to Grant Issued in Russian patent Application No. 2014136806", dated Jun. 4, 2018, 29 Pages.
"Final Office Action Issued in U.S Appl. No. 14/981,404", dated Jul. 30, 2018, 11 Pages.
"Office Action Issued in Philippines Patent Application No. PH/1/2005/404", dated Jan. 23, 2006, 1 Page.
"Office Action Issued in European Patent Application No. 10775348.5", dated Nov. 2, 2015, 7 Pages.
"Office Action Issued in Mexican Patent Application No. MX/a/2008/014849", dated Jan. 20, 2014, 6 Pages.
"Office Action Issued in Mexican Patent Application No. MX/a/2010/014056", dated Feb. 6, 2013, 4 Pages.
"Run for the Border: Using Borders in Word", Retrieved on: Feb. 7, 2014, Retrieved from https://web.archive.org/web/20160703125655/http://word.mvps.org:80/FAQs/TblsFldsFms/Borders.htm, 5 Pages.
"Office Action Issued in European Patent Application No. 09767220.8", dated Apr. 11, 2017, 9 Pages.
"Screen Dumps of Microsoft Windows 5.1", Microsoft Corporation, 2001,13 Pages.
"International Search Report and Written Opinion Issued in PCT Application No. PCT/US2006/035079", dated Feb. 26, 2007, 10 Pages.
"Software License Use Management (XSLM)", Retrieved From: http://pubs.opengroup.org/onlinepubs/9691999399/toc.pdf, Mar. 1999, 286 Pages.
"Office Action Issued in Mexican Patent Application No. PA/a/2005/008354", dated Apr. 24, 2012, 23 Pages.
"Office Action Issued in European Patent Application No. 09798374.6", dated Jan. 19, 2018, 2 Pages.
"Office Action Issued in Mexican Patent Application No. PA/a/2005/008349", dated Dec. 3, 2009, 5 Pages.
"Office Action Issued in European Patent Application No. 04102463.9", dated May 31, 2006, 9 Pages.
"Office Action Issued in Thailand Patent Application No. 0501002670.", dated Jun. 13, 2018, 2 Pages.
"Office Action Issued in Mexican Patent Application No. PA/a/2005/008351", dated Mar. 26, 2013, 29 Pages.
"Office Action Issued in European Patent Application No. 05107153.8", dated Jul. 3, 2017, 6 Pages.
"Non-Final Office Action Issued in U.S. Appl. No. 10/836,154", dated Jul. 24, 2008, 17 Pages.
"Office Action Issued in European Patent Application No. 06740575.3", dated Apr. 18, 2013, 12 Pages.
"Search Report Issued in European Patent Application No. 06790087.8", dated Jul. 22, 2016, 6 Pages.
"Office Action Issued in European Patent Application No. 06803424.8", dated Mar. 20, 2017, 2 Pages.
"Office Action Issued in Mexican Patent Application No. PA/a/2005/008351", dated Dec. 1, 2009, 4 Pages.
"Office Action Issued in Mexican Patent Application No. PA/a/2005/008350", dated Dec. 4, 2009, 5 Pages.
"Office Action Issued in European Patent Application No. 06814358.5", dated Sep. 18, 2017, 6 Pages.
"Search Report Issued in European Patent Application No. 06814358.5", dated Apr. 7, 2010, 4 Pages.
"Office Action Issued in Mexican Patent Application No. PA/a/2005/008350", dated Jun. 11, 2013, 28 Pages.
"Office Action Issued in Indian Patent Application No. 08311/CHENP/2010", dated Aug. 27, 2018, 6 Pages.
"Office Action Issued in Brazilian Patent Application No. PI05039860" dated Aug. 27, 2018, 7 Pages.

(56) References Cited

OTHER PUBLICATIONS

"Office Action Issued in Israeli Patent Application No. 252770", dated May 8, 2018, 2 Pages.
"Office Action Issued in Chilean Patent Application No. 2512-2005", dated May 20, 2009, 4 Pages.
"Office Action Issued in Patent Application No. 201101987", dated Jul. 29, 2013, 11 Pages.
"Office Action Issued in Chilean Patent Application No. 201101987", dated Jun. 3, 2014, 11 Pages.
"Office Action Issued in Chinese Patent Application No. 200910148820.4", dated Oct. 30, 2014, 14 Pages.
"Office Action Issued in Norway Patent Application No. 20084584", dated Nov. 19, 2016, 4 Pages.
"Office Action Issued in Norway Patent Application No. 20084584", dated Dec. 19, 2017, 4 Pages.
"Office Action Issued in Australian Patent Application No. 2008005225", dated Apr. 15, 2009, 4 Pages.
"Office Action Issued in Chinese Patent Application No. 200680030421.2", dated Apr. 3, 2009, 7 Pages.
"Office Action Issued in Norway Patent Application No. 20054097", dated May 11, 2015, 6 Pages.
"Office Action Issued in Norweign Patent Application No. 20053658", dated Dec. 16, 2014, 4 Pages.
"Office Action Issued in Norweign Patent Application No. 20053655", dated Dec. 16, 2014, 2 Pages.
"Office Action Issued in Brazilian Patent Application No. PI0615782-3", dated Dec. 20, 2017, 5 Pages.
"Examination Report Issued in New Zealand Patent Application No. 541301", dated Nov. 8, 2006, 1 Page.
"Office Action Issued in Russian Patent Application No. 2005125836", dated Sep. 10, 2009, 10 Pages.
"Office Action Issued in Russian Patent Application No. 200512036328", dated Jul. 24, 2009, 8 Pages.
"Office Action Issued in Indian Patent Application No. 8936/DELNP/2010", dated May 16, 2018, 7 Pages.
"Final Office Action Issued in U.S. Appl. No. 14/841,698", dated Apr. 18, 2018, 27 Pages.
"Office Action Issued in Thailand Patent Application No. 0501003163", dated Oct. 8, 2018, 4 Pages.
"Office Action Issued in Thailand Patent Application No. 0501003164", dated Oct. 11, 2018, 3 Pages.
"Non Final Office Action Issued in U.S. Appl. No. 13/437,031", dated Nov. 26, 2018, 8 Pages.
"Final Office Action Issued in U.S. Appl. No. 14/816,844", dated Jan. 18, 2019, 20 Pages.
"Non Final Office Action Issued in U.S. Appl. No. 14/816,844", dated Nov. 5, 2018, 19 Pages.
"Notice of Allowance Issued in U.S. Appl. No. 14/981,404", dated Sep. 26, 2018, 10 Pages.
"Non Final Office Action Issued in U.S. Appl. No. 15/359,575", dated Oct. 2, 2018, 12 Pages.
"Maintain" Merriam Webster's Collegiate Dictionary, In the book of Merriam Webster's Collegiate Dictionary, 1997, 10th Edition, pp. 702.
Shoup, Richard G., "Menu-Driven User Interfaces for Videographics", In Proceedings of the 17th Annual SMPTE Television Conference, Feb. 4, 1983, 3 Pages.
"First Examination Report Issued in Indian Patent Application No. 5323/CHENP/2011", dated Mar. 8, 2019, 7 Pages.
"First Examination Report Issued in Indian Patent Application No. 8285/CHENP/2011", dated Mar. 15, 2019, 7 Pages.
"Non Final Office Action Issued in U.S. Appl. No. 15/476,220", dated Mar. 21, 2019, 7 Pages.
"Office Action Issued in European Patent Application No. 09770706.1", dated Feb. 27, 2019, 5 Pages.
Notice of Allowance Issued in Korean Patent Application No. 10-2004-0048176, dated Jul. 12, 2013, 2 Pages.
"Non Final Office Action Issued in U.S. Appl. No. 14/816,844", dated Apr. 22, 2019, 19 Pages.
"Getting Results with Microsoft Office 97", Published by Microsoft, 1997, 8 Pages.
"Non Final Office Action Issued in U.S. Appl. No. 15/605,004", dated May 2, 2019, 17 Pages.
"Non Final Office Action Issued in U.S. Appl. No. 15/631,842", dated May 30, 2019, 14 Pages.
"Non Final Office Action Issued in U.S. Appl. No. 15/796,216", dated Jun. 11, 2019, 25 Pages.
"Office Action Issued in Brazilian Patent Application No. PI0914960-0", dated May 27, 2019, 5 Pages.
"Non Final Office Action Issued in U.S. Appl. No. 15/483,901", dated Jul. 10, 2019, 14 Pages.
"Office Action Issued in Brazilian Patent Application No. PI0913024-1", dated Jul. 7, 2019, 5 Pages.
"Office Action Issued in Brazilian Patent Application No. PI0914946-5", dated Jun. 13, 2019, 5 Pages.
"Notice of Allowance Issued In U.S. Appl. No. 15/476,220", dated Aug. 15, 2019, 10 Pages.
"Final Office Action Issued in U.S. Appl. No. 15/605,004", dated Aug. 29, 2019, 17 Pages.
"Office Action Issued in Brazilian Patent Application No. PI10072640", dated Sep. 1, 2019, 5 Pages.
"Office Action Issued in Brazilian Patent Application No. PI10133348", dated Aug. 24, 2019, 5 Pages.
"Office Action Issued in Brazilian Patent Application No. PI0914960-0", dated Aug. 30, 2019, 6 Pages.
"Second Office Action Issued in Brazilian Patent Application No. PI0913024-1", dated Sep. 25, 2019, 4 Pages.

424

☐ NONE
TURN OFF DATA LABELS FOR SELECTION

☐ OUTSIDE END
DISPLAY LABELS AND POSITION OUTSIDE END FOR SELECTION

☐ INSIDE END
DISPLAY LABELS AND POSITION INSIDE END FOR SELECTION

☐ CENTER
DISPLAY LABELS AND POSITION CENTERED FOR SELECTION

☐ INSIDE BASE
DISPLAY LABELS AND POSITION INSIDE BASE FOR SELECTION

MORE TITLE OPTIONS...

555

444

HORIZONTAL GRIDLINE ▷   560
VERTICAL GRIDLINES ▷

☐ NONE
DO NOT DISPLAY HORIZONTAL GRIDLINES

☐ MAJOR GRIDLINES
DISPLAY HORIZONTAL GRIDLINES FOR MAJOR UNITS

☐ MAJOR & MINOR GRIDLINES
DISPLAY HORIZONTAL GRIDLINES FOR MINOR UNITS

MORE TITLE OPTIONS...

565

☐ NONE
DO NOT DISPLAY VERTICAL GRIDLINES

☐ MAJOR GRIDLINES
DISPLAY VERTICAL GRIDLINES FOR MAJOR UNITS

☐ MAJOR & MINOR GRIDLINES
DISPLAY VERTICAL GRIDLINES FOR MINOR UNITS

MORE TITLE OPTIONS...

| HORIZONTAL AXIS ▷ |
| VERTICAL AXIS ▷ |
| DEPTH AXIS ▷ |

575

☐ NONE
DO NOT DISPLAY HORIZONTAL AXIS

☐ SHOW DEFAULT AXIS
DISPLAY HORIZONTAL AXIS WITH DEFAULT ORDER AND LABELS

☐ SHOW AXIS WITHOUT LABELING
DISPLAY HORIZONTAL AXIS WITHOUT LABELS AND TICK-MARKS

☐ SHOW REVERSE AXIS
DISPLAY HORIZONTAL AXIS WITH VALUES IN REVERSE ORDER

MORE TITLE OPTIONS...

580

☐ NONE
DO NOT DISPLAY VERTICAL AXIS

☐ SHOW AXIS
DISPLAY VERTICAL AXIS WITH DEFAULT UNITS

☐ SHOW AXIS IN THOUSANDS
DISPLAY VERTICAL AXIS WITH NUMBERS REPRESENTED IN THOUSANDS

☐ SHOW AXIS IN MILLIONS
DISPLAY VERTICAL AXIS WITH NUMBERS REPRESENTED IN MILLIONS

☐ SHOW AXIS IN BILLIONS
DISPLAY VERTICAL AXIS WITH NUMBERS REPRESENTED IN BILLIONS

☐ SHOW AXIS WITH LOG SCALE
DISPLAY VERTICAL AXIS USING A LOG 10 BASED SCALE

MORE TITLE OPTIONS...

MODIFYING AND FORMATTING A CHART USING PICTORIALLY PROVIDED CHART ELEMENTS

CROSS-REFERENCE TO RELATED PATENT APPLICATIONS

This patent application is a continuation of U.S. patent application Ser. No. 14/150,531, filed Jan. 8, 2014, entitled "MODIFYING AND FORMATTING A CHART USING PICTORIALLY PROVIDED CHART ELEMENTS," now U.S. Pat. No. 9,727,989, which is a continuation-in-part of U.S. patent application Ser. No. 12/574,256, filed Oct. 6, 2009, entitled "MODIFYING AND FORMATTING A CHART USING PICTORIALLY PROVIDED CHART ELEMENTS," now U.S. Pat. No. 8,638,333, which is a continuation of U.S. patent application Ser. No. 11/445,393, filed Jun. 1, 2006, entitled "MODIFYING AND FORMATTING A CHART USING PICTORIALLY PROVIDED CHART ELEMENTS," now U.S. Pat. No. 8,605,090, of which the disclosures are incorporated herein, in their entirety, by reference.

BACKGROUND

Modifying a chart is a process for assisting a user to create or modify a standard chart into a customized chart using a series of visual chart elements representing how the standard chart can be changed. In some situations, when creating a chart the user normally has a preconceived notion of how a chart should be displayed. For example, the user may desire to create a chart for graphing various plotted points on an X and Y axis with each axis labeled. The user may also desire that each set of points be displayed in a different color and with a name associated with each set. However, the user may not know how to create such a chart because the user may be unfamiliar with the intricacies of the charting software, which leads to frustration by the user. It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments for modifying a chart are provided. A standard chart may be received by a computing device. A chart element representing a chart modification for use in changing the standard chart may then be provided pictorially by the computing device. The standard chart may then be modified by the computing device using the chart element through the presentation of a first gallery representing a feature of the standard chart for possible modification. The feature may include a horizontal axis title and a vertical axis title. The standard chart may be further modified by receiving a selection of the vertical axis title for possible modification from the first gallery. The computing device may then present a set of visual representations of how the vertical axis title could be modified in a second gallery. The set of visual representations may include a visual representation to not display an axis title and a visual representation to display the axis title in a rotated orientation. One of the visual representations may then be selected to modify the standard chart. Finally, the modified chart may be displayed by the computing device.

These and other features and advantages will be apparent from a reading of the following detailed description and a review of the associated drawings. It is to be understood that both the foregoing general description and the following detailed description are illustrative only and are not restrictive of the invention as claimed.

BRIEF DESCRIPTION OF THE DRAWINGS

The accompanying drawings, which are incorporated in and constitute a part of this disclosure, illustrate various embodiments of the present invention. In the drawings:

FIGS. 5A-5E show illustrative user interface galleries for modifying a chart, in accordance with an embodiment;

DETAILED DESCRIPTION

Figure 1:
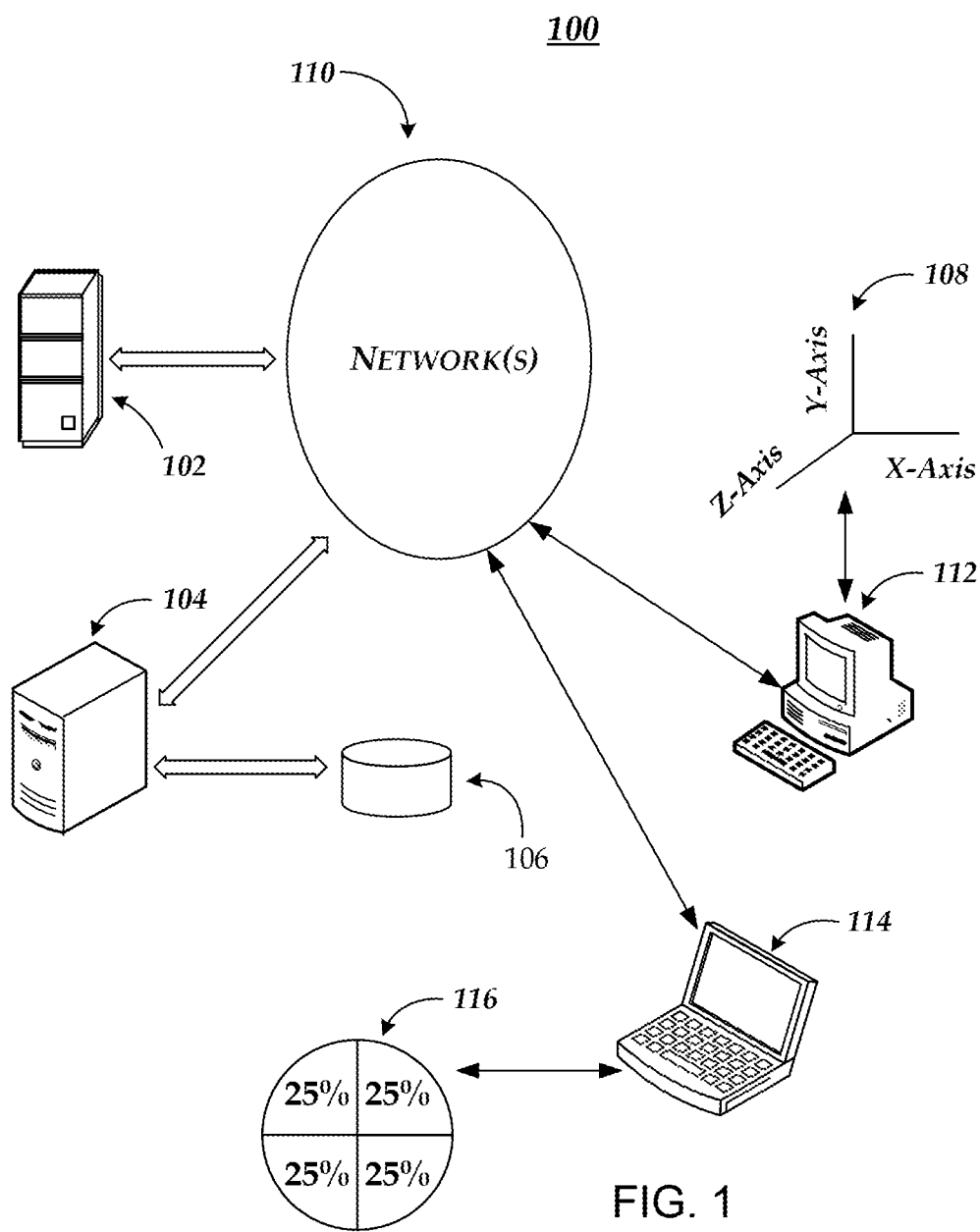
FIG. 1 illustrates a networked operating environment where embodiments may be practiced.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Embodiments for modifying a chart are provided. A standard chart may be received by a computing device. A chart element representing a chart modification for use in changing the standard chart may then be provided pictorially by the computing device. The standard chart may then be modified by the computing device using the chart element through the presentation of a first gallery representing a feature of the standard chart for possible modification. The feature may include a horizontal axis title and a vertical axis title. The standard chart may be further modified by receiving a selection of the vertical axis title for possible modification from the first gallery. The computing device may then present a set of visual representations of how the vertical axis title could be modified in a second gallery. The set of visual representations may include a visual representation to not display an axis title and a visual representation to display the axis title in a rotated orientation. One of the visual representations may then be selected to modify the standard chart. Finally, the modified chart may be displayed by the computing device.

Referring now to FIG. 1, a networked system 100 is illustrated where example embodiments may be implemented. The networked system 100 may include a server 102, a server 104 which manages a database 106, a document 108 which may be created, edited and displayed using a desktop computer 112, and a laptop computer 114 that may be used to create, edit and display chart 116.

The networked environment 100 may transmit and receive data to and from other computing devices such as the server 102, the desktop computer 112, and the laptop computer 114. Various types of data may be created, edited and processed within a chart associated with document 108 and chart 116. Exchanged data may include, for example, graphs, scheduling information, mathematical calculations or the like. Furthermore, networked environment 100 may transmit or receive data to a storage system 106, which is managed by server 104. Other computing devices may participate in this networked system as well, and devices such as the desktop computer 112 may be used as a stand-alone device.

Computing devices connected to the networked environment 100 may communicate over network(s) 110. Network(s) 110 may include one or more networks. The network(s) 110 may include a secure network such as an enterprise network, or an unsecure network such as a wireless open network. By way of example, and not limitation, the network(s) may include wired media such as a wired network or direct-wired connection, and wireless media such as acoustic, RF, infrared and other wireless media.

Figure 2:
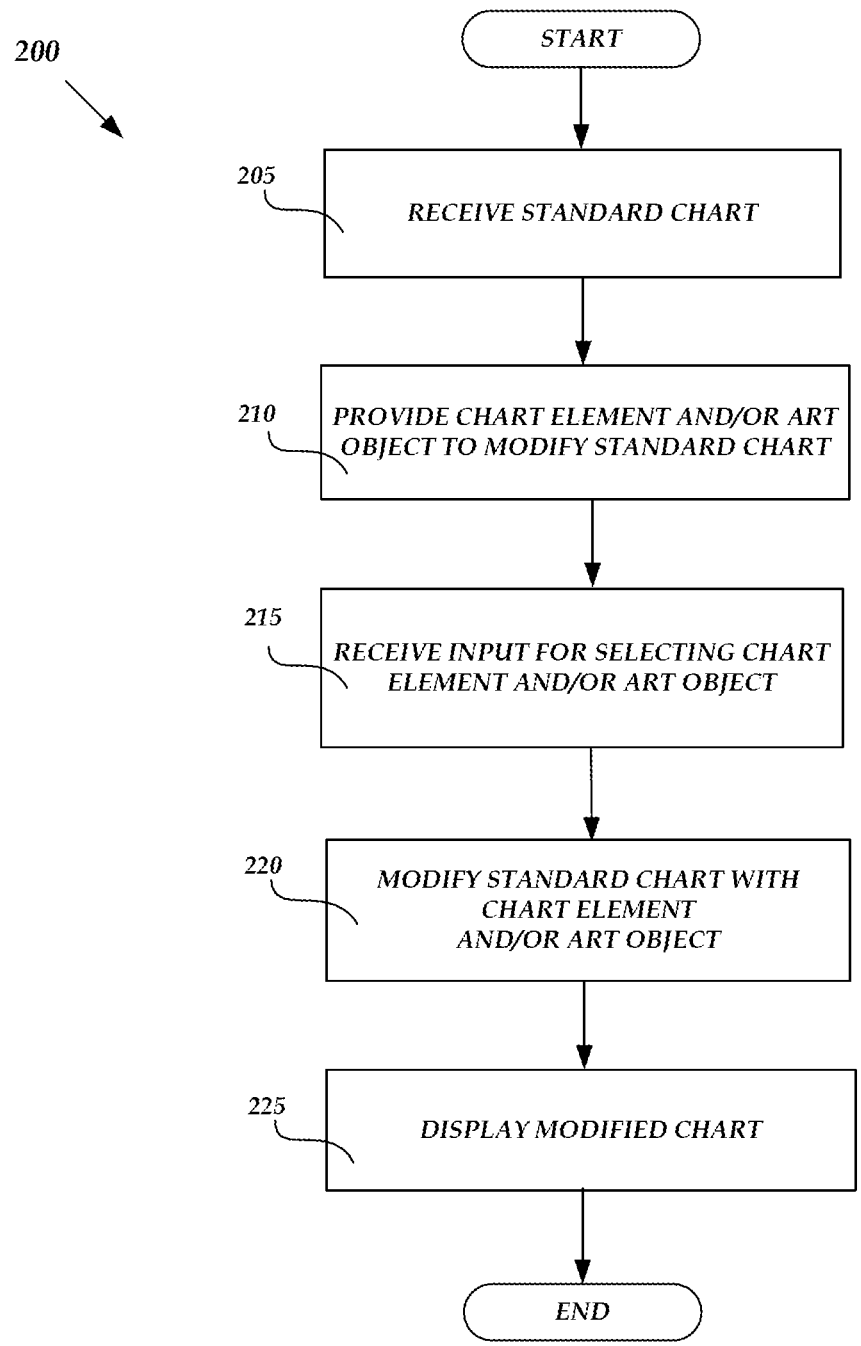
FIG. 2 is a flow chart of a method for modifying a chart, in accordance with an embodiment.

FIG. 2 is a flow diagram illustrating a routine 200 for modifying a chart, in accordance with an embodiment. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 2-3 and making up the various embodiments described herein are referred to variously as operations, structural devices, acts or modules. It will be recognized by one skilled in the art that these operations, structural devices, acts and modules may be implemented in software, in hardware, in firmware, in special purpose digital logic, and any combination thereof without deviating from the spirit and scope of the present invention as recited within the claims set forth herein.

The routine 200 begins at operation 205, where an application executing on a computing device (e.g., the desktop computer 112 or the laptop computer 114 of FIG. 1) may receive a standard chart.

From operation 205, the routine 200 continues to operation 210, where the application executing on the computing device, may provide one or more chart elements and/or one or more art objects for modifying the standard chart received at operation 210. In one embodiment, chart elements may be provided pictorially (e.g., as an icon) in a chart ribbon and may represent a particular chart modification for use in changing the standard chart. In one embodiment, art objects may be provided in a chart ribbon and may represent adding or editing drawings, text and pictures to modify a standard chart.

From operation 210, the routine 200 continues to operation 215, where the application executing on the computing device, may receive an input for selecting a chart element and/or an art object provided at operation 210. For example, a user may select a chart element for modifying one or more axis labels on a standard chart.

From operation 215, the routine 200 continues to operation 220, where the application executing on the computing device, may modify the standard chart based on the chart element and/or art object selected at operation 215. For example, upon selecting the chart element, the application may present the user with one or more galleries which display options for modifying various chart features. Upon a user selection of one or more of the displayed options, the application may modify the various chart features. An illustrative routine discussing the modification of a standard chart (in accordance with an embodiment) will be described in greater detail below with respect to FIG. 3. As another example, upon a user selection of an art object, the application may modify the standard chart by adding and editing at least one drawing element, adding and editing text or adding and editing at least one picture.

From operation 220, the routine 200 continues to operation 225, where the application executing on the computing device, may display the modified chart. From operation 225, the routine 200 then ends.

Figure 3:
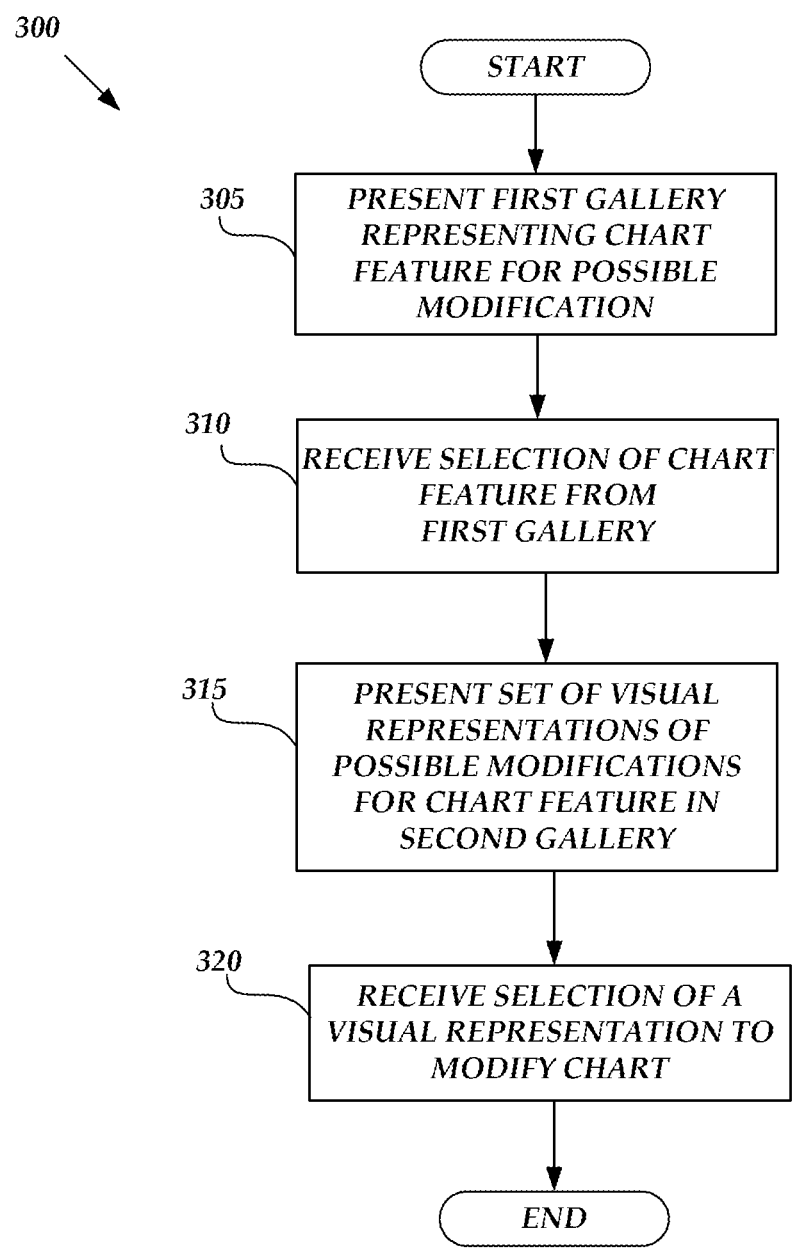
FIG. 3 is a flow chart of a method for modifying a chart, in accordance with another embodiment.

FIG. 3 is a flow diagram illustrating a routine 300 for modifying a chart, in accordance with another embodiment. The routine 300 begins at operation 305, where an application executing on a computing device (e.g., the desktop computer 112 or the laptop computer 114 of FIG. 1) present a gallery representing a chart feature for possible modification to a user. For example, the user may be presented with a gallery representing a horizontal axis title and a vertical axis title for a chart.

From operation 305, the routine 300 continues to operation 310, where the application executing on the computing device, may receive a selection of a chart feature from the gallery presented at operation 305. For example, the application may receive a selection of the vertical axis title feature for modifying the vertical axis title of a chart.

From operation 310, the routine 300 continues to operation 315, where the application executing on the computing device, may present a set of visual representations for possible modification of the chart feature selected at operation 310 in a second gallery. For example, the set of visual representations may include a visual representation to not display a (vertical) axis title and a visual representation to display the (vertical) axis title in a rotated orientation on the chart.

From operation 315, the routine 300 continues to operation 320, where the application executing on the computing device, may receive a selection of one of the visual representations presented at operation 315 to modify the standard chart. From operation 320, the routine 300 then ends.

Figure 4:
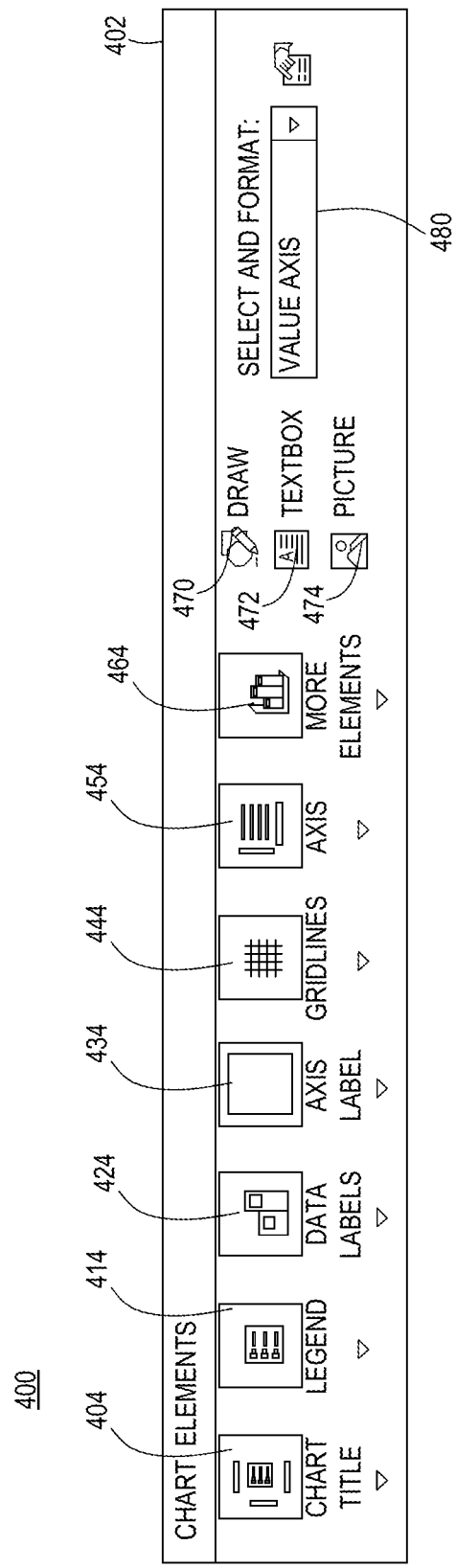
FIG. 4 shows a user interface for modifying a chart, in accordance with an embodiment.

FIG. 4 illustrates an exemplary user interface 400 for use in conjunction with a computing device (e.g., one of the computing devices 112 and 114 of FIG. 1), according to one embodiment. The user interface 400 includes a chart ribbon toolbar 402. Within the chart ribbon toolbar 402 are displayed a series of chart element gallery commands 404, 414, 424, 434, 444, 454 and 464 for use by a user to modify a standard chart. For example, gallery command 404 may be utilized to modify a chart title, gallery command 414 may be utilized to modify a chart legend, gallery command 424 may be utilized to modify chart data labels, gallery command 434 may be utilized to modify chart axis labels, gallery command 444 may be utilized to modify chart gridlines, gallery command 454 may be utilized to modify chart axes and gallery command 464 may be utilized to modify other chart elements (which are discussed in greater detail below). The chart ribbon toolbar 402 further includes a series of art objects 470, 472 and 474 for use by the user to add and edit drawing elements, text and pictures, respectively. In addition, the chart ribbon toolbar 402 provides the user with tooltips 480 for use by the user to receive help on chart formatting.

FIGS. 5A-5E show exemplary chart gallery structures for use in conjunction with the chart ribbon toolbar 402, according to one embodiment. For instance, upon selecting the gallery command 434, a gallery 504 representing possible modifications associated with a chart element (Axis Labels) may be presented to the user. For example, the gallery 504 presents the user with an option 506 to modify a horizontal (X) Axis title, an option 508 to modify a vertical (Y) Axis title and an option 510 to modify a depth (Z) Axis title. If the user selects, for example, the option 506 to modify the horizontal (X) Axis title, the user is presented with a set of visual representations 514-520 of how the horizontal (X) Axis title could be modified in a second gallery 512 which may include, for example, visual representation 514 to not display an axis title, visual representation 516 to display the axis title below a horizontal (i.e., X Axis) and resize the chart, visual representation 518 to overlay a horizontal axis title on the chart without resizing the chart and visual representation 520 to select morel title options (not shown). Accordingly, the user may desire to place the title for the X Axis below the axis by selecting the visual representation 510.

If the user selects, for example, the option 508 to modify the vertical (Y) Axis title, the user is presented with a set of visual representations 524-532 of how the vertical (Y) Axis title could be modified in a third gallery 522 which may include, for example, visual representation 524 to not display an axis title, visual representation 526 to display a rotated axis title and resize the chart, visual representation 528 to display an axis title with vertical text and resize the chart, visual representation 530 to display an axis title horizontally without resizing the chart and visual representation 532 to select more title options (not shown). It should be understood that the user may also utilize other galleries associated with the gallery commands 404 (Chart Title), 414 (Legend), 424 (Data Labels), 444 (Gridlines), 454 (Axis) and 464 (More Elements).

Figure 5A:
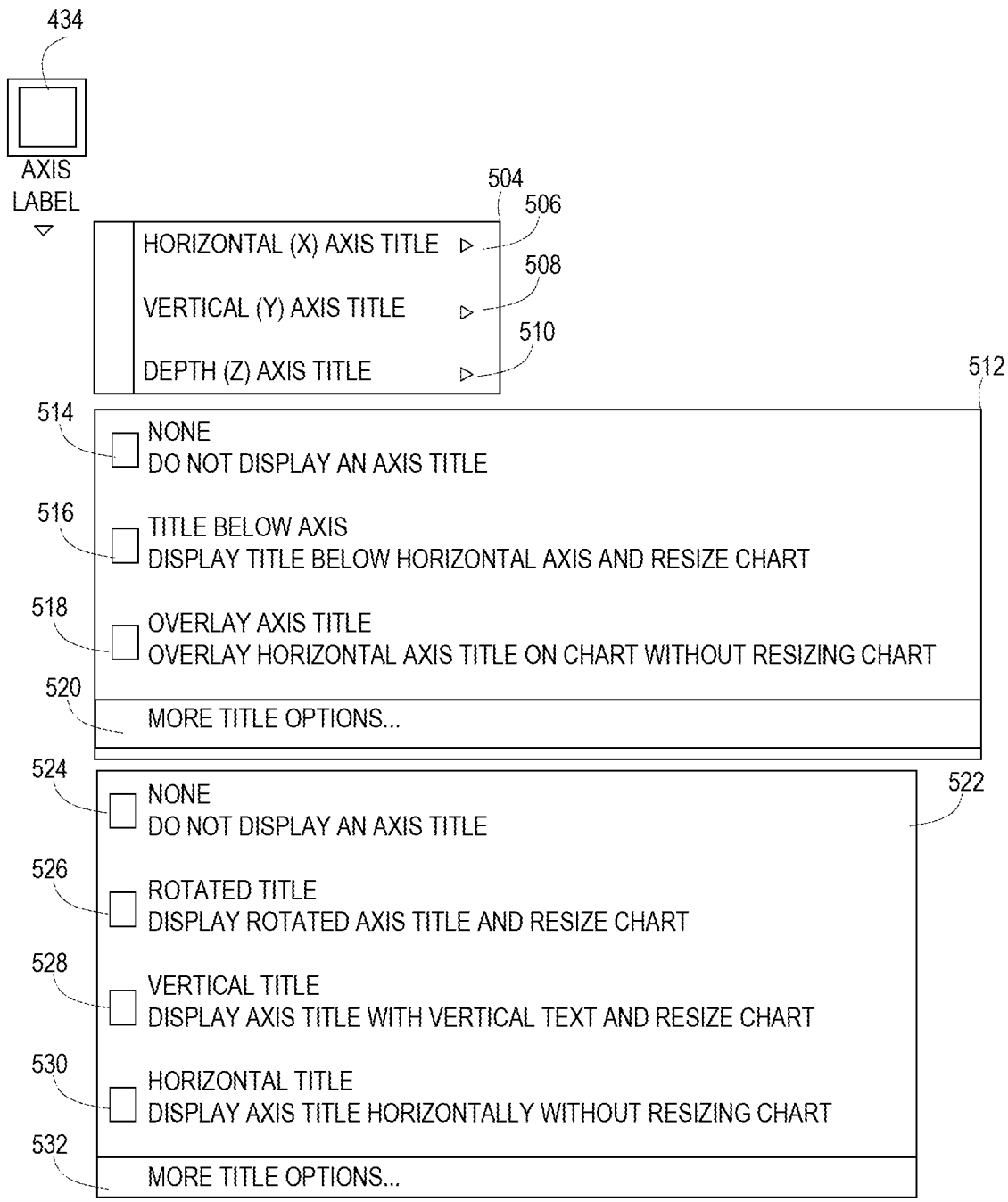
Figure 5B:
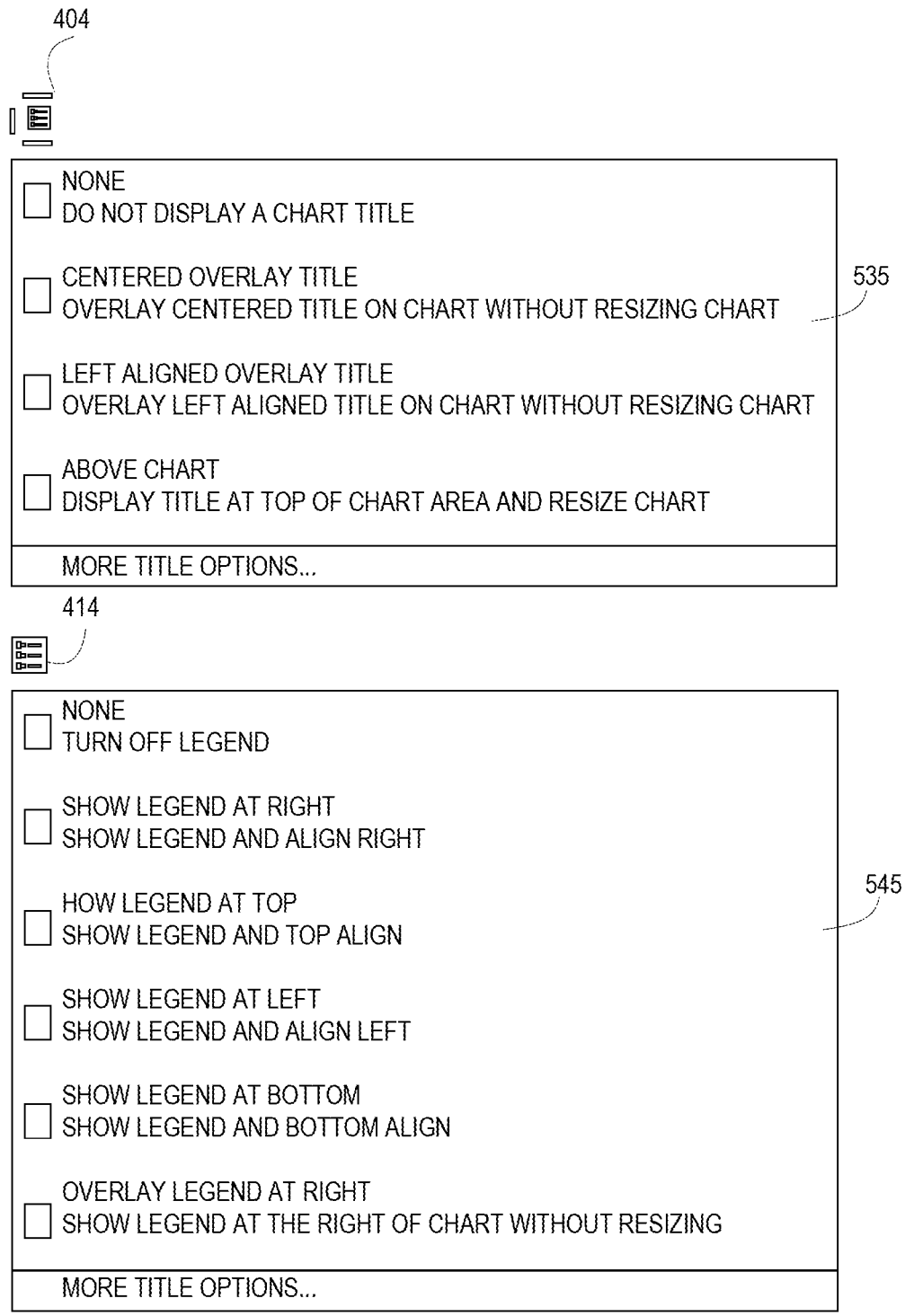
Figure 5E:

Illustrative galleries associated with the aforementioned gallery commands are shown in FIGS. 5B-5D. For example, FIG. 5B shows galleries 535 and 545 from which a user may select visual representations for modifying a chart title and a legend for a chart, respectively. FIG. 5C shows a gallery 555 from which a user may select visual representations for modifying data labels for a chart and also shows galleries 560, 565 and 570 from which a user may select visual representations for modifying chart gridlines. FIG. 5D shows galleries 575, 580 and 585 from which a user may select visual representations for modifying chart axes. FIG. 5E shows galleries 590, 594 and 598 from which a user may select visual representations for modifying other chart elements such as data tables, trendlines, error bars, lines, up/down bars, plot area, chart wall and chart floor.

Figure 6:
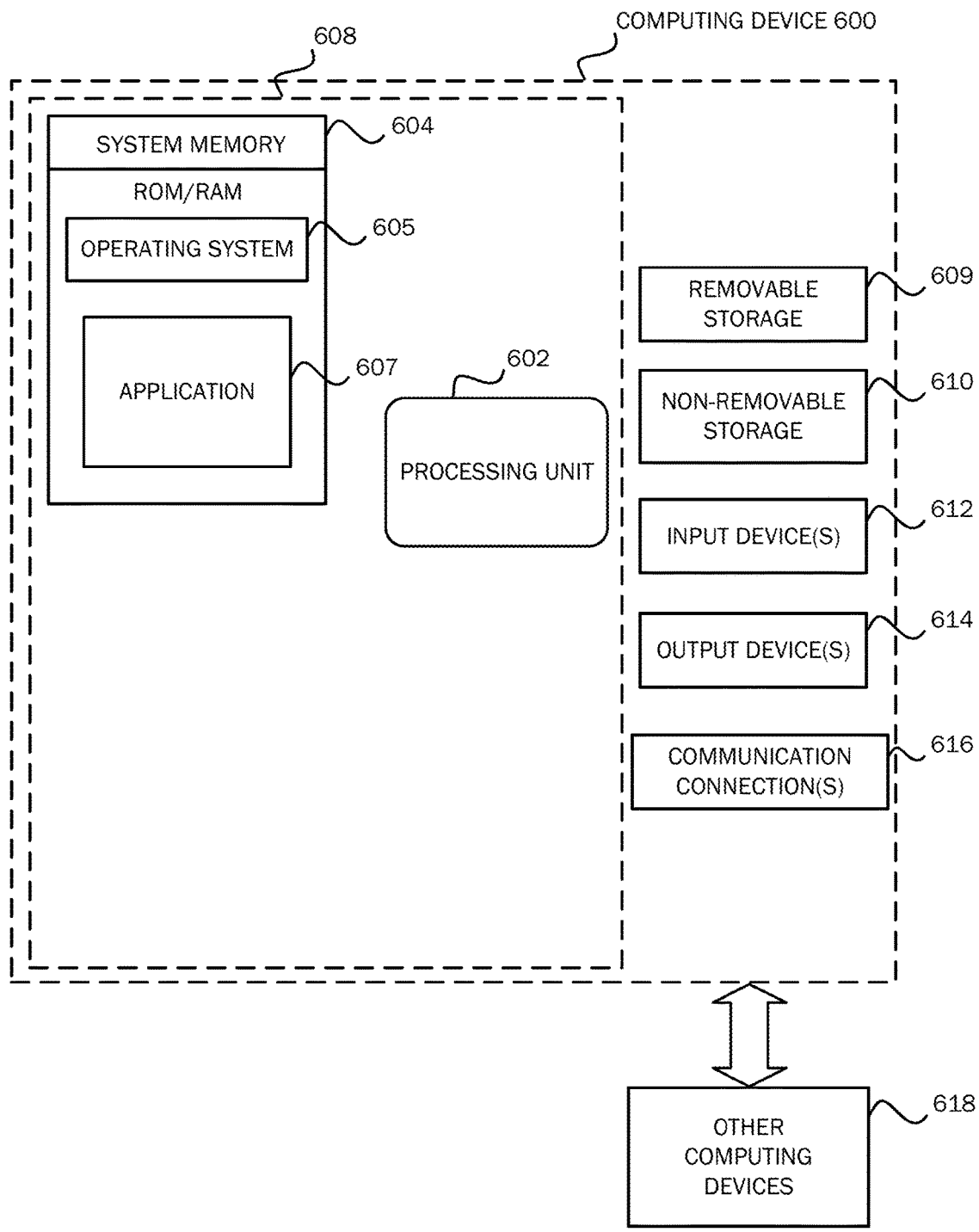
FIG. 6 is a simplified block diagram of a computing device with which various embodiments may be practiced.
Figure 7A:
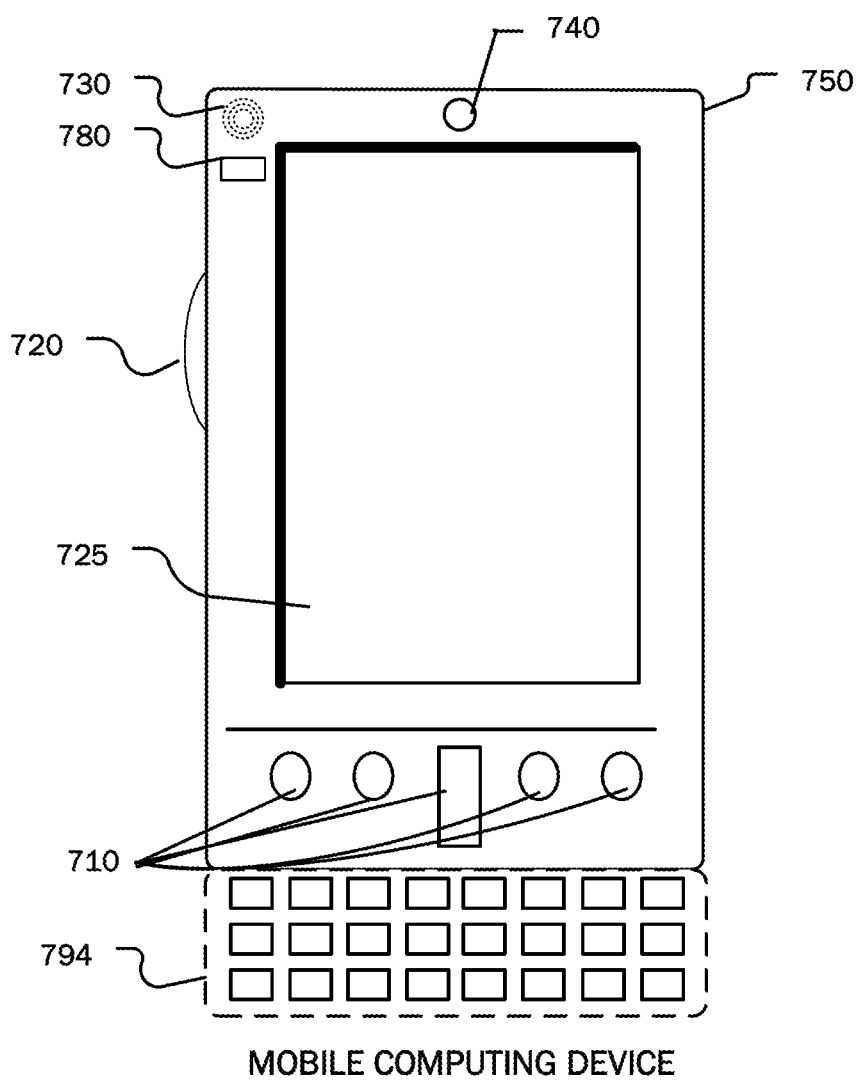
FIG. 7A is a simplified block diagram of a mobile computing device with which various embodiments may be practiced.
Figure 7B:
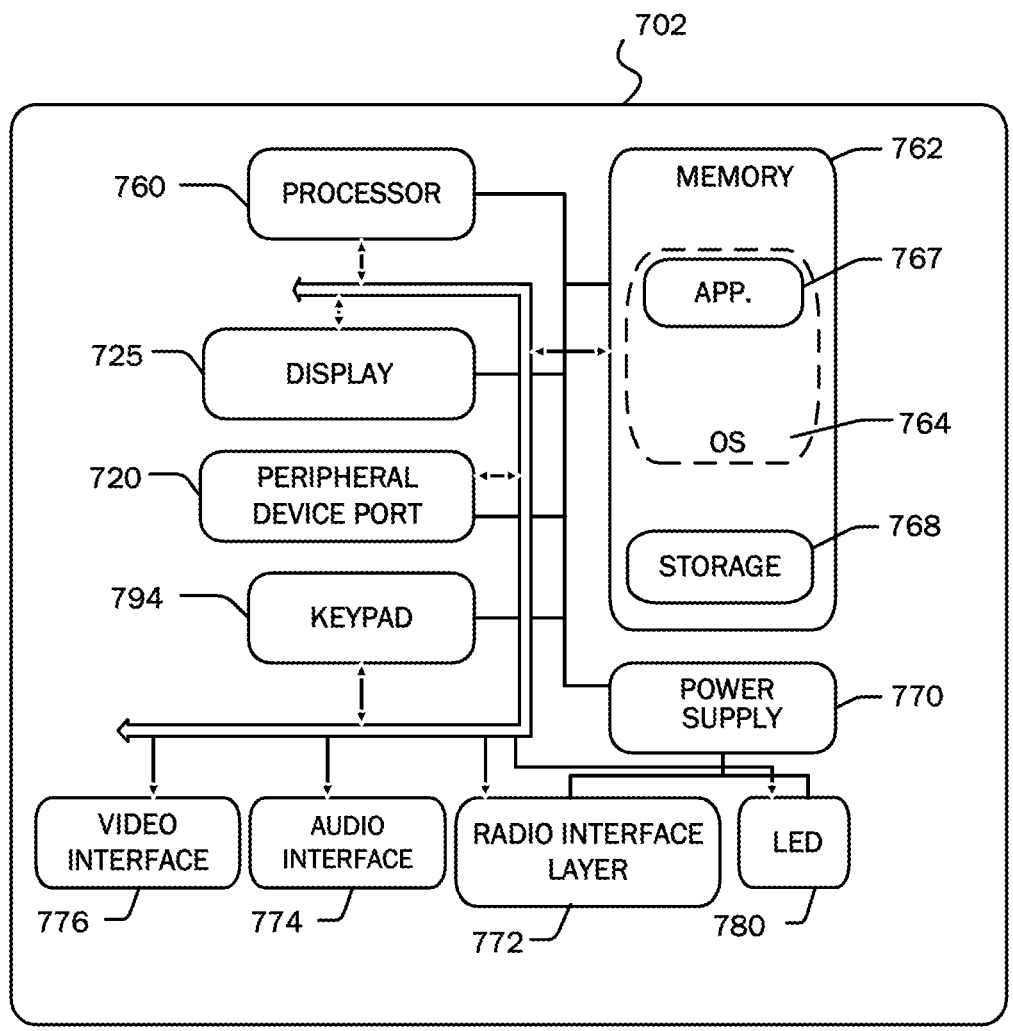
FIG. 7B is a simplified block diagram of a mobile computing device with which various embodiments may be practiced.
Figure 8:
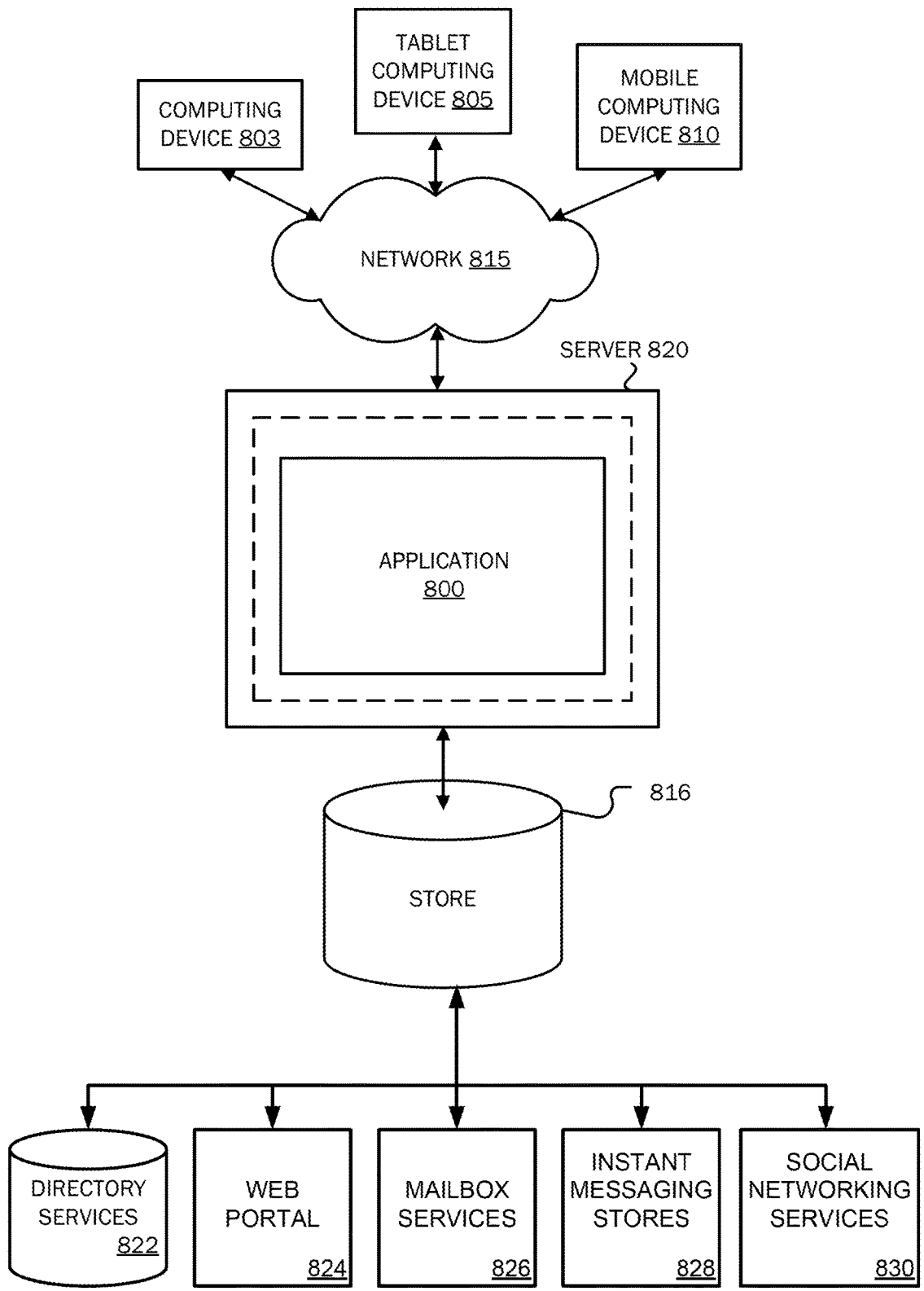
FIG. 8 is a simplified block diagram of a distributed computing system in which various embodiments may be practiced.

FIGS. 6-8 and the associated descriptions provide a discussion of a variety of operating environments in which embodiments of the invention may be practiced. However, the devices and systems illustrated and discussed with respect to FIGS. 6-8 are for purposes of example and illustration and are not limiting of a vast number of computing device configurations that may be utilized for practicing embodiments of the invention, described herein.

FIG. 6 is a block diagram illustrating example physical components of a computing device 600 with which various embodiments may be practiced. In a basic configuration, the computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination. System memory 604 may include an operating system 605 and application 607. Operating system 605, for example, may be suitable for controlling the computing device 600's operation and, in accordance with an embodiment, may comprise the WINDOWS operating systems from MICROSOFT CORPORATION of Redmond, Wash.

The application 607, for example, may comprise functionality for performing routines including, for example, modifying a chart, as described above with respect to the operations in routines 200 and 300 of FIGS. 2 and 3. In accordance with an embodiment, the application 607 may comprise one or more program modules such as, for example, a document management application for receiving a document or chart. The program modules may also include a chart formatting display application for visually providing chart modifying elements to a user. Other program modules that may be used in accordance with the embodiments described herein may include electronic mail and contacts applications, word processing applications, spreadsheet applications, database applications, slide presentation applications, drawing or computer-aided application programs, etc. It should further be understood, however, that the embodiments described herein may also be practiced in conjunction with other application programs and program modules and further, are not limited to any particular application or system.

The computing device 600 may have additional features or functionality. For example, the computing device 600 may also include additional data storage devices (removable and/or non-removable) such as, for example, magnetic disks, optical disks, solid state storage devices ("SSD"), flash memory or tape. Such additional storage is illustrated in FIG. 6 by a removable storage 609 and a non-removable storage 610. The computing device 600 may also have input device(s) 612 such as a keyboard, a mouse, a pen, a sound input device (e.g., a microphone), a touch input device for receiving gestures, an accelerometer or rotational sensor, etc. Output device(s) 614 such as a display, speakers, a printer, etc. may also be included. The aforementioned devices are examples and others may be used. The computing device 600 may include one or more communication connections 616 allowing communications with other computing devices 618. Examples of suitable communication connections 616 include, but are not limited to, RF transmitter, receiver, and/or transceiver circuitry; universal serial bus (USB), parallel, and/or serial ports.

Furthermore, various embodiments may be practiced in an electrical circuit comprising discrete electronic elements, packaged or integrated electronic chips containing logic gates, a circuit utilizing a microprocessor, or on a single chip containing electronic elements or microprocessors. For example, various embodiments may be practiced via a system-on-a-chip ("SOC") where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may operate via application-specific logic integrated with other components of the computing device/system 600 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a suitable mobile computing environment, for example, a mobile computing device 750 which may include, without limitation, a smartphone, a tablet personal computer, a laptop computer, and the like, with which various embodiments may be practiced. With reference to FIG. 7A, an example mobile computing device 750 for implementing the embodiments is illustrated. In a basic configuration, mobile computing device 750 is a handheld computer having both input elements and output elements. Input elements may include touch screen display 725 and input buttons 710 that allow the user to enter information into mobile computing device 750. Mobile computing device 750 may also incorporate an optional side input element 720 allowing further user input. Optional side input element 720 may be a rotary switch, a button, or any other type of manual input element. In alternative embodiments, mobile computing device 750 may incorporate more or less input elements. In yet another alternative embodiment, the mobile computing device is a portable telephone system, such as a cellular phone having display 725 and input buttons 710. Mobile computing device 750 may also include an optional keypad 794. Optional keypad 794 may be a physical keypad or a "soft" keypad generated on the touch screen display.

Mobile computing device 750 incorporates output elements, such as display 725, which can display a graphical user interface (GUI). Other output elements include speaker 730 and LED 780. Additionally, mobile computing device 750 may incorporate a vibration module (not shown), which causes mobile computing device 750 to vibrate to notify the user of an event. In yet another embodiment, mobile computing device 750 may incorporate a headphone jack (not shown) for providing another means of providing output signals.

Although described herein in combination with mobile computing device 750, in alternative embodiments may be used in combination with any number of computer systems, such as in desktop environments, laptop or notebook computer systems, multiprocessor systems, micro-processor based or programmable consumer electronics, network PCs, mini computers, main frame computers and the like. Various embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate the various embodiments described herein.

FIG. 7B is a block diagram illustrating components of a mobile computing device used in one embodiment, such as the mobile computing device 750 shown in FIG. 7A. That is, mobile computing device 750 can incorporate a system 702 to implement some embodiments. For example, system 702 can be used in implementing a "smartphone" that can run one or more applications similar to those of a desktop or notebook computer. In some embodiments, the system 702 is integrated as a computing device, such as an integrated personal digital assistant (PDA) and wireless phone.

Application 767 may be loaded into memory 762 and run on or in association with an operating system 764. The system 702 also includes non-volatile storage 768 within memory the 762. Non-volatile storage 768 may be used to store persistent information that should not be lost if system 702 is powered down. The application 767 may use and store information in the non-volatile storage 768. The application 767, for example, may comprise functionality for performing routines including, for example, modifying a chart, as described above with respect to the operations in routines 200 and 300 of FIGS. 2 and 3. A synchronization application (not shown) also resides on system 702 and is programmed to interact with a corresponding synchronization application resident on a host computer to keep the information stored in the non-volatile storage 768 synchronized with corresponding information stored at the host computer. As should be appreciated, other applications may also be loaded into the memory 762 and run on the mobile computing device 750.

The system 702 has a power supply 770, which may be implemented as one or more batteries. The power supply 770 might further include an external power source, such as an AC adapter or a powered docking cradle that supplements or recharges the batteries.

The system 702 may also include a radio 772 (i.e., radio interface layer) that performs the function of transmitting and receiving radio frequency communications. The radio 772 facilitates wireless connectivity between the system 702 and the "outside world," via a communications carrier or service provider. Transmissions to and from the radio 772 are conducted under control of OS 764. In other words, communications received by the radio 772 may be disseminated to the application 767 via OS 764, and vice versa.

The radio 772 allows the system 702 to communicate with other computing devices, such as over a network. The radio 772 is one example of communication media. The embodiment of the system 702 is shown with two types of notification output devices: the LED 780 that can be used to provide visual notifications and an audio interface 774 that can be used with speaker 730 to provide audio notifications. These devices may be directly coupled to the power supply 770 so that when activated, they remain on for a duration dictated by the notification mechanism even though processor 760 and other components might shut down for conserving battery power. The LED 780 may be programmed to remain on indefinitely until the user takes action to indicate the powered-on status of the device. The audio interface 774 is used to provide audible signals to and receive audible signals from the user. For example, in addition to being coupled to speaker 730, the audio interface 774 may also be coupled to a microphone (not shown) to receive audible (e.g., voice) input, such as to facilitate a telephone conversation. In accordance with embodiments, the microphone may also serve as an audio sensor to facilitate control of notifications. The system 702 may further include a video interface 776 that enables an operation of on-board camera 740 to record still images, video streams, and the like.

A mobile computing device implementing the system 702 may have additional features or functionality. For example, the device may also include additional data storage devices (removable and/or non-removable) such as, magnetic disks, optical disks, or tape. Such additional storage is illustrated in FIG. 7B by storage 768.

Data/information generated or captured by the mobile computing device 750 and stored via the system 702 may be stored locally on the mobile computing device 750, as described above, or the data may be stored on any number of storage media that may be accessed by the device via the radio 772 or via a wired connection between the mobile computing device 750 and a separate computing device associated with the mobile computing device 750, for example, a server computer in a distributed computing network such as the Internet. As should be appreciated such data/information may be accessed via the mobile computing device 750 via the radio 772 or via a distributed computing network. Similarly, such data/information may be readily transferred between computing devices for storage and use according to well-known data/information transfer and storage means, including electronic mail and collaborative data/information sharing systems.

FIG. 8 is a simplified block diagram of a distributed computing system in which various embodiments may be practiced. The distributed computing system may include number of client devices such as a computing device 803, a tablet computing device 805 and a mobile computing device 810. The client devices 803, 805 and 810 may be in communication with a distributed computing network 815 (e.g., the Internet). A server 820 is in communication with the client devices 803, 805 and 810 over the network 815. The server 820 may store application 800 which may be perform routines including, for example, modifying a chart, as described above with respect to the operations in routines 200 and 300 of FIGS. 2 and 3. Content developed, interacted with, or edited in association with the application 800 may be stored in different communication channels or other storage types. For example, various documents may be stored using a directory service 822, a web portal 824, a mailbox service 826, an instant messaging store 828, or a social networking site 830.

The application 800 may use any of these types of systems or the like for enabling data utilization, as described herein. The server 820 may provide the application 800 to clients. As one example, the server 820 may be a web server providing the application 800 over the web. The server 820 may provide the application 800 over the web to clients through the network 815. Any of the embodiments of the computing devices 803, 805 and 810 may obtain content from the store 816.

Various embodiments are described above with reference to block diagrams and/or operational illustrations of methods, systems, and computer program products. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A computer-implemented method of modifying one or more elements of a chart with visual representations of commands and the elements of the chart through graphical user interface, the method comprising:
   providing visual representations of one or more elements of the chart in a first gallery, wherein the one or more elements comprise: a title, a legend, a label, an axis, and gridlines;
   receiving a selection of the one or more elements;
   providing visual representations of two or more commands to modify format of the chart in a second gallery, responsive to the received selection, wherein the two or more commands are based on the selection of the one or more elements, and wherein the two or more commands comprise:
      displaying the received selection of the one or more elements;
      suppressing the displaying of the received selection of the one or more elements; and displaying the received selection of the one or more elements with alignment relative to a position within the chart, wherein the position comprises one of top, bottom, left, or right;

receiving one or more selections from the two or more commands through user interaction;

modifying, by a computing device, the one or more elements of the chart based on the one or more selections of the commands; and displaying the chart with the modified one or more elements.

2. The method of claim 1, wherein the title comprises a horizontal axis title, a vertical axis title, and a title of the chart, and wherein, when the received selection of the one or more elements in the first gallery is the title, the two or more commands in the second gallery further comprise displaying in one of rotated orientations in relative to the chart.

3. The method of claim 1, wherein the gridlines comprise horizontal gridlines and vertical gridlines, and wherein, when the received selection of the one or more elements in the first gallery is the gridlines, the two or more commands in the second gallery further comprise displaying or not displaying major gridlines, and displaying or not displaying minor gridlines.

4. The method of claim 1, wherein the axis comprises a horizontal axis and vertical axis, and wherein, when the received selection of the one or more elements in the first gallery is the axis, the two or more commands in the second gallery further comprise displaying the axis using a linear scale or displaying the axis using a log-based scale.

5. The method of claim 1, wherein the two or more commands in the second gallery further comprise a visual representation of displaying the received selection of the one or more elements, and a visual representation of not displaying the received selection of the one or more elements.

6. The method of claim 1, wherein, when the received selection of the one or more elements in a first gallery is the legend, the two or more commands in a second gallery further comprise:
alignment of the received selection of the one or more elements to left,
alignment of the received selection of the one or more elements to center, and
alignment of the received selection of the one or more elements to right.

7. The method of claim 1, wherein, when the received selection of the one or more element in a first gallery is the label, the two or more commands in a second gallery further comprise outside end, inside end, center, and inside base.

8. The method of claim 1, wherein the one or more elements further comprises at least one text object, and wherein modifying the one or more elements of the chart further comprises providing the at least one text object residing in a chart ribbon to modify the chart by adding and editing the at least one text object.

9. The method of claim 1, wherein the one or more elements further comprises at least one picture object, and wherein modifying the one or elements element of the chart further comprises providing the at least one picture object residing in a chart ribbon to modify the chart by adding and editing the at least one picture object.

10. A system for modifying one or more elements of a chart with visual representation of commands and the elements of the chart through graphical user interface, the system comprising:

a memory storage;
a processing unit coupled to the memory storage, wherein the processing unit is operative to:
receive a chart;
provide visual representations of one or more elements of the chart in a first gallery to modify the chart, wherein the one or more elements comprise: a title, a legend, a label, an axis, and gridlines;
receive a selection of the one or more elements;
provide visual representations of two or more commands to modify format of the chart in a second gallery, responsive to the received selection, wherein the two or more commands are based on the selection of the one or more elements, and wherein the two or more commands comprise:
displaying the received selection of the one or more elements;
suppressing the displaying the received selection of the one or more elements; and
displaying the received selection of the one or more elements with alignment relative to a position within the chart, wherein the position comprises one of top, bottom, left, or right;
receive one or more selections from the two or more commands through user interaction;
modify the one or more elements of the chart based on the one or more selections of the commands; and
provide the chart with the modified one or more elements.

11. The system of claim 10, wherein the processing unit is further operative to receive an input for selecting the one or more elements.

12. The system of claim 11, wherein the chart is modified based on the received input.

13. The system of claim 10, wherein the processing unit is associated with a server.

14. The system of claim 10, wherein the one or more elements further comprise a text object and a picture object, and wherein modify the one or more elements of the chart further comprises to provide the text object and the picture object residing in a chart ribbon to modify the chart by adding and editing the text object and the picture object in the chart.

15. A computer-readable storage medium storing computer-executable instructions which, when executed by a computer, causes the computer to perform a method of modifying one or more elements of a chart with visual representations of commands and the elements of the chart through graphical user interface, the method comprising:
providing, by the computing device, visual representations of one or more elements of the chart to modify the chart in a first gallery, wherein the one or more elements comprise: a title, a legend, a label, an axis, and gridlines;
receiving, by the computing device, an input, wherein the input comprises a selection in part from the one or more elements;
providing, by the computing device, visual representations of two or more commands to modify format of the chart in a second gallery, responsive to the received selection, wherein the two or more commands are based on the selection of the one or more elements, and wherein the two or more commands comprise:
displaying the received selection of the one or more elements;
suppressing the displaying of the received selection of the one or more elements; and displaying the received selection of the one or more elements with alignment relative to a position within the chart, wherein the position comprises one of top, bottom, left, or right;

receiving, by the computing device, one or more selections from the two or more commands through user interaction;

modifying, by the computing device, the one or more elements of the chart based on the one or more selections of the commands; and displaying, by the computing device, the chart with the modified one or more elements.

16. The computer-readable storage medium of claim 15, wherein the title comprises a horizontal axis title, a vertical axis title, and a title of the chart, and wherein, when the received selection of the one or more elements in a first gallery is the title, the two or more commands in a second gallery further comprise displaying in one of rotated orientations in relative to the chart.

17. The computer-readable storage medium of claim 15, wherein the one or more elements further comprises at least one art object, and wherein modifying the one or more elements of the chart further comprises providing the at least one art object residing in a chart ribbon to modify the chart by adding at least one picture.

18. The computer-readable storage medium of claim 15, wherein the gridlines comprise horizontal gridlines and vertical gridlines, and wherein, when the received selection of the one or more elements is the gridlines, the two or more commands further comprise displaying or not displaying major gridlines, and displaying or not displaying minor gridlines.

19. The computer-readable storage medium of claim 15, wherein the title comprises a horizontal axis title, a vertical axis title, and a title of the chart, and wherein, when the received selection of the one or more elements is the title, the two or more commands further comprise providing in one of rotated orientations in relative to the chart.

20. The computer-readable storage medium of claim 15, wherein the axis comprises a horizontal axis and vertical axis, and wherein, when the received selection in part from the one or more elements is the axis, the two or more commands further comprise displaying the axis based on a linear scale or displaying the axis based on a log-based scale.

* * * * *